US012131462B2

(12) United States Patent
Amiri Kamalabad et al.

(10) Patent No.: US 12,131,462 B2
(45) Date of Patent: Oct. 29, 2024

(54) SYSTEM AND METHOD FOR FACIAL AND DENTAL PHOTOGRAPHY, LANDMARK DETECTION AND MOUTH DESIGN GENERATION

(71) Applicants: Motahare Amiri Kamalabad, Yazd (IR); Mohammad Hossein Rohban, Tehran (IR); Homayoun Moradi, Tehran (IR); Amirhossein Heydarian Ardakani, Yazd (IR); Milad Soltany Kadarvish, Bookan (IR)

(72) Inventors: Motahare Amiri Kamalabad, Yazd (IR); Mohammad Hossein Rohban, Tehran (IR); Homayoun Moradi, Tehran (IR); Amirhossein Heydarian Ardakani, Yazd (IR); Milad Soltany Kadarvish, Bookan (IR)

( * ) Notice: Subject to any disclaimer, the term of this patent is extended or adjusted under 35 U.S.C. 154(b) by 0 days.

(21) Appl. No.: 17/575,082

(22) Filed: Jan. 13, 2022

(65) Prior Publication Data

US 2022/0222814 A1 Jul. 14, 2022

Related U.S. Application Data

(60) Provisional application No. 63/137,226, filed on Jan. 14, 2021.

(30) Foreign Application Priority Data

Jan. 14, 2021 (IR) .................... 13995014000300917

(51) Int. Cl.

| | |
|---|---|
| ***G06T 7/00*** | (2017.01) |
| ***G06T 7/11*** | (2017.01) |
| ***G06T 7/70*** | (2017.01) |

(52) U.S. Cl.
CPC .............. *G06T 7/0012* (2013.01); *G06T 7/11* (2017.01); *G06T 7/70* (2017.01);
(Continued)

(58) Field of Classification Search
CPC . G06T 2207/20084; G06T 2207/30036; G06T 7/0012
See application file for complete search history.

(56) References Cited

U.S. PATENT DOCUMENTS 6,738,391 B1 * 5/2004 Kim ........................ G10L 19/22 370/335
8,545,221 B2 10/2013 Stone-Collonge
(Continued)

FOREIGN PATENT DOCUMENTS

CN 107252356 10/2017
CN 108062792 5/2018
(Continued)

OTHER PUBLICATIONS

Yang Song, Jascha Sohl-Dickstein, Diederik P. Kingma, Abhishek Kumar, Stefano Ermon, Ben Poole, Score-Based Generative Modeling through Stochastic Differential Equations, Nov. 26, 2020 , arXiv:2011.13456v1, p. 1-32 (Year: 2020).*
(Continued)

*Primary Examiner* — Gandhi Thirugnanam
(74) *Attorney, Agent, or Firm* — Summit Patent Group

(57) ABSTRACT

One or more systems and/or techniques for capturing images, determining landmark information and/or generating mouth designs are provided. In an example, one or more images of a patient are identified. Landmark information may be determined based upon the one or more images. The landmark information includes first segmentation information indicative of boundaries of teeth of the patient, gums of the patient and/or one or more lips of the patient. A first
(Continued)

masked image may be generated based upon the landmark information. A mouth design may be generated, based upon the first masked image, using a first machine learning model. A representation of the mouth design may be displayed via a client device.

24 Claims, 63 Drawing Sheets

(52) U.S. Cl.
CPC ............... *G06T 2207/10004* (2013.01); *G06T 2207/10024* (2013.01); *G06T 2207/20084* (2013.01); *G06T 2207/30036* (2013.01)

(56) References Cited

U.S. PATENT DOCUMENTS

| | | | | |
|---|---|---|---|---|
| 10,092,373 | B2 | 10/2018 | Abraham et al. | |
| 10,705,486 | B2 | 7/2020 | Aboutalebi | |
| 11,020,206 | B2 | 6/2021 | Shi et al. | |
| 11,232,573 | B2 * | 1/2022 | Brown | G06N 20/00 |
| 2011/0116691 | A1 * | 5/2011 | Chung | G06T 7/75 382/128 |
| 2014/0122027 | A1 | 5/2014 | Andreiko et al. | |
| 2014/0342304 | A1 | 11/2014 | Meletiou, Jr. | |
| 2018/0028294 | A1 | 2/2018 | Azernikov et al. | |
| 2019/0095698 | A1 * | 3/2019 | Cole | G06T 17/00 |
| 2019/0147591 | A1 * | 5/2019 | Chang | A61B 6/14 382/128 |
| 2019/0164352 | A1 | 5/2019 | Yancey et al. | |
| 2020/0000552 | A1 * | 1/2020 | Mednikov | G06T 15/10 |
| 2020/0059596 | A1 * | 2/2020 | Yoo | H04N 5/232935 |
| 2020/0066391 | A1 * | 2/2020 | Sachdeva | G16H 20/40 |
| 2020/0105028 | A1 | 4/2020 | Gao et al. | |
| 2020/0143541 | A1 * | 5/2020 | Wang | G06T 3/40 |
| 2020/0327726 | A1 * | 10/2020 | Lin | G06V 10/774 |
| 2020/0342586 | A1 * | 10/2020 | Kumar | G06T 7/13 |
| 2020/0360109 | A1 * | 11/2020 | Gao | A61C 9/0046 |
| 2020/0364860 | A1 | 11/2020 | Kearney et al. | |
| 2021/0022833 | A1 | 1/2021 | Cramer et al. | |
| 2021/0045843 | A1 | 2/2021 | Pokotilov et al. | |
| 2021/0068923 | A1 | 3/2021 | Carrier, Jr. et al. | |
| 2021/0074061 | A1 * | 3/2021 | Brown | G06T 17/205 |
| 2022/0030162 | A1 * | 1/2022 | Cramer | A61C 9/0053 |
| 2022/0084653 | A1 * | 3/2022 | Yang | A61C 9/0053 |
| 2022/0215531 | A1 * | 7/2022 | Azernikov | G06T 7/11 |
| 2022/0218452 | A1 * | 7/2022 | Gandrud | A61C 13/34 |
| 2022/0222814 | A1 * | 7/2022 | Amiri Kamalabad | G06V 10/82 |
| 2022/0254128 | A1 * | 8/2022 | Powers | G06V 40/171 |
| 2022/0262009 | A1 * | 8/2022 | Yu | G06T 7/194 |
| 2023/0196515 | A1 * | 6/2023 | Koch | G06T 3/4046 382/128 |
| 2023/0215063 | A1 * | 7/2023 | Gadiyar | G06V 10/751 382/128 |

FOREIGN PATENT DOCUMENTS

| | | | | | |
|---|---|---|---|---|---|
| CN | 109345621 | | | 2/2019 | |
| CN | 109345621 | A | * | 2/2019 | |
| CN | 110046597 | A | * | 7/2019 | |
| CN | 110322317 | A | * | 10/2019 | G06K 9/00268 |
| EP | 3632369 | A1 | * | 4/2020 | A61B 1/24 |
| WO | WO-2016003257 | A2 | * | 1/2016 | A61B 1/24 |
| WO | 2019/215550 | A1 | | 11/2019 | |

OTHER PUBLICATIONS

Kazemi, One millisecond face alignment with an ensemble of regression trees, Computer Vision and Pattern Recognition, 2014, pp. 1867-1874.

Omar, The application of parameters for comprehensive smile esthetics by digital smile design programs: A review of literature, 2017, pp. 7-12, Saudi Dental Journal, vol. 30.

Cervino, Dental Restorative Digital Workflow: Digital Smile Design from Aesthetic to Function, Mar. 2019, pp. 1-13, Dentistry Journal, vol. 07.

Meereis, Digital Smile Design for Computer-assisted Esthetic Rehabilitation: Two-year Follow-up, 2016, pp. 1-11, vol. 41.

Cattoni, A New Total Digital Smile Planning Technique (3D-DSP) to Fabricate CAD-CAM Mockups for Esthetic Crowns and Veneers, 2016, pp. 1-5.

Zhu, Tooth Detection and Segmentation with Mask R-CNN, International Conference on Artificial Intelligence in Information and Communication (ICAIIC), Feb. 2020, pp. 070-072.

Daher, 3D Digital Smile Design With a Mobile Phone and Intraoral Optical Scanner, Compendium of continuing education in dentistry, Jun. 2018, pp. e5-e8, vol. 39, Issue 6.

Ko, Machine Learning in Orthodontics: Application Review, Embracing Novel Technologies in Dentistry and Orthodontics, Mar. 2019, pp. 117-135, vol. 56, Ann Arbor, Michigan, United States.

Hwang, An overview of deep learning in the field of dentistry, Imaging science in dentistry, 2019, pp. 1-7, vol. 49.

De Tobel, An automated technique to stage lower third molar development on panoramic radiographs for age estimation: A pilot study, The Journal of forensic odonto-stomatology, Dec. 2017, pp. 49-60, vol. 35.

Miki, Classification of teeth in cone-beam CT using deep convolutional neural network, Computers in biology and medicine, 2017, pp. 24-29, vol. 80.

Yang, Automated Dental Image Analysis by Deep Learning on Small Dataset, IEEE 42nd Annual Computer Software and Applications Conference (COMPSAC), Jul. 2018, pp. 492-497.

Torosdagli, Deep Geodesic Learning for Segmentation and Anatomical Landmarking, IEEE transactions on medical imaging, Oct. 2018, pp. 919-931, vol. 38.

Lee, Diagnosis And Prediction Of Periodontally Compromised Teeth Using A Deep Learning-Based Convolutional Neural Network Algorithm, Journal of periodontal & implant science, Apr. 2018, pp. 114-123, vol. 48.

Lee, Osteoporosis detection in panoramic radiographs using a deep convolutional neural network-based computer-assisted diagnosis system: a preliminary study, Dentomaxillofacial Radiology, 2019, pp. 1-8, vol. 48.

Dental Treatment Simulation & Smile Design Software, DTS, https://www.dentaltreatmentsimulation.com/, Date Retrieved: Oct. 17, 2022.

Technical is Technical, DTS Pro-Smile Design Software, http://technicalistechnical.com/dts-pro-ai-enabled-smile-design-software-for-digital-dentistry, Date Retrieved: Oct. 17, 2022.

Bshape, 3SHAPE Smile Design, https://www.3shape.com/en/software/trios-smile-design, Date Retrieved: Oct. 17, 2022.

Styleitaliano, Smileline SmileLite MDP, https://products.styleitaliano.org/smileline/smilelite-mdp, Date Retrieved: Oct. 17, 2022.

Styleitaliano, The NEW Smile Capture, https://www.styleitaliano.org/the-new-smile-capture, Date Retrieved: Nov. 15, 2022.

Medical Expo, Digital smile design software Smile Lynx Smile Design, https://www.medicalexpo.com/prod/3d-lynx/product-120113-838963.html, Date Retrieved: Oct. 17, 2022.

Adobe, Start with Photoshop. Amazing will follow, https://www.adobe.com/products/photoshop.html, Date Retrieved: Oct. 17, 2022.

Apple, Presentations that stand out. Beautifully., https://www.apple.com/keynote/, Date Retrieved: Oct. 17, 2022.

Dentalcompare, Cerec SW V4.00 CAD/CAM Software from Dentsply Sirona CAD/CAM, https://www.dentalcompare.com/4522-Chairside-CAD-CAM-Restorations-Dental-CAD-CAM/41234-CEREC-SW-V4-00/, Date Retrieved: Oct. 17, 2022.

Appadvice, Ready for a user-friendly digital smile design app, https://appadvice.com/app/smile-designer-pro/694174039, Date Retrieved: Oct. 17, 2022.

Visagismile, Visagismile is a cutting edge dental software for personalized smile design., https://visagismile.com/, Date Retrieved: Oct. 17, 2022.

(56) References Cited

OTHER PUBLICATIONS

Planmeca, Planmeca Romexi's smile design, https://www.planmeca.com/de/software/softwaremodule/planmeca-romexis-smile-design/, Date Retrieved: Oct. 17, 2022.
Aegisdentalnetwork, Ivoclar Vivadent and 3Shape scale up their collaborative efforts, https://www.aegisdentalnetwork.com/news/2021/01/20/ivoclar-vivadent-and-3shape-scale-up-their-collaborative-efforts, Date Retrieved: Oct. 17, 2022.
Prnewswire, SmileFy Inc Launches Smile Design Software - the Next Generation of Diagnostic Smile Design, https://www.prnewswire.com/news-releases/smilefy-inc-launches-smile-design-software---the-next-generation-of-diagnostic-smile-design-301284721.html, Date Retrieved: Oct. 17, 2022.
Exocad, We are a dynamic and innovative dental CAD/CAM software company., https://exocad.com/company/about-us, Date Retrieved: Oct. 17, 2022.
3shape, Better for them. Better for you., https://www.3shape.com/, Date Retrieved: Oct. 17, 2022.
Kapanu, Applications, https://kapanu.com/applications/, Date Retrieved: Oct. 17, 2022.
Biomedres, Digital Smile Design, https://biomedres.us/fulltexts/BJSTR.MS.ID.005099.php, Date Retrieved: Oct. 17, 2022.
SocialPeta, Dental Shooting Competitive Intelligence | Ad Analysis by SocialPeta, https://socialpeta.com/competitive-intelligence/dental-shooting, Date Retrieved: Oct. 17, 2022.
Imangaliyev, Deep Learning for Classification of Dental Plaque Images, LNCS 10122, pp. 407-410, 2016.
Eun, Oriented tooth localization for periapical dental X-ray images via convolutional neural network, 2016 Asia-Pacific Signal and Information Processing Association Annual Summit and Conference (APSIPA), 2016, pp. 1-7, doi: 10.1109/APSIPA.2016.7820720.
Murata, Towards a Fully Automated Diagnostic System for Orthodontic Treatment in Dentistry, IEEE 13th International Conference on e-Science, 2017, pp. 1-8.
Xu, 3D Tooth Segmentation and Labeling Using Deep Convolutional Neural Networks, IEEE Transactions on Visualization and Computer Graphics, 2019, pp. 2336-2348, vol. 25.
Zhang, An effective teeth recognition method using label tree with cascade network structure, Computerized Medical Imaging and Graphics, Jul. 2018, pp. 61-70, vol. 68.
Wirtz, Automatic Teeth Segmentation in Panoramic X-Ray Images Using a Coupled Shape Model in Combination with a Neural Network, Medical Image Computing and Computer Assisted Intervention, Sep. 2018, pp. 712-719, springer.
Hatvani, Deep Learning-Based Super-Resolution Applied to Dental Computed Tomography, IEEE Transactions on Radiation and Plasma Medical Sciences, Mar. 2019, pp. 120-128, vol. 3, No. 2.
Lee, Detection and diagnosis of dental caries using a deep learning-based convolutional neural network algorithm, Journal of dentistry, 2018, pp. 106-111, vol. 77.
Yauney, Convolutional Neural Network for Combined Classification of Fluorescent Biomarkers and Expert Annotations using White Light Images, IEEE 17th International Conference on Bioinformatics and Bioengineering Oct. 2017, pp. 303-309.
Prajapati, Classification of Dental Diseases Using CNN and Transfer Learning, 5th International Symposium on Computational and Business Intelligence, 2017, pp. 70-74.
Rana, Automated Segmentation of Gingival Diseases from Oral Images, IEEE Healthcare Innovations and Point of Care Technologies, 2017, pp. 144-147.
Imangaliyev, Classification of Quantitative Light-Induced Fluorescence Images Using Convolutional Neural Network, Artificial Neural Networks and Machine Learning, 2017, pp. 778-779, springer.
Du, A Convolutional Neural Network Based Auto-positioning Method for Dental Arch in Rotational Panoramic Radiography, 40th Annual International Conference of the IEEE Engineering in Medicine and Biology Society, 2018, pp. 2615-2618.
Oktay, Tooth detection with Convolutional Neural Networks, Medical Technologies National Congress, Medical Technologies National Congress, 2017, pp. 1-4.
Egger, Fully Convolutional Mandible Segmentation on a valid Ground-Truth Dataset, 40th Annual International Conference of the IEEE Engineering in Medicine and Biology Society, 2018, pp. 656-660.
Karimian, Deep Learning Classifier with Optical Coherence Tomography Images for Early Dental Caries Detection, SPIE BIOS, Jan. 27-Feb. 1, 2018, San Francisco, California, United States.
Lee, Cephalometric Landmark Detection in Dental X-ray Images Using Convolutional Neural Networks, Computer-aided diagnosis, 2017, pp. 1-6, vol. 10134.
Perez-Davidi M. Digital smile design and anterior monolithic restorations chair side fabrication with Cerec Cad/Cam system [abstract]. In: Refuat Hapeh Vehashinayim (1993). Oct. 2015;32(4):15-9, 25.

* cited by examiner

730

732

740

742

760

762

770

772

SYSTEM AND METHOD FOR FACIAL AND DENTAL PHOTOGRAPHY, LANDMARK DETECTION AND MOUTH DESIGN GENERATION

RELATED APPLICATIONS

This application claims the benefit of U.S. Provisional Patent Application No. 63/137,226, filed Jan. 14, 2021, which is incorporated herein by reference in its entirety. This application claims priority to Iran Patent Application No. 139950140003009179, filed Jan. 14, 2021, which is incorporated herein by reference in its entirety.

BACKGROUND

Patients are provided with dental treatments for maintaining dental health, improving dental aesthetics, etc. However, many aspects of dental photography, such as dental photography, landmark analysis, etc. can be time consuming and/or inaccurate.

DETAILED DESCRIPTION

Figure 1:
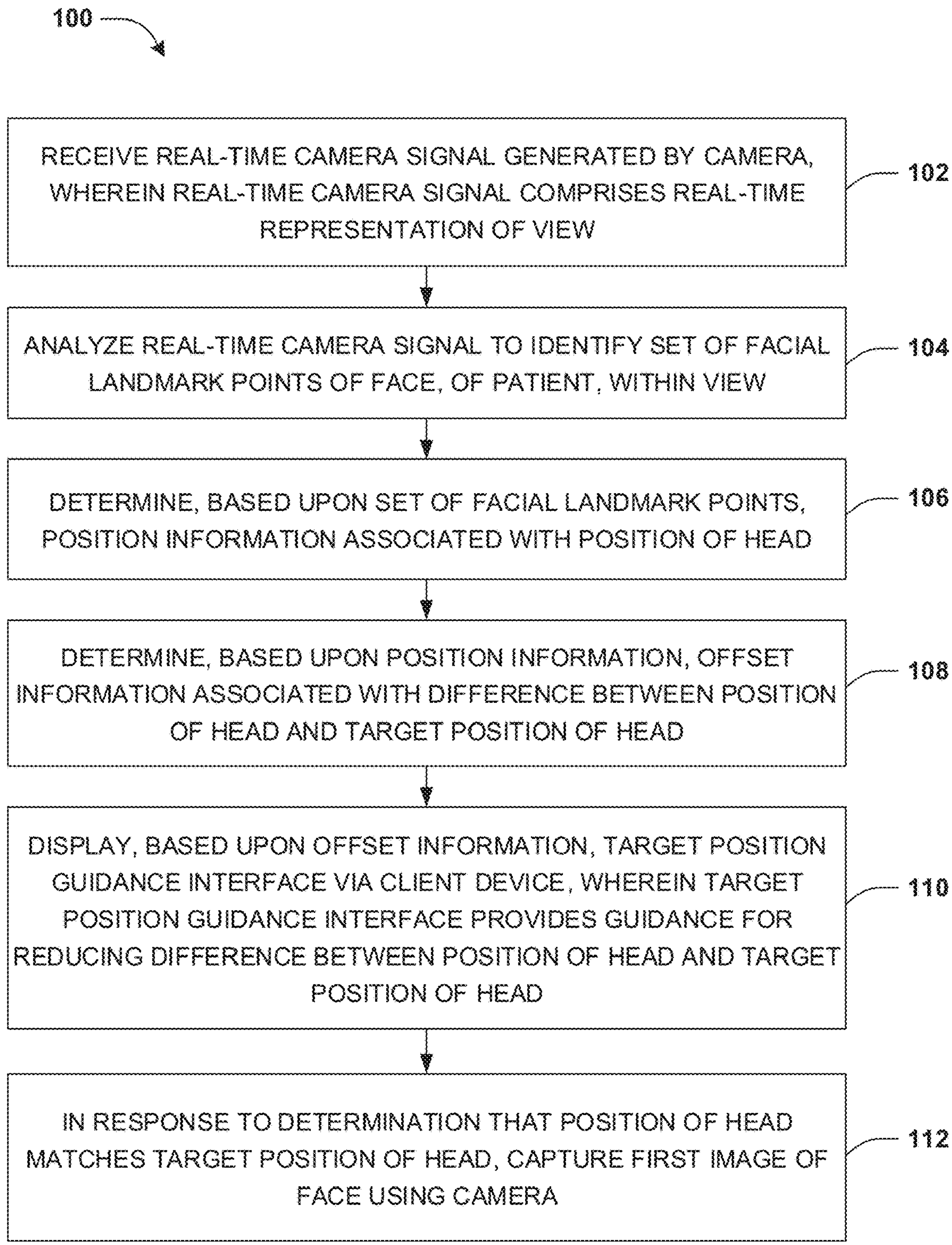
FIG. 1 is an illustration of an example method for capturing images of faces, teeth, lips and/or gums.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

One or more system and/or techniques for capturing images, detecting landmarks and/or generating mouth designs are provided. One of the difficulties of facial and/or dental photography is that it may be very time consuming, and in some cases impossible, to capture an image of a patient in the correct position with full accuracy. In some cases, in order to save a dental treatment professional's time, the dental treatment professional refers the patient to an imaging center, which is time consuming and expensive for the patient, and images taken at the imaging center may not be accurate, such as due to human error. Alternatively and/or additionally, photographer errors and/or patient head movement may cause low accuracy and/or low reproducibility of captured images. Thus, in accordance with one or more of the techniques provided herein, a target position guidance interface may be used to guide a camera operator to capture an image of the patient in a target position, wherein the image may be captured automatically when the target position is achieved, thereby providing for at least one of a reduction in human errors, an increased accuracy of captured images, etc. Alternatively and/or additionally, due to the increased accuracy of captured images, landmark detection and/or analysis using the captured images may be performed more accurately, which may provide for better treatment for the patient and greater patient satisfaction. Alternatively and/or additionally, due to the increased accuracy of captured images, mouth designs may be generated more accurately using the captured images.

An embodiment for capturing images (e.g., photographs) of faces, teeth, lips and/or gums is illustrated by an example method 100 of FIG. 1. In some examples, an image capture system is provided. A first client device associated with the first patient may access and/or interact with an image capture interface associated with the image capture system. The first client device may be at least one of a phone, a smartphone, a wearable device, a laptop, a tablet, a computer, etc. The image capture system and/or the image capture interface may be used to capture one or more first images (e.g., one or more dental photographs) of a first patient, such as one or more images of a face of the first patient, one or more images of teeth of the first patient, one or more images of lips of the first patient, one or more images of one or more oral cavities of the first patient and/or one or more images of gums of the first patient. In some examples, the one or more first images may be used by a dental treatment professional (e.g., a dentist, a mouth design dentist, an orthodontist, a dental technician, a mouth design technician, etc.) to diagnose and/or treat one or more conditions of the user. Alternatively and/or additionally, the one or more first images may be used to determine landmark information associated with the first patient (such as discussed herein with respect to example method 800 of FIG. 8). Alternatively and/or additionally, the one or more first images may be used to generate one or more mouth designs for the first patient (such as discussed herein with respect to example method 2700 of FIG. 27).

At 102, a first real-time camera signal generated by a camera may be received. In an example, the first real-time camera signal comprises a real-time representation of a view. In some examples, the camera may be operatively coupled to the first client device. In an example, the first client device may be a camera phone and/or the camera may be disposed in the camera phone. In some examples, the image capture interface (displayed via the first client device, for example) may display (in real time, for example) the real-time representation of the first real-time camera signal (e.g., the real-time representation may be viewed by a user via the image capture interface). Alternatively and/or additionally, the image capture interface may display (in real time, for example) a target position guidance interface for guiding a camera operator (e.g., a person that is holding the camera and/or controlling a position of the camera) and/or the first patient to achieve a target position of a head of the first patient within the view of the first real-time camera signal. The camera operator may be the first patient (e.g., the first patient may be using the image capture interface to capture one or more images of themselves) or a different user (e.g., a dental treatment professional or other person).

Figure 2:
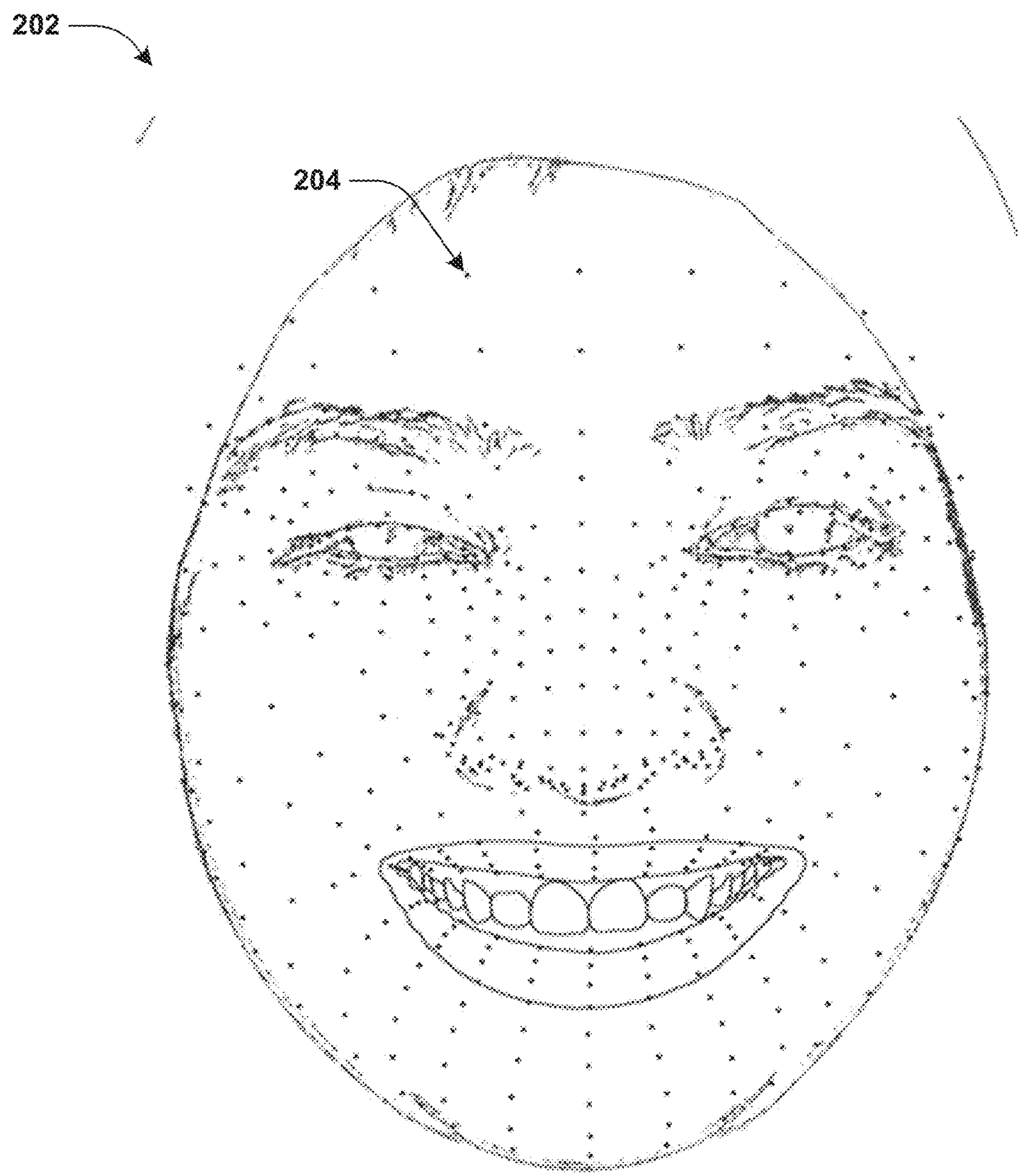
FIG. 2 illustrates an example of a set of facial landmark points.

At 104, the first real-time camera signal is analyzed to identify a set of facial landmark points of the face, of the first patient, within the view of the first real-time camera signal. In some examples, the set of facial landmark points may be determined using a facial landmark point identification model (e.g., a machine learning model for facial landmark point identification). The facial landmark point identification model may comprise a neural network model trained to detect the set of facial landmark points. In an example, the facial landmark point identification model may be trained using a plurality of images, such as images of a dataset (e.g., BIWI dataset or other dataset). In an example, the plurality of images may comprise images in multiple views, images with multiple head positions, images with multiple mouth states, etc. In an example, the set of facial landmark points may comprise 468 facial landmark points (or other quantity of facial landmark points) of the face of the first patient. In an example, the set of facial landmark points may be determined using a MediaPipe Face Mesh system or other system (comprising the facial landmark point identification model, for example). FIG. 2 illustrates an example of the set of facial landmark points (shown with reference number 204) determined based upon the real-time representation (shown with reference number 202) of the first real-time camera signal. In some examples, one or more portions of the real-time representation 202 corresponding to one or more areas of the first patient may not be considered when determining the set of facial landmark points 204 (and/or facial landmark points of the one or more areas of the first patient may not be included in the set of facial landmark points 204). In an example, the one or more areas of the first patient may comprise a mouth area of the first patient (such as an area within inner boundaries of lips of the user and/or an area within outer boundaries of lips of the user) and/or other area of the first area. In some examples, not considering the one or more portions of the real-time representation 202 when determining the set of facial landmark points 204 (and/or not including facial landmark points of the one or more areas of the first patient in the set of facial landmark points 204) may increase an accuracy of head pose estimation (discussed below). For example, landmark points of the one or more areas (e.g., the mouth area) may not be considered for performing the head pose estimation which may result in a reduced amount of error in the head pose estimation that may occur due to changes of a mouth state (e.g., smile state, closed lips state, etc.) of the first patient.

Figure 3A:
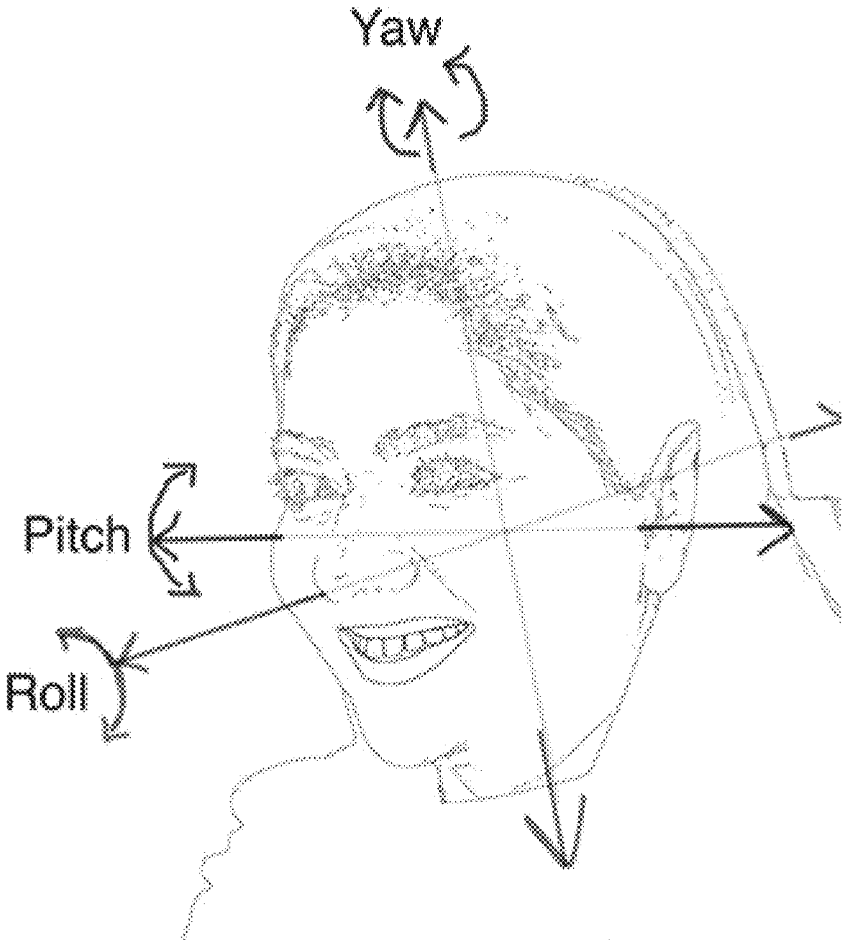
FIG. 3A illustrates examples of a roll axis, a yaw axis and a pitch axis.

At 106, position information associated with a position of the head (e.g., a current position of the head) may be determined based upon the set of facial landmark points. In an example, the position information (e.g., current position information) may be indicative of the position of the head within the view of the first real-time camera signal. For example, the position of the head may correspond to an angular position of the head relative to the camera. In an example, the position information may comprise a roll angular position of the head (relative to the camera, for example), a yaw angular position of the head (relative to the camera, for example) and/or a pitch angular position of the head (relative to the camera, for example). The roll angular position of the head may be an angular position of the head, relative to a roll zero degree angle, along a roll axis. The yaw angular position of the head may be an angular position of the head, relative to a yaw zero degree angle, along a yaw axis. The pitch angular position of the head may be an angular position of the head, relative to a pitch zero degree angle, along a pitch axis. Examples of the roll axis, the yaw axis and the pitch axis are shown in FIG. 3A.

In some examples, head pose estimation is performed based upon the set of facial landmark points to determine the position information. For example, the head pose estimation may be performed using a head pose estimation model (e.g., a machine learning model for head pose estimation). In an example, the head pose estimation model may be trained using a plurality of images, such as images of a dataset (e.g., BIWI dataset or other dataset). In an example, the plurality of images may comprise images in multiple views, images with multiple facial positions, images with multiple mouth states, etc.

Figure 3B:
FIG. 3B illustrates an example of a view of a face in frontal position.
Figure 3C:
FIG. 3C illustrates an example of a view of a face in lateral position.
Figure 3D:
FIG. 3D illustrates an example of a view of a face in ¾ position.
Figure 3E:
FIG. 3E illustrates an example of a view of a face in 12 o'clock position.

At 108, based upon the position information, offset information associated with a difference between the position of the head and a first target position of the head may be determined. In an example, the first target position of the head may correspond to a target angular position of the head relative to the camera. The first target position may be frontal position, lateral position, ¾ position, 12 o'clock position, or other position. FIG. 3B shows an example of a view of the face in the frontal position. In an example, the frontal position may correspond to a roll angular position of zero degrees, a yaw angular position of zero degrees and a pitch angular position of zero degrees. FIG. 3C shows an example of a view of the face in the lateral position. In an example, the lateral position may correspond to a roll angular position of zero degrees, a yaw angular position of 90 degrees and a pitch angular position of zero degrees. FIG. 3D shows an example of a view of the face in the ¾ position. In an example, the ¾ position may correspond to a roll angular position of zero degrees, a yaw angular position of 45 degrees and a pitch angular position of zero degrees. FIG. 3E shows an example of a view of the face in the 12 o'clock position. In an example, the 12 o'clock position may correspond to a roll angular position of zero degrees, a yaw angular position of zero degrees and a pitch angular position of M degrees. In some examples, M may be the highest value of the pitch angular position in which one or more areas (e.g., at least one of teeth, one or more lips, one or more boundaries of one or more lips, one or more wet lines of one or more lips, one or more dry lines of one or more lips, etc.) of the first patient are viewed by the camera (e.g., M is not so large that the camera does not view and/or cannot capture the one or more areas of the first patient).

In some examples, the offset information is determined based upon the position information and target position information associated with the first target position. The target position information may be indicative of the first target position of the head within the view of the first real-time camera signal (e.g., the first target position of the head relative to the camera). The target position information may comprise a target roll angular position of the head (relative to the camera, for example), a target yaw angular position of the head (relative to the camera, for example) and/or a target pitch angular position of the head (relative to the camera, for example). In an example, the offset information may comprise a difference between the roll angular position (of the position information) and the target roll angular position (of the target position information), a difference between the yaw angular position (of the position information) and the target yaw angular position (of the target position information) and/or a difference between the pitch angular position (of the position information) and the target pitch angular position (of the target position information).

In an example in which the first target position is frontal position, the target position information may comprise a target roll angular position of zero degrees, a target yaw angular position of zero degrees and/or a target pitch angular position of zero degrees. In an example in which the first target position is lateral position, the target position information may comprise a target roll angular position of zero degrees, a target yaw angular position of 90 degrees and/or a target pitch angular position of zero degrees. In an example in which the first target position is ¾ position, the target position information may comprise a target roll angular position of zero degrees, a target yaw angular position of 45 degrees and/or a target pitch angular position of zero degrees. In an example in which the first target position is 12 o'clock position, the target position information may comprise a target roll angular position of zero degrees, a target yaw angular position of zero degrees and/or a target pitch angular position of M degrees.

At 110, the target position guidance interface may be displayed based upon the offset information. The target position guidance interface provides guidance for reducing the difference between the difference between the position of the head (indicated by the position information, for example) and the first target position (indicated by the target position information, for example). For example, the target position guidance interface provides guidance for achieving the first target position of the head within the view of the first real-time camera signal (e.g., the first target position of the head may be when the position of the head matches the first target position of the head). In an example, the target position guidance interface indicates a first direction in which motion of the camera (and/or the first client device) reduces the difference between the position of the head and the first target position and/or a second direction in which motion of the head of the first patient reduces the difference between the position of the head and the first target position. Accordingly, a position of the camera and/or the head of the first patient may be adjusted, based upon the target position guidance interface, to achieve the first target position of the head within the view of the first real-time camera signal. For example, the camera may be moved in the first direction and/or the head of the first patient may move in the second direction to achieve the first target position of the head within the view of the first real-time camera signal. In some examples, the first direction may be a direction of rotation of the camera and/or the second direction may be a direction of rotation of the face of the first patient.

In some examples, the set of facial landmark points, the position information, and/or the offset information may be determined and/or updated (in real time, for example) continuously and/or periodically to update (in real time, for example) the target position guidance interface based upon the offset information such that the target position guidance interface provides accurate and/or real time guidance for adjusting the position of the head relative to the camera.

FIGS. 4A-4D illustrate examples of the target position guidance interface being displayed via the first client device (shown with reference number 400). In the examples shown in FIGS. 4A-4D, the first target position is frontal position (e.g., the target position guidance interface provides guidance to achieve frontal position of the head within the view of the first real-time camera signal). It may be appreciated that one or more of the techniques provided herein with respect to providing guidance for achieving frontal position may be used for providing guidance for achieving a different position, such as at least one of lateral position, ¾ position, 12 o'clock position, etc.

Figure 4A:
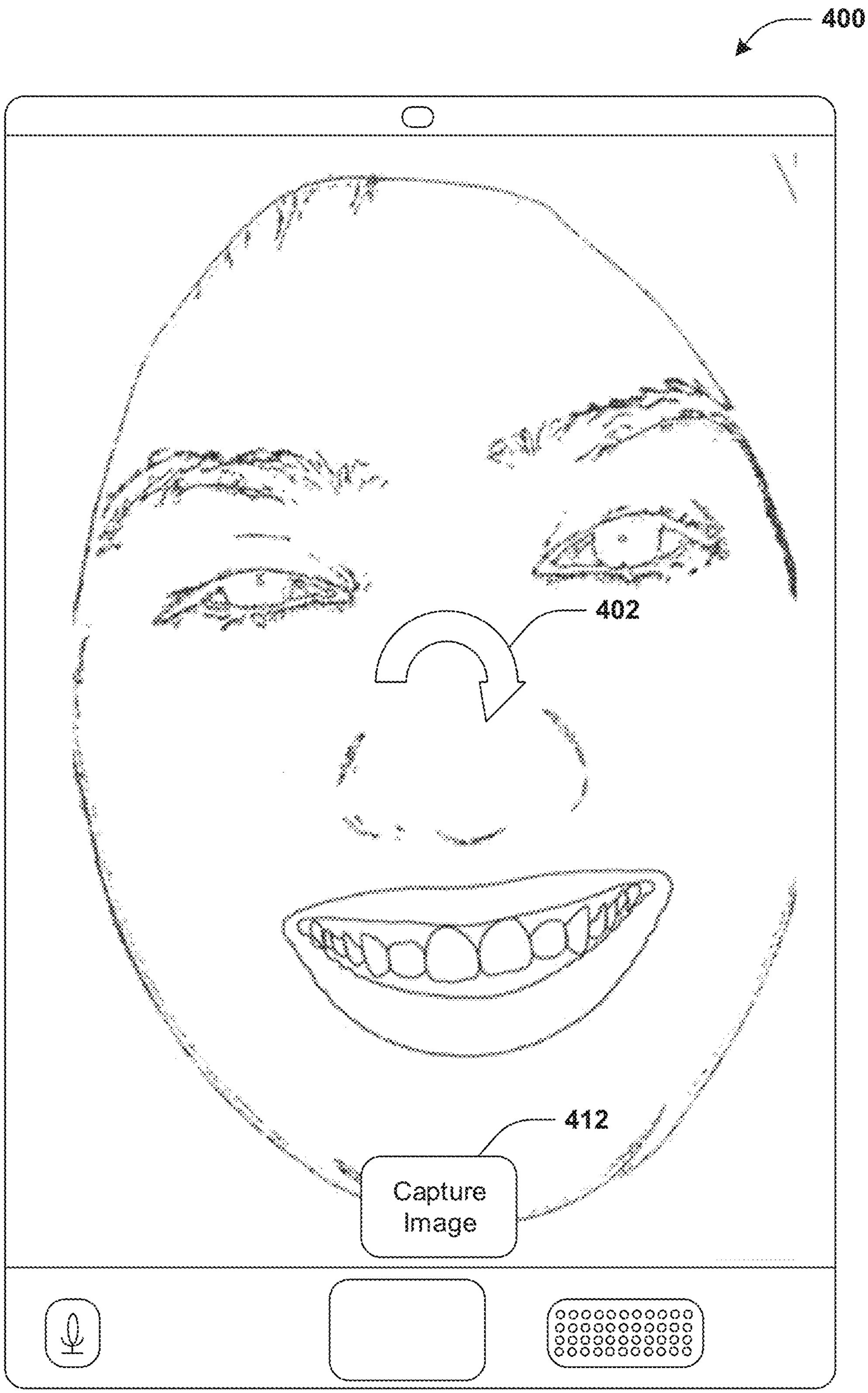
FIGS. 4A-4D illustrate examples of a target position guidance interface being displayed via a first client device.

FIG. 4A illustrates the target position guidance interface being displayed when there is a deviation of the roll angular position of the head from the target roll angular position of the first target position (e.g., frontal position). For example, the image capture interface may display (in real time, for example) the view of the first real-time camera signal and the target position guidance interface overlaying the view of the first real-time camera signal. In the example shown in FIG. 4A, the target position guidance interface comprises a graphical object 402 indicating a direction (e.g., a direction of rotation along the roll axis) in which motion of the head reduces the difference between the position of the head and the first target position (e.g., frontal position). Alternatively and/or additionally, the target position guidance interface may comprise a graphical object (not shown) that indicates a direction (e.g., opposite to the direction indicated by the graphical object 402) in which motion of the camera reduces the difference between the position of the head and the first target position (e.g., frontal position). In the example shown in FIG. 4A, the graphical object 402 may comprise an arrow.

Figure 4B:
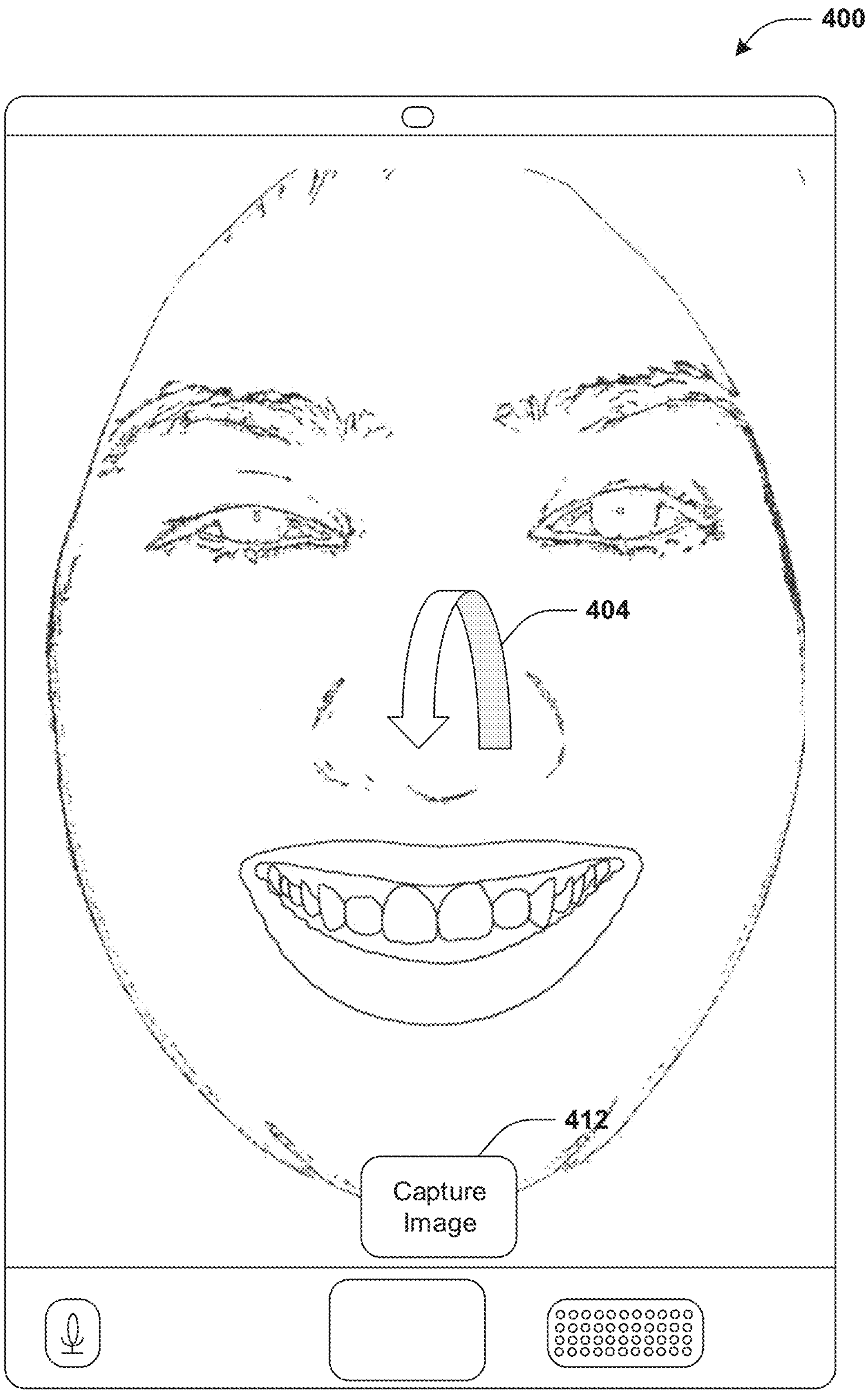

FIG. 4B illustrates the target position guidance interface being displayed when there is a deviation of the pitch angular position of the head from the target pitch angular position of the first target position (e.g., frontal position). In the example shown in FIG. 4B, the target position guidance interface comprises a graphical object 404 indicating a direction (e.g., a direction of rotation along the pitch axis) in which motion of the head reduces the difference between the position of the head and the first target position (e.g., frontal position). Alternatively and/or additionally, the target position guidance interface may comprise a graphical object (not shown) that indicates a direction (e.g., opposite to the direction indicated by the graphical object 404) in which motion of the camera reduces the difference between the position of the head and the first target position (e.g., frontal position). In the example shown in FIG. 4B, the graphical object 404 may comprise an arrow.

Figure 4C:
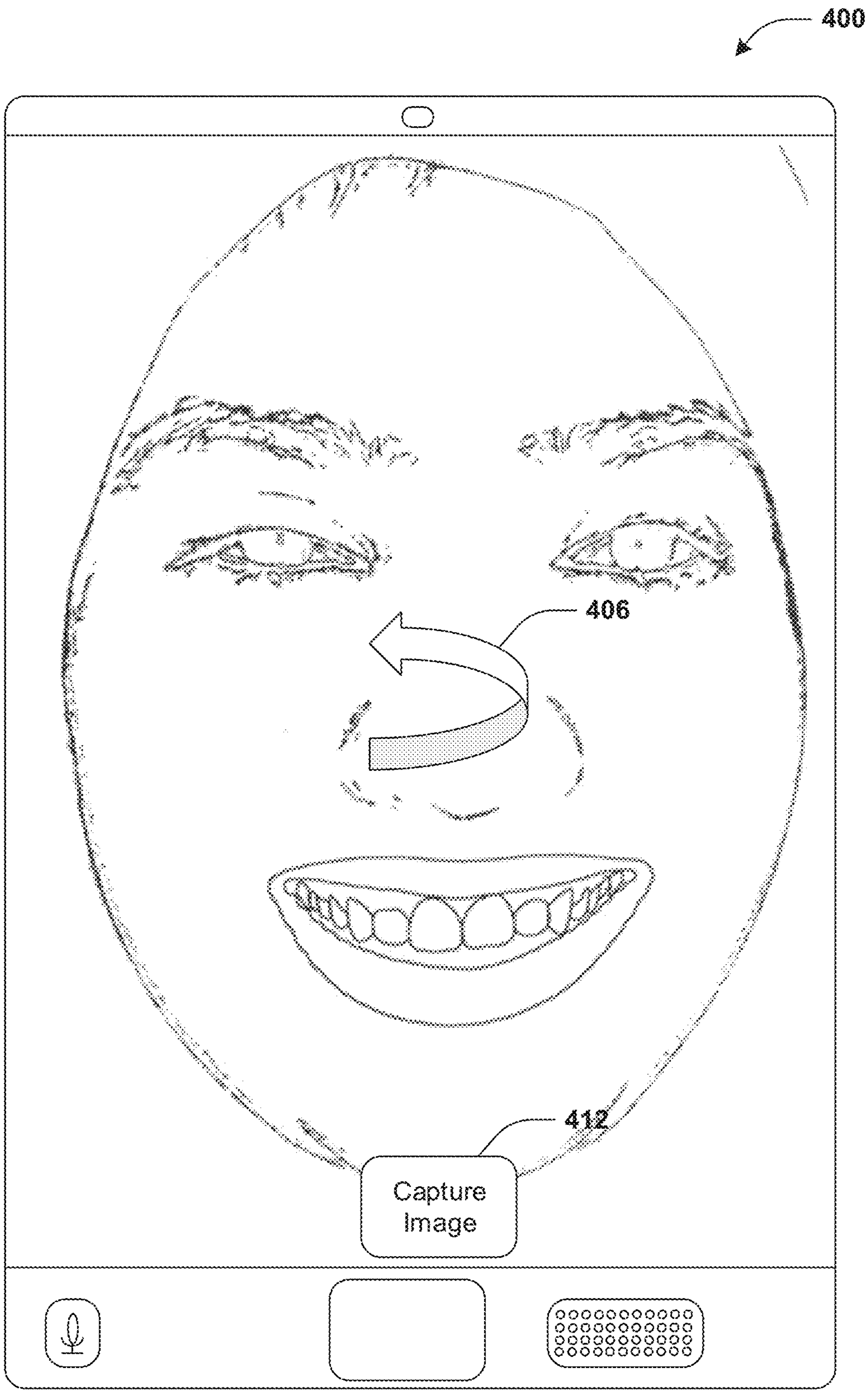

FIG. 4C illustrates the target position guidance interface being displayed when there is a deviation of the yaw angular position of the head from the target yaw angular position of the first target position (e.g., frontal position). In the example shown in FIG. 4C, the target position guidance interface comprises a graphical object 406 indicating a direction (e.g., a direction of rotation along the yaw axis) in which motion of the head reduces the difference between the position of the head and the first target position (e.g., frontal position). Alternatively and/or additionally, the target position guidance interface may comprise a graphical object (not shown) that indicates a direction (e.g., opposite to the direction indicated by the graphical object 406) in which motion of the camera reduces the difference between the position of the head and the first target position (e.g., frontal position). In the example shown in FIG. 4C, the graphical object 406 may comprise an arrow.

Figure 4D:
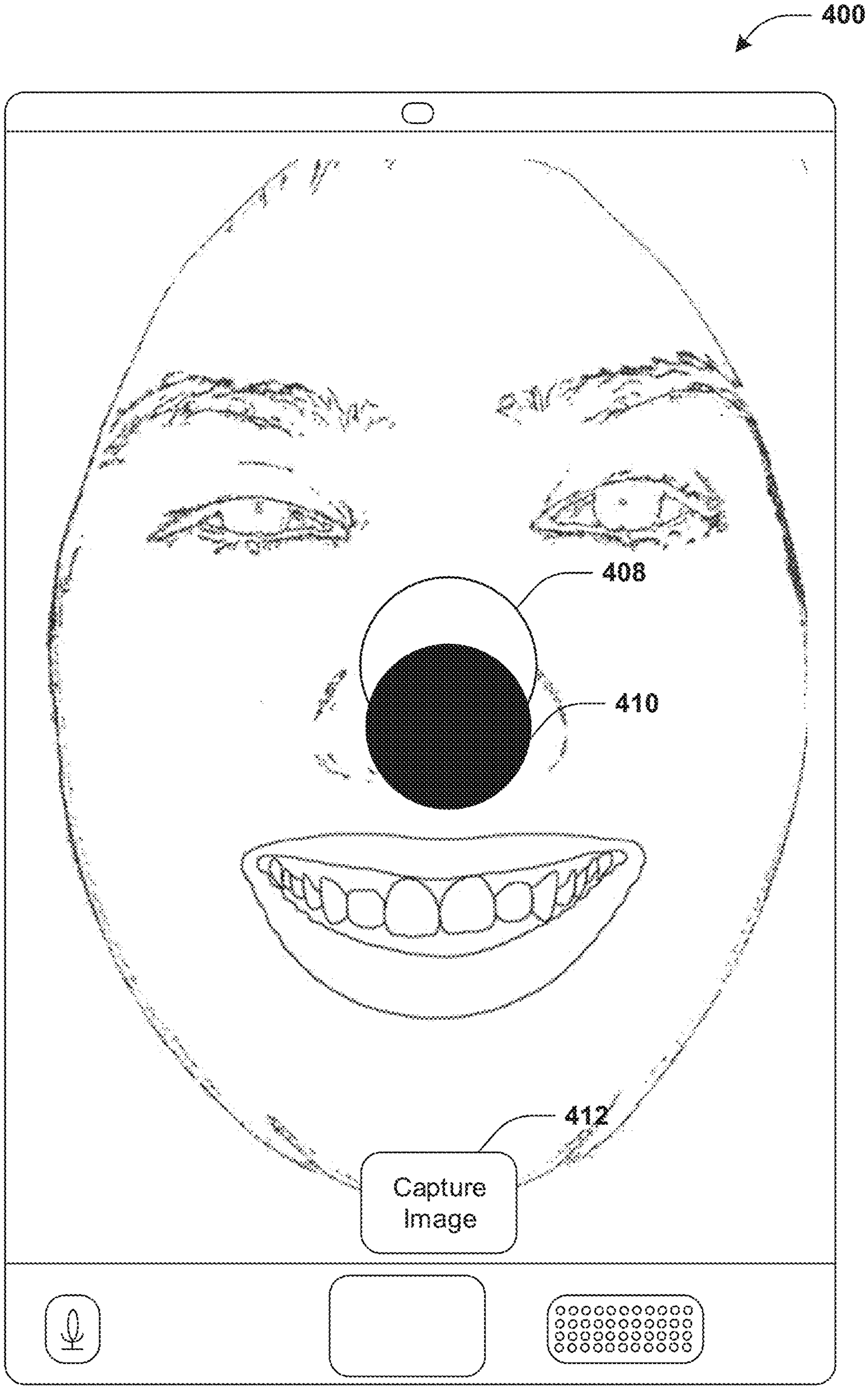

FIG. 4D illustrates an example of the target position guidance interface, comprising one or more graphical objects (other than an arrow, for example), when there is a deviation of the pitch angular position of the head from the target pitch angular position of the first target position (e.g., frontal position). For example, the one or more graphical objects may be used instead of (and/or in addition to) one or more arrows (e.g., shown in FIGS. 4A-4C). The one or more graphical objects may comprise a first graphical object 408 (e.g., a first circle, such as an unfilled circle) and/or a second graphical object 410 (e.g., a second circle, such as a filled circle). A position of first graphical object 408 and/or a position of the second graphical object 410 in the image capture interface may be based upon the offset information. The second graphical object 410 may be offset from the first graphical object 408 when the position of the head is not the first target position. In some examples, the first target position of the head is achieved when the second graphical object 410 is within (and/or overlaps with) the first graphical object 408.

At 112, a first image of the face is captured using the camera in response to a determination that the position of the head matches the first target position of the head. In some examples, it may be determined that the position of the head matches the first target position of the head based upon a determination that a difference between the position of the head and the first target position of the head is smaller than a threshold difference (e.g., the difference may be determined based upon the offset information). In an example, the first image of the face is captured automatically in response to the determination that the position of the head matches the first target position of the head. Alternatively and/or additionally, the first image of the face is captured in response to selection of an image capture selectable input (e.g., selectable input 412, shown in FIGS. 4A-4D, displayed via the image capture interface). In some examples, the first image of the face is captured in response to selection of the image capture selectable input based upon the determination that the position of the head matches the first target position of the head (e.g., if the position of the head is determined not to match the first target position of the head, the first image may not be captured). In some examples, the image capture selectable input may be displayed via the image capture interface in response to the determination that the position of the head matches the first target position of the head.

In some examples, for capturing the first image, an angular position (e.g., the roll angular position of the head, the yaw angular position of the head and/or the pitch angular position of the head) of the head may be disregarded by the image capture system. For example, after the first image is captured, the first image may be modified to correct a deviation of the angular position of the head from a target angular position corresponding to the angular position. The position of the head of the first patient may match the first target position after the first image is modified to correct the deviation. In a first example, the first target position may be frontal position and the roll angular position of the head may be disregarded when using the target position guidance interface to provide guidance for achieving the first target position of the head and/or when determining whether or not the position of the head matches the first target position. In the first example, the first image may be captured when there is a deviation of the roll angular position of the head from the target roll angular position of the first target position, wherein the first image may be modified (e.g., by rotating at least a portion of the first image based upon the deviation) to correct the deviation. In a second example, the first target position may be lateral position and the pitch angular position of the head may be disregarded when using the target position guidance interface to provide guidance for achieving the first target position of the head and/or when determining whether or not the position of the head matches the first target position. In the second example, the first image may be captured when there is a deviation of the pitch angular position of the head from the target pitch angular position of the first target position, wherein the first image may be modified (e.g., by rotating at least a portion of the first image based upon the deviation) to correct the deviation.

In some examples, the first image may be captured when a mouth of the first patient is in a first state. The first state may be smile state (e.g., a state in which the first patient is smiling), closed lips state (e.g., a state in which the mouth of the first patient is in a closed lips position, such as when lips of the user are closed and/or teeth of the user are not exposed), rest state (e.g., a state in which lips of the first patient is in a resting position), a vocalization state of one or more vocalization states (e.g., a state in which the first patient pronounces a term and/or a letter such as at least one of "e", "s", "f", "v", "emma", etc.), a retractor state (e.g., a state in which a retractor, such as a lip retractor, is in the mouth of the first patient and/or teeth of the first patient are exposed using the retractor, such as where lips of the first patient are retracted using the retractor), a rubber dam state (e.g., a state in which a rubber dam is in the mouth of the first patient), a contractor state (e.g., a state in which a contractor is in the mouth of the first patient), a shade guide state (e.g., a state in which a shade guide is in the mouth of the first patient), a mirror state (e.g., a state in which a mirror is in the mouth of the first patient), and/or other state.

In some examples, the image capture interface may display an instruction associated with the first state, such as an instruction to smile, an instruction to pronounce a letter (e.g., "e", "s", "f", "v", etc.), an instruction to pronounce a term (e.g., "emma" or other term), an instruction to maintain a resting position, an instruction to maintain a closed-lips position, an instruction to insert a retractor into the mouth of the first patient, an instruction to insert a rubber dam into the mouth of the first patient, an instruction to insert a contractor into the mouth of the first patient, an instruction to insert a shade guide into the mouth of the first patient, an instruction to insert a mirror into the mouth of the first patient, and/or other instruction.

In some examples, the first image is captured in response to a determination that the mouth of the first patient is in the first state (and the position of the head of the first patient matches the target position, for example). In an example in which the first state is the smile state, the first image may be captured in response to a determination that the first patient is smiling (e.g., the determination that the first patient is smiling may be performed by performing image analysis, such as using one or more image processing techniques, on the first real-time camera signal). In an example in which the first state is the closed lips state, the first image may be captured in response to a determination that the mouth of the first patient is in the closed lips position, such as when lips of the user are closed and/or teeth of the user are not exposed (e.g., the determination that the mouth of the first patient is in the closed lips position may be performed by performing image analysis, such as using one or more image processing techniques, on the first real-time camera signal). In an example in which the first state is the rest state, the first image may be captured in response to a determination that lips of the first patient is in the resting position (e.g., the determination that lips of the first patient is in the resting position may be performed by performing image analysis, such as using one or more image processing techniques, on the first real-time camera signal). In an example in which the first state is a vocalization state, the first image may be captured in response to identifying vocalization of a letter or term corresponding to the vocalization state (e.g., identifying vocalization of the letter or the term may be performed by performing audio analysis on a real-time audio signal received from a microphone, such as a microphone of the first client device 400), wherein the first image may be captured during the vocalization (of the letter or the term) or upon (and/or after) completion of the vocalization (of the letter or the term). In an example in which the first state is the retractor state, the first image may be captured in response to a determination that a retractor is in the mouth of the first patient (e.g., the determination that the retractor is in the mouth of the first patient may be performed by performing image analysis, such as using one or more image processing techniques, on the first real-time camera signal). In an example in which the first state is the rubber dam state, the first image may be captured in response to a determination that a rubber dam is in the mouth of the first patient (e.g., the determination that the rubber dam is in the mouth of the first patient may be performed by performing image analysis, such as using one or more image processing techniques, on the first real-time camera signal). In an example in which the first state is the contractor state, the first image may be captured in response to a determination that a contractor is in the mouth of the first patient (e.g., the determination that the contractor is in the mouth of the first patient may be performed by performing image analysis, such as using one or more image processing techniques, on the first real-time camera signal). In an example in which the first state is the shade guide state, the first image may be captured in response to a determination that a shade guide is in the mouth of the first patient (e.g., the determination that the shade guide is in the mouth of the first patient may be performed by performing image analysis, such as using one or more image processing techniques, on the first real-time camera signal). In an example in which the first state is the mirror state, the first image may be captured in response to a determination that a mirror is in the mouth of the first patient (e.g., the determination that the mirror is in the mouth of the first patient may be performed by performing image analysis, such as using one or more image processing techniques, on the first real-time camera signal).

Figure 5A:
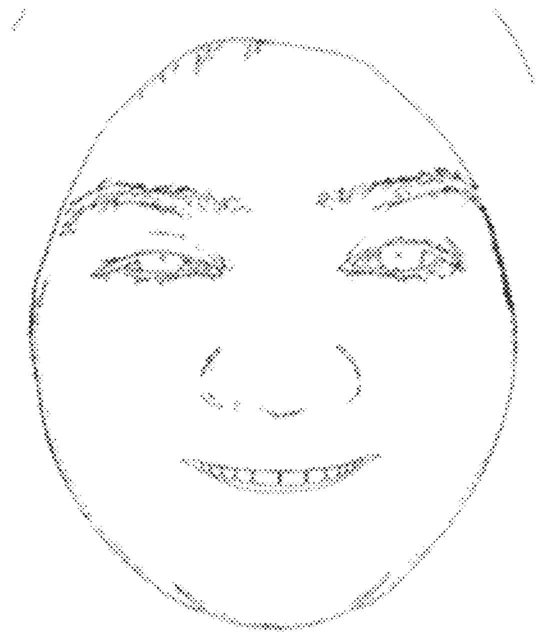
FIG. 5A illustrates an example view in which a mouth of a first patient is in a vocalization state associated with a first patient pronouncing the letter "e".
Figure 5B:
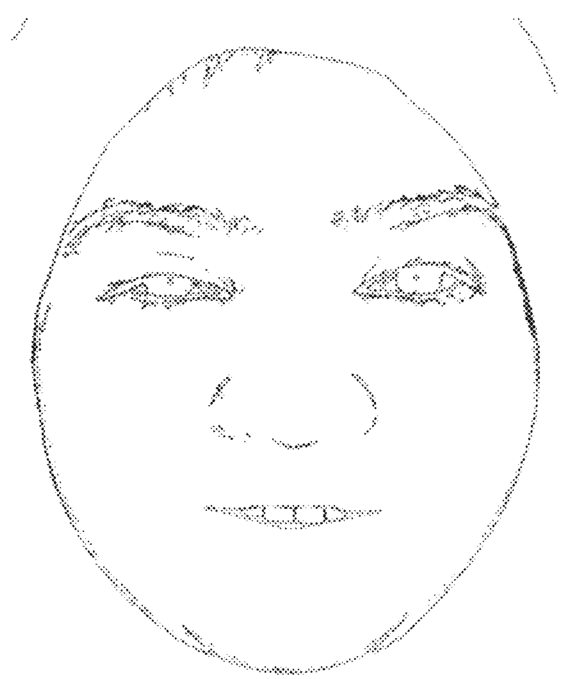
FIG. 5B illustrates an example view in which a mouth of a first patient is in a vocalization state associated with the first patient pronouncing the term "emma".
Figure 5C:
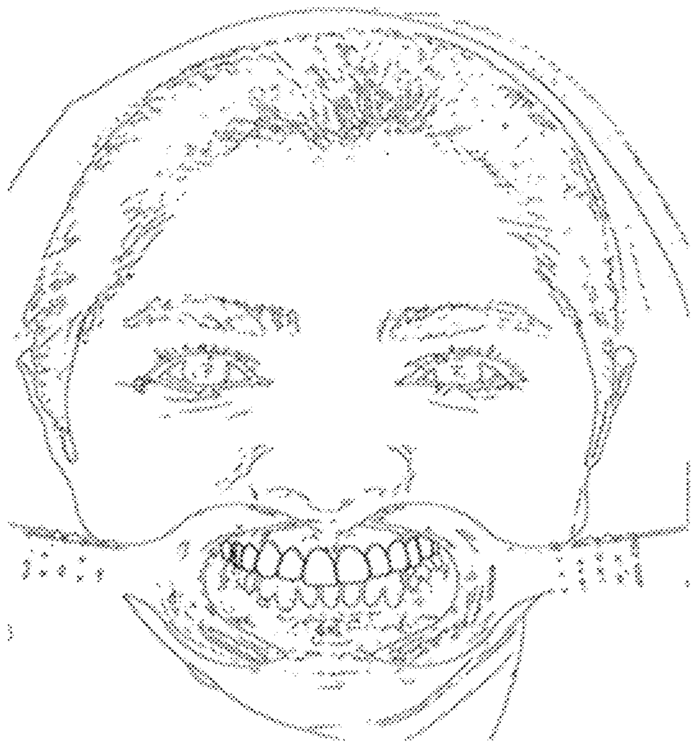
FIG. 5C illustrates an example view in which a mouth of a first patient is in retractor state.

FIG. 3B illustrates an example view in which the mouth of the first patient is in the smile state (e.g., the first image may comprise the example view of FIG. 3B, such as where the first image is captured while the first patient smiles). FIG. 5A illustrates an example view in which the mouth of the first patient is in a vocalization state associated with the first patient pronouncing the letter "e" (e.g., the first image may comprise the example view of FIG. 5A, such as where the first image is captured while the first patient pronounces the letter "e"). FIG. 5B illustrates an example view in which the mouth of the first patient is in a vocalization state associated with the first patient pronouncing the term "emma" (e.g., the first image may comprise the example view of FIG. 5B, such as where the first image is captured while or after the first patient pronounces the term "emma"). Alternatively and/or additionally, the example view of FIG. 5B may correspond to the mouth of the first patient being in the rest state. FIG. 5C illustrates an example view in which the mouth of the first patient is in the retractor state (e.g., the first image may comprise the example view of FIG. 5C, such as where the first image is captured when a retractor is in the mouth of the first patient).

In some examples, in response to capturing the first image of the face (and/or modifying the first image to correct a deviation of an angular position from a target angular position), the first image may be stored on memory of the first client device 400 and/or a different device (e.g., a server or other type of device). The first image may be included in a first patient profile associated with the first patient. The first patient profile may be stored on the first client device 400 and/or a different device (e.g., a server or other type of device).

In some examples, the first image may be captured in an image capture process in which a plurality of images of the first patient, comprising the first image, are captured. For example, the plurality of images may be captured sequentially. In some examples, the plurality of images may comprise a plurality of sets of images associated with a plurality of facial positions. The plurality of facial positions may comprise frontal position, lateral position, ¾ position, 12 o'clock position and/or one or more other positions. For example, the plurality of images may comprise a first set of images (e.g., a first set of one or more images) associated with the frontal position, a second set of images (e.g., a second set of one or more images) associated with the lateral position, a third set of images (e.g., a third set of one or more images) associated with the ¾ position, a fourth set of images (e.g., a fourth set of one or more images) associated with the 12 o'clock position and/or one or more other sets of images associated with one or more other positions. Each set of images of the plurality of sets of images may comprise one or more images associated with one or more mouth states. For example, the first set of images (e.g., one or more images in which a position of the head of the first patient is in frontal position) may comprise one or more images (e.g., an image of a close up view and/or an image of a non-close up view) in which the mouth of the first patient is in the smile state, one or more images (e.g., an image of a close up view and/or an image of a non-close up view) in which the mouth of the first patient is in the closed lips state, one or more images (e.g., an image of a close up view and/or an image of a non-close up view) in which the mouth of the first patient is in the rest state, one or more images (e.g., an image of a close up view and/or an image of a non-close up view) in which the mouth of the first patient is in a vocalization state associated with the first patient pronouncing the term "emma", one or more images (e.g., an image of a close up view and/or an image of a non-close up view) in which the mouth of the first patient is in a vocalization state associated with the first patient pronouncing the letter "e", one or more images (e.g., an image of a close up view and/or an image of a non-close up view) in which the mouth of the first patient is in a vocalization state associated with the first patient pronouncing the letter "s", one or more images (e.g., an image of a close up view and/or an image of a non-close up view) in which the mouth of the first patient is in a vocalization state associated with the first patient pronouncing the letter "f", one or more images (e.g., an image of a close up view and/or an image of a non-close up view) in which the mouth of the first patient is in a vocalization state associated with the first patient pronouncing the letter "v", one or more images (e.g., an image of a close up view and/or an image of a non-close up view) in which the mouth of the first patient is in the retractor state, one or more images (e.g., an image of a close up view and/or an image of a non-close up view) in which the mouth of the first patient is in the rubber dam state, one or more images (e.g., an image of a close up view and/or an image of a non-close up view) in which the mouth of the first patient is in the contractor state, one or more images (e.g., an image of a close up view and/or an image of a non-close up view) in which the mouth of the first patient is in the shade guide state and/or one or more images (e.g., an image of a close up view and/or an image of a non-close up view) in which the mouth of the first patient is in the mirror state. Alternatively and/or additionally, the second set of images (e.g., one or more images in which a position of the head of the first patient is in lateral position) may comprise one or more images (e.g., an image of a close up view and/or an image of a non-close up view) in which the mouth of the first patient is in the smile state, one or more images (e.g., an image of a close up view and/or an image of a non-close up view) in which the mouth of the first patient is in the closed lips state, one or more images (e.g., an image of a close up view and/or an image of a non-close up view) in which the mouth of the first patient is in the rest state, one or more images (e.g., an image of a close up view and/or an image of a non-close up view) in which the mouth of the first patient is in a vocalization state associated with the first patient pronouncing the term "emma", one or more images (e.g., an image of a close up view and/or an image of a non-close up view) in which the mouth of the first patient is in a vocalization state associated with the first patient pronouncing the letter "e", one or more images (e.g., an image of a close up view and/or an image of a non-close up view) in which the mouth of the first patient is in a vocalization state associated with the first patient pronouncing the letter "s", one or more images (e.g., an image of a close up view and/or an image of a non-close up view) in which the mouth of the first patient is in a vocalization state associated with the first patient pronouncing the letter "f", one or more images (e.g., an image of a close up view and/or an image of a non-close up view) in which the mouth of the first patient is in a vocalization state associated with the first patient pronouncing the letter "v", one or more images (e.g., an image of a close up view and/or an image of a non-close up view) in which the mouth of the first patient is in the retractor state, one or more images (e.g., an image of a close up view and/or an image of a non-close up view) in which the mouth of the first patient is in the rubber dam state, one or more images (e.g., an image of a close up view and/or an image of a non-close up view) in which the mouth of the first patient is in the contractor state, one or more images (e.g., an image of a close up view and/or an image of a non-close up view) in which the mouth of the first patient is in the shade guide state and/or one or more images (e.g., an image of a close up view and/or an image of a non-close up view) in which the mouth of the first patient is in the mirror state. Alternatively and/or additionally, the third set of images (e.g., one or more images in which a position of the head of the first patient is in ¾ position) may comprise one or more images (e.g., an image of a close up view and/or an image of a non-close up view) in which the mouth of the first patient is in the smile state, one or more images (e.g., an image of a close up view and/or an image of a non-close up view) in which the mouth of the first patient is in the closed lips state, one or more images (e.g., an image of a close up view and/or an image of a non-close up view) in which the mouth of the first patient is in the rest state, one or more images (e.g., an image of a close up view and/or an image of a non-close up view) in which the mouth of the first patient is in a vocalization state associated with the first patient pronouncing the term "emma", one or more images (e.g., an image of a close up view and/or an image of a non-close up view) in which the mouth of the first patient is in a vocalization state associated with the first patient pronouncing the letter "e", one or more images (e.g., an image of a close up view and/or an image of a non-close up view) in which the mouth of the first patient is in a vocalization state associated with the first patient pronouncing the letter "s", one or more images (e.g., an image of a close up view and/or an image of a non-close up view) in which the mouth of the first patient is in a vocalization state associated with the first patient pronouncing the letter "f", one or more images (e.g., an image of a close up view and/or an image of a non-close up view) in which the mouth of the first patient is in a vocalization state associated with the first patient pronouncing the letter "v", one or more images (e.g., an image of a close up view and/or an image of a non-close up view) in which the mouth of the first patient is in the retractor state, one or more images (e.g., an image of a close up view and/or an image of a non-close up view) in which the mouth of the first patient is in the rubber dam state, one or more images (e.g., an image of a close up view and/or an image of a non-close up view) in which the mouth of the first patient is in the contractor state, one or more images (e.g., an image of a close up view and/or an image of a non-close up view) in which the mouth of the first patient is in the shade guide state and/or one or more images (e.g., an image of a close up view and/or an image of a non-close up view) in which the mouth of the first patient is in the mirror state. Alternatively and/or additionally, the fourth set of images (e.g., one or more images in which a position of the head of the first patient is in 12 o'clock position) may comprise one or more images (e.g., an image of a close up view and/or an image of a non-close up view) in which the mouth of the first patient is in the smile state, one or more images (e.g., an image of a close up view and/or an image of a non-close up view) in which the mouth of the first patient is in the closed lips state, one or more images (e.g., an image of a close up view and/or an image of a non-close up view) in which the mouth of the first patient is in the rest state, one or more images (e.g., an image of a close up view and/or an image of a non-close up view) in which the mouth of the first patient is in a vocalization state associated with the first patient pronouncing the term "emma", one or more images (e.g., an image of a close up view and/or an image of a non-close up view) in which the mouth of the first patient is in a vocalization state associated with the first patient pronouncing the letter "e", one or more images (e.g., an image of a close up view and/or an image of a non-close up view) in which the mouth of the first patient is in a vocalization state associated with the first patient pronouncing the letter "s", one or more images (e.g., an image of a close up view and/or an image of a non-close up view) in which the mouth of the first patient is in a vocalization state associated with the first patient pronouncing the letter "f", one or more images (e.g., an image of a close up view and/or an image of a non-close up view) in which the mouth of the first patient is in a vocalization state associated with the first patient pronouncing the letter "v", one or more images (e.g., an image of a close up view and/or an image of a non-close up view) in which the mouth of the first patient is in the retractor state, one or more images (e.g., an image of a close up view and/or an image of a non-close up view) in which the mouth of the first patient is in the rubber dam state, one or more images (e.g., an image of a close up view and/or an image of a non-close up view) in which the mouth of the first patient is in the contractor state, one or more images (e.g., an image of a close up view and/or an image of a non-close up view) in which the mouth of the first patient is in the shade guide state and/or one or more images (e.g., an image of a close up view and/or an image of a non-close up view) in which the mouth of the first patient is in the mirror state.

In some examples, the image capture process may comprise performing a plurality of image captures of the plurality of images. The plurality of image captures may be performed sequentially. In some examples, for an image capture of the plurality of image captures (and/or for each image capture of the plurality of image captures), the image capture interface may display one or more instructions (e.g., at least one of an instruction indicating a target position of an image to be captured via the image capture, an instruction indicating a mouth state of an image to be captured via the image capture, an instruction indicating a view such as close up view or non-close up view of an image to be captured via the image capture, etc.), such as using one or more of the techniques provided herein with respect to capturing the first image. Alternatively and/or additionally, for an image capture of the plurality of image captures (and/or for each image capture of the plurality of image captures), the image capture interface may display the target position guidance interface for providing guidance for achieving the target position of an image to be captured via the image capture (e.g., the target position guidance interface may be displayed based upon offset information determined based upon position information determined based upon identified facial landmark points and/or target information associated with the target position of the image), such as using one or more of the techniques provided herein with respect to capturing the first image.

Figure 6:
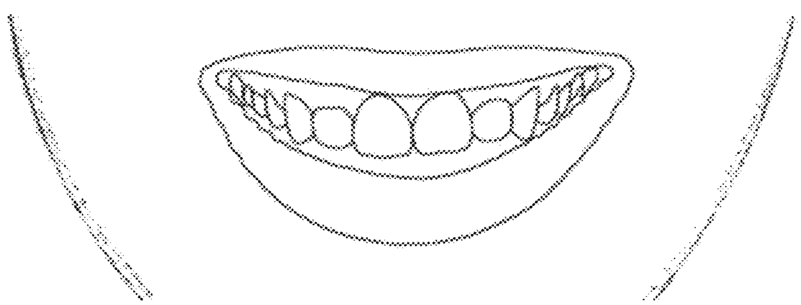
FIG. 6 illustrates an example of a close up view.

In some examples, the plurality of images may comprise one or more close up images of the first patient. A close up image of the one or more close up images may comprise a representation of a close up view of the first patient, such as a view of a portion of the face of the first patient. Herein, a close up view is a view in which merely a portion of the face of the first patient is in the view, and/or an entirety of the face and/or head of the first patient is not in the view (and/or boundaries of the face and/or the head are entirely in the view). For example, a close up view may be a view in which less than a threshold proportion of a face of the first patient is in the view (e.g., the threshold proportion may be 50% or other proportion of the face). Alternatively and/or additionally, a non-close up view (such as shown in FIGS. 5A-5B) may be a view in which greater than threshold proportion of the face of the first patient is in the view. For example, a close up image may be an image that is captured when the view of the real-time camera signal is a close up view (e.g., the real-time camera signal from the camera is representative of merely a portion of the face of the first patient). A portion of the face of the first patient may be represented with higher quality in a close up image than a facial image (e.g., an image, such as the first image, comprising a non-close up view), such as due to the close up image having more pixels representative of the portion of the face than the facial image. An example of a close up view is shown in FIG. 6.

In some examples, the image capture interface may display the target position guidance interface for providing guidance for capturing a close up image such that the close up image is captured when a position of the head matches a target position of the head for the close up image. In an example, when the real-time camera signal comprises a real-time representation of a close up view of a portion of the face of the first patient, offset information associated with a difference between a position of the head and a target position of the head may not be accurately determined using facial landmark points of the face of the first patient (e.g., the offset information may not be accurately determined since sufficient facial landmark points of the face of the first patient may not be able to be detected since merely the portion of the face of the first patient is represented by the real-time camera signal). Accordingly, the target position guidance interface may be controlled and/or displayed based upon segmentation information of an image (e.g., a non-close up image) of the plurality of images. The offset information may be determined based upon the segmentation information, wherein the target position guidance interface may be controlled and/or displayed based upon the segmentation information of the image.

Figure 7A:
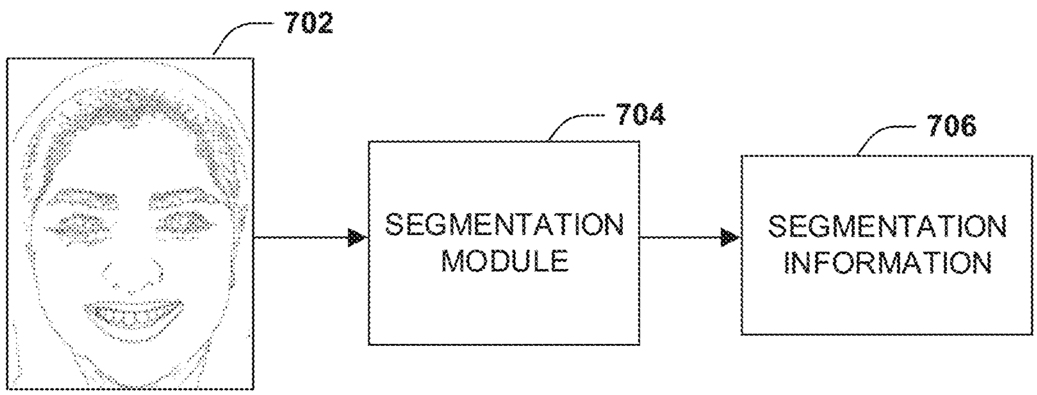
FIG. 7A illustrates first segmentation information being generated using a segmentation module, according to some embodiments.

In an example, first segmentation information may be generated based upon the first image. The first segmentation information may be indicative of boundaries of teeth of the first patient, gums of the first patient and/or one or more lips of the first patient. FIG. 7A illustrates the first segmentation information (shown with reference number 706) being generated using a segmentation module 704. For example, the first image (shown with reference number 702) may be input to the segmentation module 704, wherein the segmentation module 704 generates the first segmentation information 706 based upon the first image 702.

In some examples, the segmentation module 704 may comprise a segmentation machine learning model configured to generate the first segmentation information 706 based upon the first image. In an example, the segmentation machine learning model of the first segmentation information 706 may comprise a Region-based Convolutional Neural Network (R-CNN), such as a cascaded mask R-CNN. The R-CNN may comprise a visual transformer-based instance segmenter. In an example, the visual transformer-based instance segmenter may be a Swin transformer (e.g., a Swin vision transformer). The visual transformer-based instance segmenter may be a backbone of the R-CNN (e.g., the cascaded mask R-CNN). In some examples, the segmentation machine learning model may be trained using a plurality of images, such as images of an image database (e.g., ImageNet and/or other image database), wherein at least some of the plurality of images may be annotated (e.g., manually annotated, such as manually annotated by an expert). The plurality of images may comprise at least one of images of faces, images of teeth, images of gums, images of lips, etc. In an example, the visual transformer-based instance segmenter (e.g., the Swin transformer) may be pre-trained using images of the plurality of images. In some examples, using the segmentation machine learning model with the visual transformer-based instance segmenter (e.g., using the visual transformer-based instance segmenter, such as the Swin transformer, as the backbone of the segmentation machine learning model) may provide for increased accuracy of generating the first segmentation information 706 as compared to using a different segmentation machine learning model, such as a machine learning model without the visual transformer-based instance segmenter (e.g., the Swin transformer), to generate segmentation information based upon the first image 702. Alternatively and/or additionally, the segmentation machine learning model comprising the visual transformer-based instance segmenter (e.g., the Swin transformer) may require less training data (e.g., manually annotated images, such as labeled images) to be trained to generate segmentation information as compared to other segmentation machine learning models that do not comprise the visual transformer-based instance segmenter (e.g., the Swin transformer), thereby providing for reduced manual effort associated with manually labeling and/or annotating images to train the segmentation machine learning model. Alternatively and/or additionally, the segmentation machine learning model comprising the visual transformer-based instance segmenter (e.g., the Swin transformer) may more accurately generate segmentation information indicative of boundaries of teeth based upon an image that shows less than a threshold quantity of teeth as compared to other segmentation machine learning models that do not comprise the visual transformer-based instance segmenter (e.g., the Swin transformer). For example, the other segmentation machine learning models may not be able to determine boundaries of teeth in an image if less than the threshold quantity of teeth (e.g., six teeth) are within the image, whereas the segmentation machine learning model comprising the visual transformer-based instance segmenter (e.g., the Swin transformer) may accurately generate segmentation information indicative of boundaries of teeth based upon an image that shows less than the threshold quantity of teeth (e.g., the segmentation machine learning model comprising the visual transformer-based instance segmenter may accurately determine tooth boundaries when the image merely comprises one tooth, such as merely a portion of one tooth). Alternatively and/or additionally, the segmentation machine learning model comprising the visual transformer-based instance segmenter (e.g., the Swin transformer) may more accurately generate segmentation information indicative of boundaries of teeth based upon an image that has a quality lower than a threshold quality as compared to other segmentation machine learning models that do not comprise the visual transformer-based instance segmenter (e.g., the Swin transformer). For example, the other segmentation machine learning models may not be able to determine boundaries of teeth in an image if a quality of the image is lower than the threshold quality, whereas the segmentation machine learning model comprising the visual transformer-based instance segmenter (e.g., the Swin transformer) may accurately generate segmentation information indicative of boundaries of teeth based upon an image that has a quality lower than the threshold quality. Alternatively and/or additionally, the segmentation machine learning model comprising the visual transformer-based instance segmenter (e.g., the Swin transformer) may more accurately generate segmentation information indicative of boundaries of teeth based upon an image that shows teeth with individuality lower than a threshold individuality of teeth as compared to other segmentation machine learning models that do not comprise the visual transformer-based instance segmenter (e.g., the Swin transformer). For example, the other segmentation machine learning models may not be able to determine boundaries of teeth in an image if individuality of teeth of the image is lower than the threshold individuality of teeth, whereas the segmentation machine learning model comprising the visual transformer-based instance segmenter (e.g., the Swin transformer) may accurately generate segmentation information indicative of boundaries of teeth based upon an image that shows teeth with individuality lower than the threshold individuality of teeth. Alternatively and/or additionally, the segmentation machine learning model may accurately generate segmentation information indicative of boundaries of teeth in an image in various scenarios, such as at least one of a scenario in which teeth in the image are crowded together, a scenario in which one or more teeth in the image have irregular outlines, a scenario in which one or more teeth in the image have stains, a scenario in which the image is captured with a retractor in a mouth of a user, a scenario in which the image is captured without a retractor in a mouth of a user, a scenario in which the image is captured with a rubber dam in a mouth of a user, a scenario in which the image is captured without a rubber dam in a mouth of a user, a scenario in which the image is captured in frontal position, a scenario in which the image is captured in lateral position, a scenario in which the image is captured in ¾ position, a scenario in which the image is captured in 12 o'clock position, a scenario in which the image comprises a view of a plaster model of teeth (e.g., the plaster model may not have a natural color of teeth), a scenario in which the image is an image (e.g., a two-dimensional image) of a three-dimensional model, a scenario in which the image comprises a view of a dental prosthesis device (for forming artificial gum and/or teeth, for example), a scenario in which the image comprises a view of dentin layer (associated with composite veneer and/or porcelain laminate), a scenario in which the image comprises a view of prepared teeth, a scenario in which the image comprises a view of teeth with braces, etc.

In some examples, the first segmentation information 706 may comprise instance segmentation information and/or semantic segmentation information. In an example in which the first segmentation information 706 is indicative of boundaries of teeth, the first segmentation information 706 may comprise teeth instance segmentation information and/or teeth semantic segmentation information. The teeth instance segmentation information may individually identify teeth in the first image 702 (e.g., each tooth in the first image 702 may be assigned an instance identifier that indicates that the tooth is an individual tooth and/or indicates a position of the tooth). For example, the teeth instance segmentation information may be indicative of at least one of boundaries of a first tooth, a first instance identifier (e.g., a tooth position) of the first tooth, boundaries of a second tooth, a second instance identifier (e.g., a tooth position) of the second tooth, etc. Alternatively and/or additionally, the teeth semantic segmentation information may identify teeth in the first image 702 as a single class (e.g., teeth) and/or may not distinguish between individual teeth shown in the first image 702.

In an example in which the first segmentation information 706 is indicative of boundaries of lips, the first segmentation information 706 may comprise lip instance segmentation information and/or lip semantic segmentation information. The lip instance segmentation information may individually identify lips in the first image 702 (e.g., each lip in the first image 702 may be assigned an instance identifier that indicates that the lip is an individual lip and/or indicates a position of the lip). For example, the lip instance segmentation information may be indicative of at least one of boundaries of a first lip, a first instance identifier (e.g., a lip position, such as upper lip) of the first lip, boundaries of a second lip, a second instance identifier (e.g., a lip position, such as lower lip) of the second lip, etc. Alternatively and/or additionally, the lip semantic segmentation information may identify lips in the first image 702 as a single class (e.g., lip) and/or may not distinguish between individual lips shown in the first image 702.

In some examples, the first segmentation information 706 may be used for providing guidance, via the target position guidance interface, for capturing a second image (of the plurality of images, for example) comprising a close up view of a portion of the face of the first patient with a target position associated with the first image 702 (e.g., the first target position) and/or a mouth state associated with the first image 702. In an example in which the first image 702 comprises a view of the first patient in frontal position in smile state, the first segmentation information 706 determined based upon the first image 702 may be used for providing guidance for capturing the second image comprising a close up view of the portion of the face of the first patient in the frontal position in the smile state. In an example, the real-time camera signal received from the camera may comprise a portion of the face of the first patient. The real-time camera signal may be analyzed to generate second segmentation information indicative of boundaries of teeth of the first patient, gums of the first patient and/or one or more lips of the first patient. Based upon the first segmentation information and the second segmentation information, whether or not the position of the head matches the first target position may be determined. For example, the first segmentation information may be compared with the second segmentation information to determine whether or not the position of the head matches the first target position. For example, if the position of the head does not match the first target position, one or more shapes of boundaries of one or more teeth indicated by the second segmentation information may differ from shapes of boundaries of the one or more teeth indicated by the first segmentation information. Offset information associated with a difference between the position of the head and the first target position may be determined may be determined based upon the first segmentation information and the second segmentation information. The target position guidance interface may be displayed based upon the offset information (e.g., the target position guidance interface may provide guidance for reducing the difference between the position of the head and the target position of the head). For example, the target position guidance interface may indicate a direction in which motion of the camera (and/or the first client device 400) reduces the difference between the position of the head and the first target position and/or a direction in which motion of the head of the first patient reduces the difference between the position of the head and the first target position. In some examples, it may be determined that the position of the head matches the first target position based upon a determination that a difference between the first segmentation information and the second segmentation information is smaller than a threshold difference. In response to a determination that the position of the head matches the target position of the head, the second image of the close up view of the portion of the face may be captured (e.g., automatically captured). Alternatively and/or additionally, the second image may be captured in response to selection of the image capture selectable input (e.g., the image capture selectable input may be displayed via the image capture interface in response to determining that the position of the head matches the first target position).

Figure 7B:
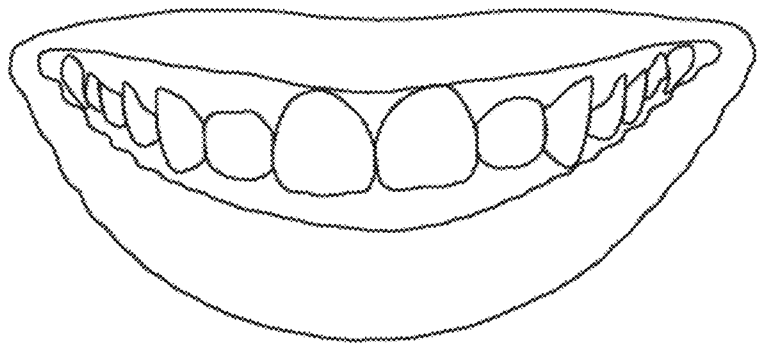
FIGS. 7B-7K illustrate example representations of segmentation information.
Figure 7C:
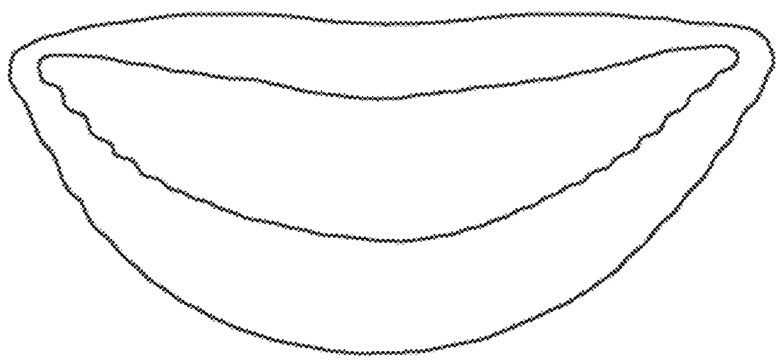
Figure 7D:
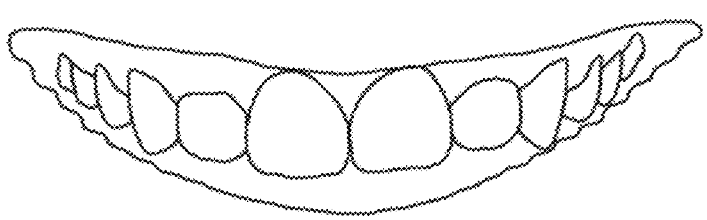

Example representations of segmentation information (e.g., the first segmentation information 706) generated using the segmentation module 704 are shown in FIGS. 7B-7K. FIG. 7B illustrates an example representation of segmentation information indicative of boundaries of teeth of the first patient and lips of the first patient. For example, the example representation of the segmentation information shown in FIG. 7B comprises an outline of outer boundaries of lips of the first patient and inner boundaries of lips of the first patient. FIG. 7C illustrates an example representation of segmentation information indicative of boundaries of lips of the first patient. For example, the example representation of the segmentation information shown in FIG. 7C comprises an outline of outer boundaries of lips of the first patient and inner boundaries of lips of the first patient. FIG. 7D illustrates an example representation of segmentation information indicative of boundaries of teeth of the first patient and inner boundaries of lips of the first patient.

Figure 7E:
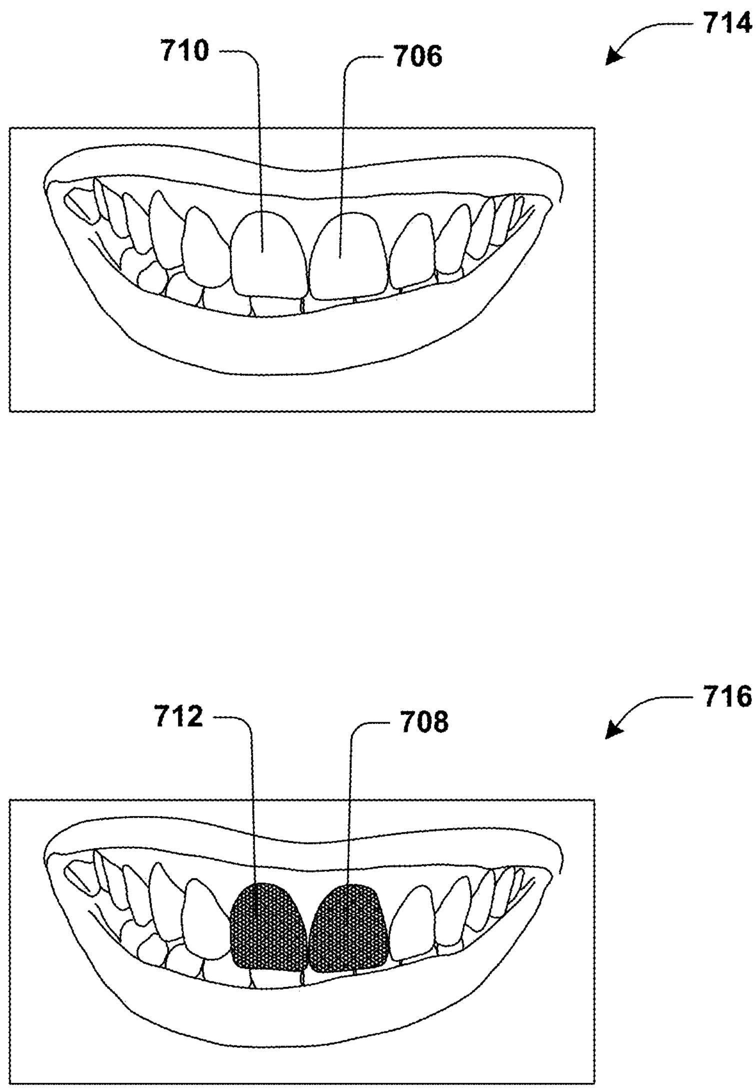

FIG. 7E illustrates an example representation 716 of segmentation information generated based upon an image 714 (e.g., an image comprising a close up view of a mouth in smile state). For example, the segmentation information shown in FIG. 7E may comprise instance segmentation information identifying individual teeth (e.g., the example representation 716 may comprise an area 712 filled with a first color to identify boundaries of a first tooth 710 and/or an area 708 filled with a second color to identify boundaries of a second tooth 706). In some examples, the example representation 716 may comprise tooth segmentation areas with varying colors overlaying the image 714.

Figure 7F:
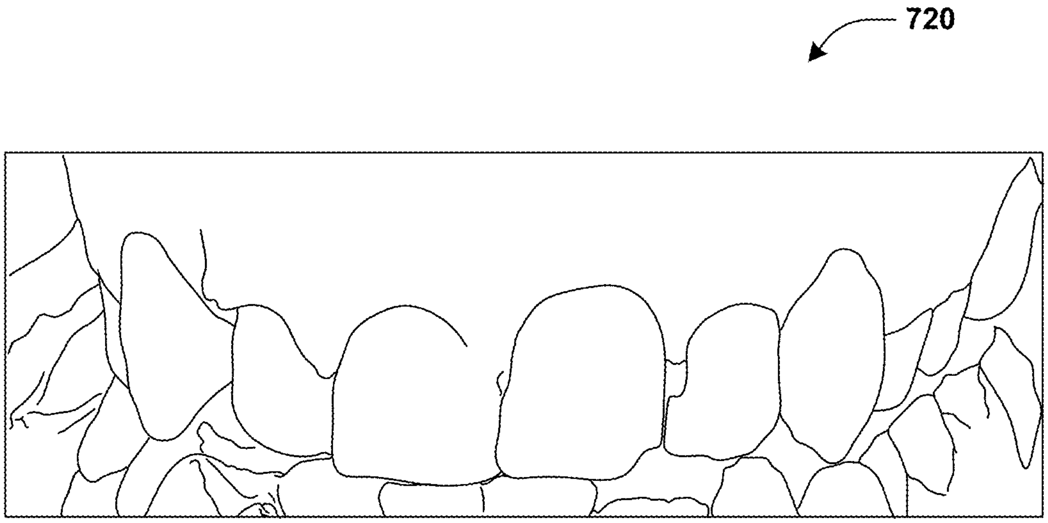
Figure 7F:
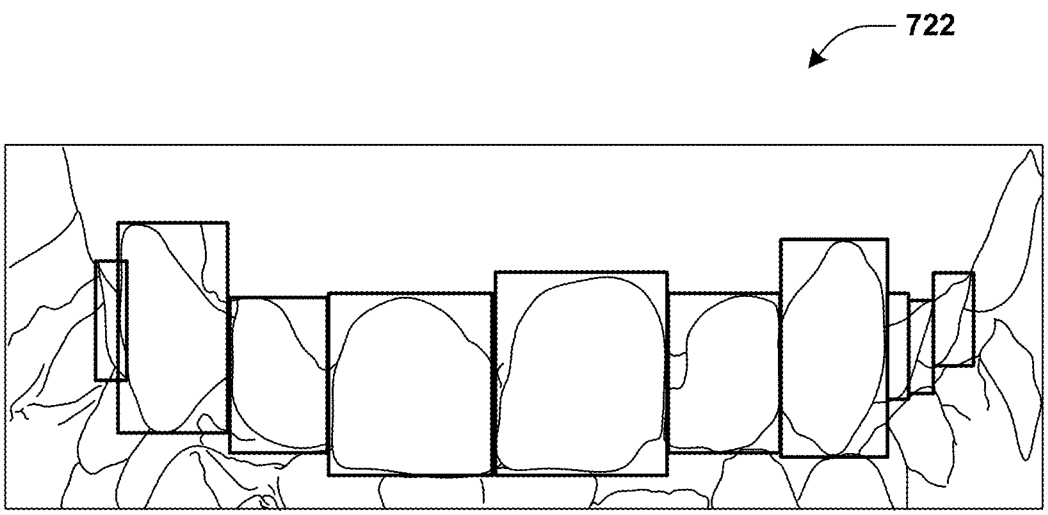

FIG. 7F illustrates an example representation 722 of segmentation information generated based upon an image 720 (e.g., an image comprising a view of a plaster model of teeth). For example, the segmentation information shown in FIG. 7F may comprise instance segmentation information identifying individual teeth (e.g., the example representation 722 may comprise an area filled with a first color to identify boundaries of a first tooth and/or an area filled with a second color to identify boundaries of a second tooth). In some examples, the example representation 722 may comprise tooth segmentation areas with varying colors overlaying the image 720.

Figure 7G:
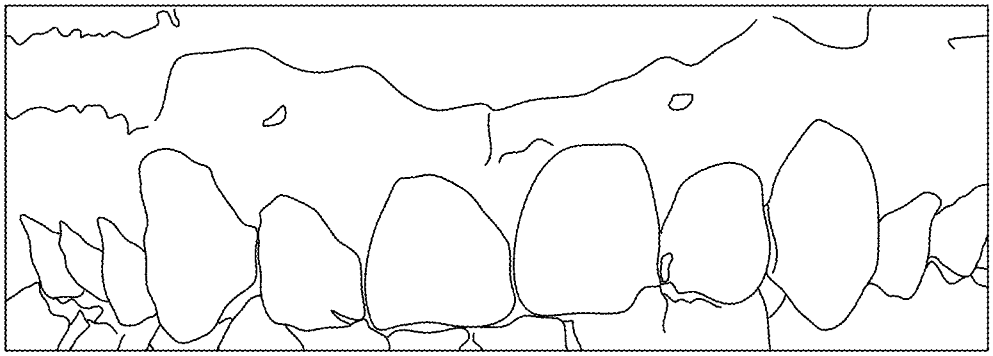
Figure 7G:
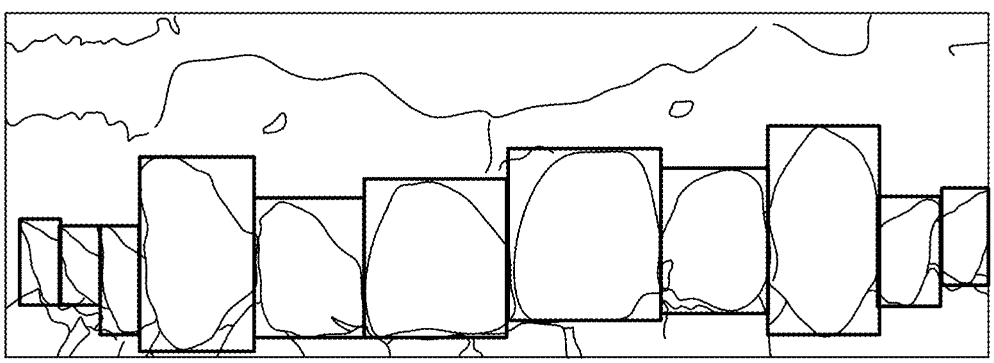

FIG. 7G illustrates an example representation 732 of segmentation information generated based upon an image 730, such as an image (e.g., a two-dimensional image) of a three-dimensional model of teeth (e.g., the teeth may be scanned to generate the three-dimensional model). For example, the segmentation information shown in FIG. 7G may comprise instance segmentation information identifying individual teeth (e.g., the example representation 732 may comprise an area filled with a first color to identify boundaries of a first tooth and/or an area filled with a second color to identify boundaries of a second tooth). In some examples, the example representation 732 may comprise tooth segmentation areas with varying colors overlaying the image 730.

Figure 7H:
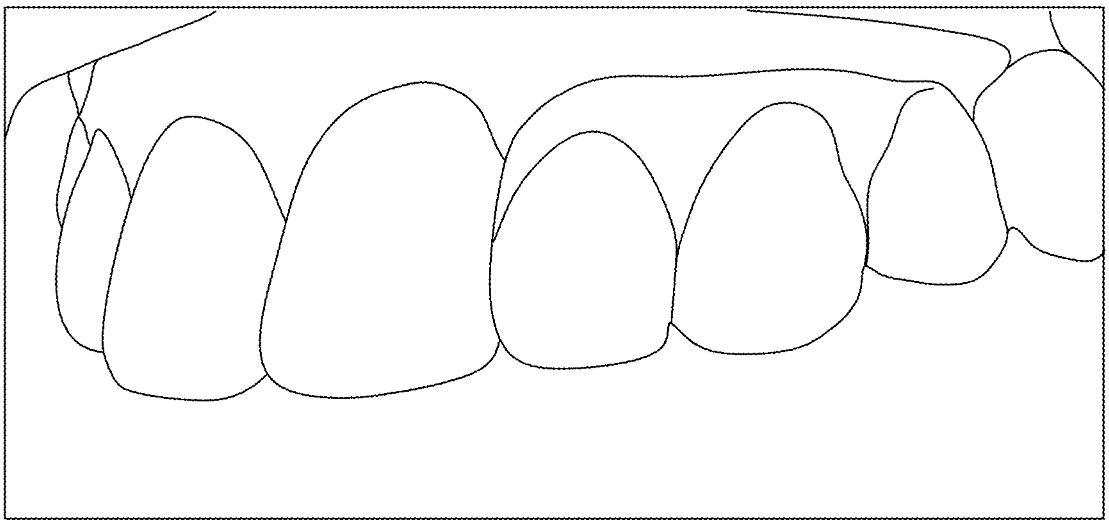
Figure 7H:
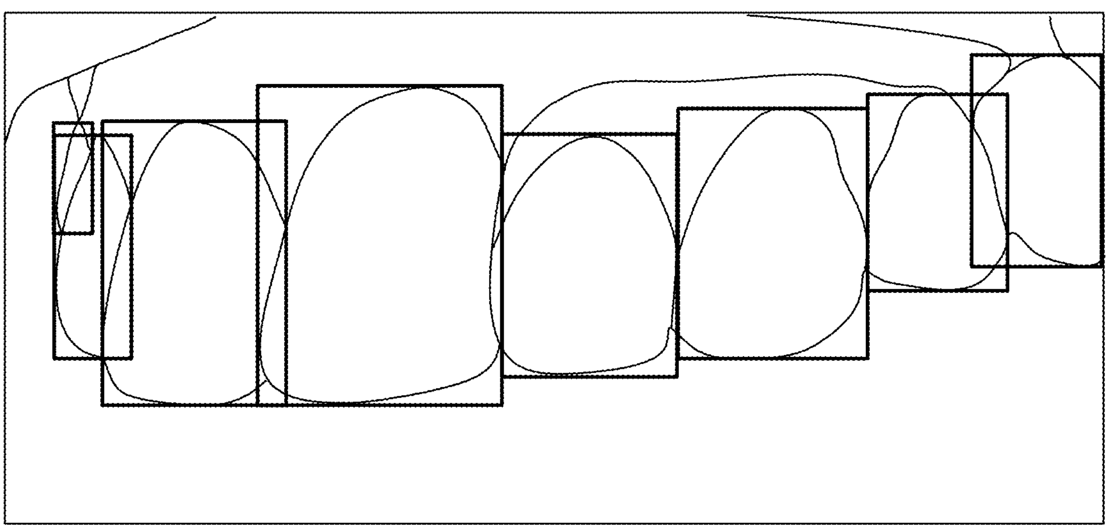

FIG. 7H illustrates an example representation 742 of segmentation information generated based upon an image 740 (e.g., an image comprising a view of a mouth with a dental prosthesis with artificial gums). For example, the segmentation information shown in FIG. 7H may comprise instance segmentation information identifying individual teeth (e.g., the example representation 742 may comprise an area filled with a first color to identify boundaries of a first tooth and/or an area filled with a second color to identify boundaries of a second tooth). In some examples, the example representation 742 may comprise tooth segmentation areas with varying colors overlaying the image 740.

Figure 7I:
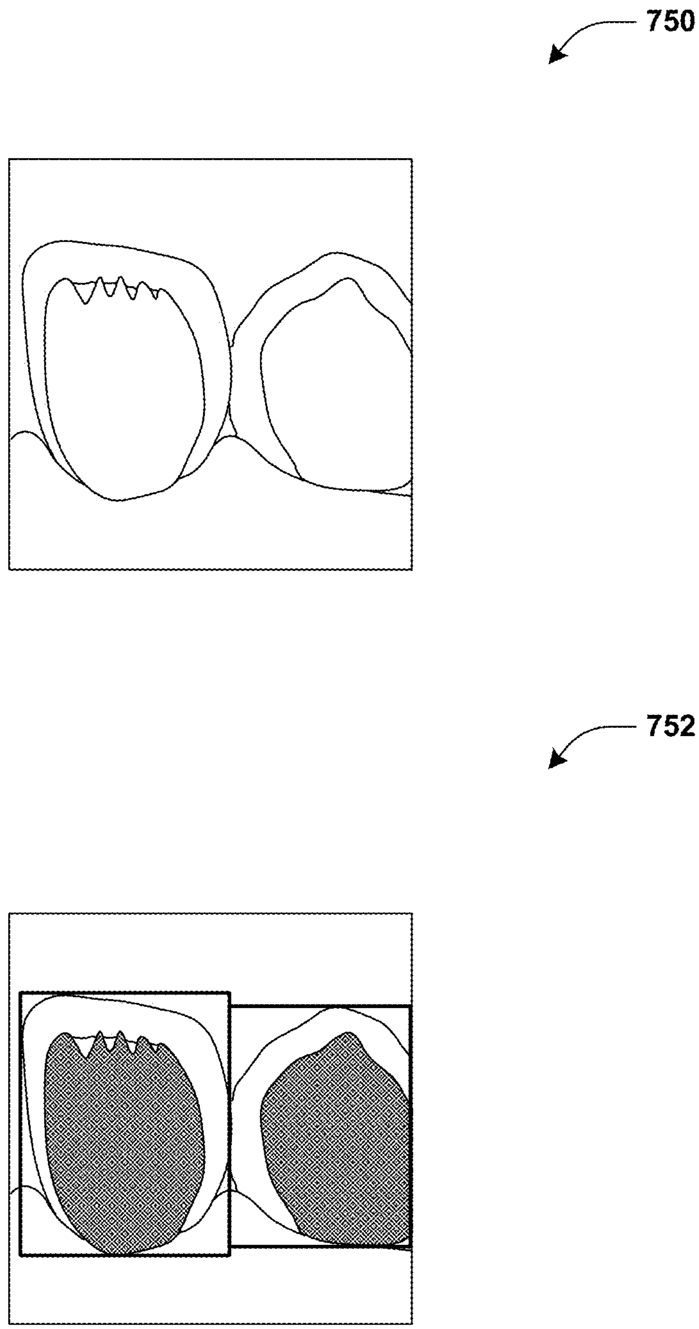

FIG. 7I illustrates an example representation 752 of segmentation information generated based upon an image 750 (e.g., an image comprising a view of composite veneers). For example, the segmentation information shown in FIG. 7I may be indicative of boundaries of dentin layer of composite veneers (during treatment, for example) shown in the image 750. In some examples, the segmentation information shown in FIG. 7I may comprise instance segmentation information identifying dentin layer of individual teeth (e.g., the example representation 752 may comprise an area filled with a first color to identify boundaries of dentin layer of a first tooth and/or an area filled with a second color to identify boundaries of dentin layer of a second tooth). In some examples, the example representation 752 may comprise dentin layer segmentation areas with varying colors overlaying the image 750.

Figure 7J:
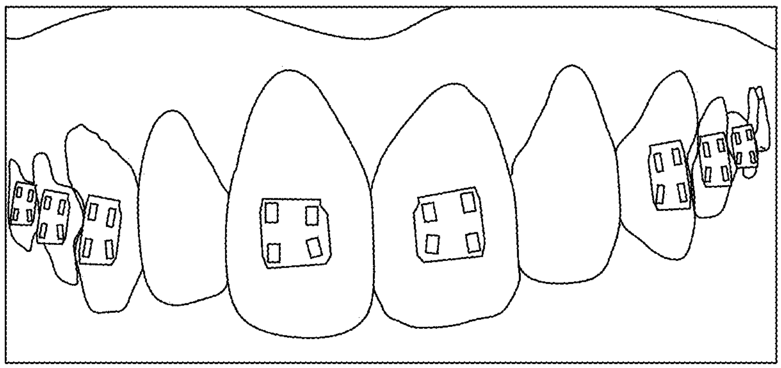
Figure 7J:
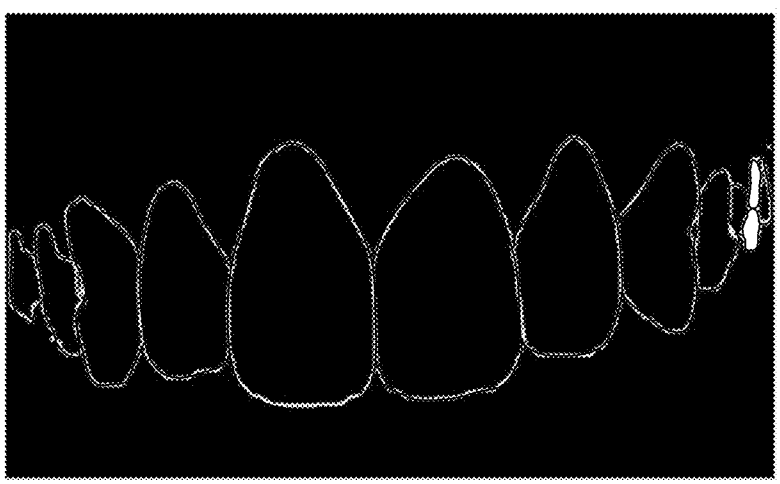
Figure 7K:
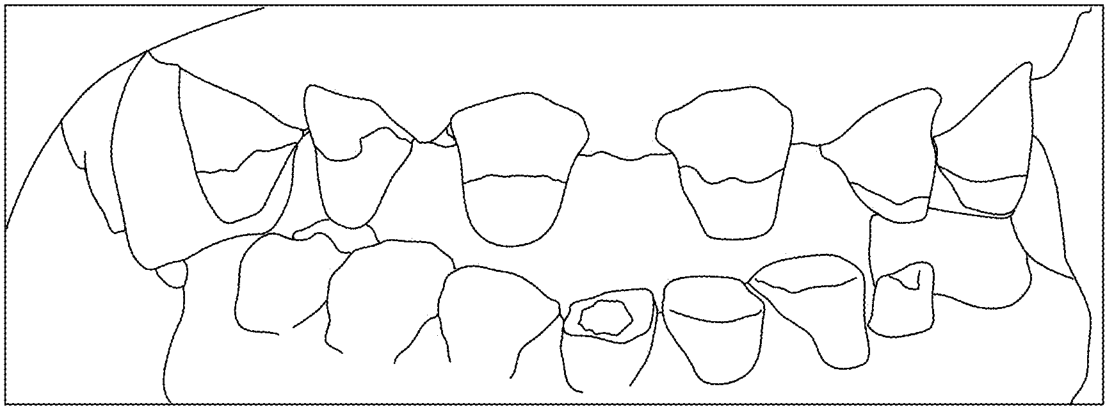
Figure 7K:
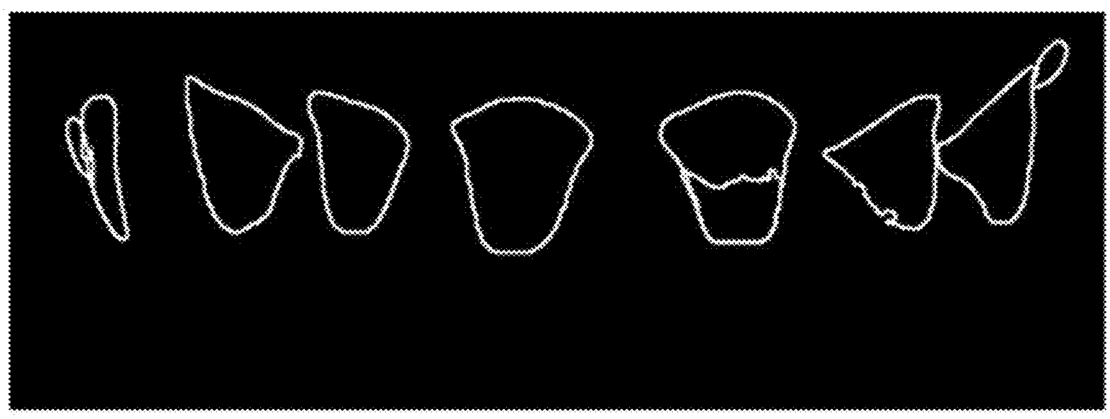

FIG. 7J illustrates an example representation 762 of segmentation information generated based upon an image 760, such as an image comprising a view of teeth while brackets of braces are attached to some of the teeth. FIG. 7K illustrates an example representation 772 of segmentation information generated based upon an image 770, such as an image comprising a view of irregular and/or prepared teeth.

In some examples, the first image 702 may be displayed via a second client device. Alternatively and/or additionally, one or more images of the plurality of images may be displayed via the second client device. The second client device may be the same as the first client device 400 or different than the first client device 400. In an example, an image of the plurality of images may be displayed via the second client device with a grid, such as using one or more of the techniques provided herein with respect to FIGS. 26A-26B. The second client device may be associated with a dental treatment professional. For example, the dental treatment professional may use one or more images of the plurality of images to at least one of diagnose one or more medical conditions of the first patient, form a treatment plan for treating one or more medical conditions of the first patient, etc. In some examples, the plurality of images may be included in the first patient profile associated with the first patient. The second client device may be provided with access to images in the first patient profile based upon a determination that a user (e.g., the dental treatment professional) of the second client device has authorization to access the first patient profile. In some examples, the first patient profile may comprise historical images captured before the plurality of images. Accordingly, the dental treatment professional may view one or more images of the historical images and one or more images of the plurality of images for comparison (e.g., based upon the comparison, the dental treatment professional may identify improvement and/or deterioration of at least one of teeth, gums, lips, etc. of the first patient over time).

In some examples, at least some of the operations provided herein for at least one of capturing images, providing guidance and/or instructions for capturing images, etc. (e.g., at least one of identifying facial landmark points, determining position information, determining offset information, displaying the target position guidance interface, capturing the first image 702, capturing the plurality of images, etc.) may be performed using the first client device 400.

Alternatively and/or additionally, at least some of the operations provided herein for at least one of capturing images, providing guidance and/or instructions for capturing images, etc. (e.g., at least one of identifying facial landmark points, determining position information, determining offset information, displaying the target position guidance interface, capturing the first image 702, capturing the plurality of images, etc.) may be performed using one or more devices other than the first client device 400 (e.g., one or more servers, one or more databases, etc.).

It may be appreciated that implementation of one or more of the techniques provided herein, such as one or more of the techniques provided with respect to the example method 100 of FIG. 1, may provide for at least one of less manual effort in capturing images, more accurately captured images with less deviation of a position of the first patent from a target position, etc. It may be appreciated that deviation from the target position may result in captured images that show incorrect perspectives of features, such as where a deviation of an image along the pitch axis causes teeth in the image to appear shorter or longer than the teeth actually are, a deviation of an image along the yaw axis may cause teeth to appear wider or narrower than the teeth actually are, etc. Accordingly, increased accuracy of the captured images may enable a dentist treatment professional viewing the captured images to provide improved diagnoses and/or analyses using the captured images. Alternatively and/or additionally, increased accuracy of the captured images may provide for increased accuracy of landmark detection and/or analyses using the captured images (such as discussed herein with respect to example method 800 of FIG. 8). Alternatively and/or additionally, increased accuracy of the captured images may provide for increased accuracy of mouth design generation for the first patient using the captured images (such as discussed herein with respect to example method 2700 of FIG. 27).

Manually identifying facial, labial, dental, and/or gingival landmarks and/or performing landmark analysis to identify one or more medical, dental and/or aesthetic conditions of a patient can be very time consuming and/or inaccurate due to human error in detecting and/or extracting the landmarks. Alternatively and/or additionally, due to human error, a dental treatment professional manually performing landmark analysis may not correctly diagnose one or more one or more medical, dental and/or aesthetic conditions of a patient. Thus, in accordance with one or more of the techniques herein, a landmark information system is provided that automatically determines landmark information based upon images of a patient and/or automatically performs landmark analyses to identify one or more medical, dental and/or aesthetic conditions of the patient, thereby providing for at least one of a reduction in human errors, an increased accuracy of detected landmarks and/or medical, dental and/or aesthetic conditions, etc. Indications of the detected landmarks and/or the medical, dental and/or aesthetic conditions may be displayed via an interface such that a dental treatment professional may more quickly, conveniently and/or accurately identify the landmarks and/or the conditions and/or treat the patient based upon the landmarks and/or the conditions (e.g., the patient may be treated with surgical treatment, orthodontic treatment, improvement and/or reconstruction of a jaw of the patient, etc.).

Figure 8:
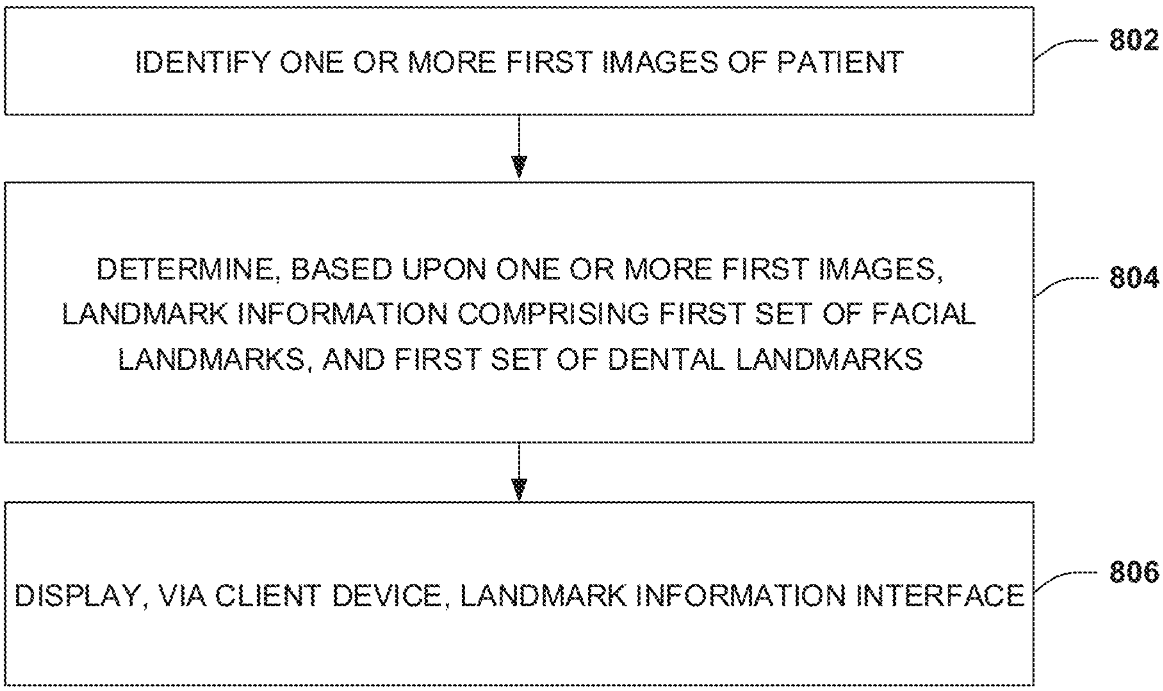
FIG. 8 is an illustration of an example method for determining landmarks and/or presenting a landmark information interface with landmark information.

An embodiment for determining landmarks and/or presenting a landmark information interface with landmark information is illustrated by an example method 800 of FIG. 8. In some examples, a landmark information system is provided. The landmark information system may determine landmark information based upon images and/or display the landmark information via a landmark information interface.

At 802, one or more first images (e.g., one or more photographs) of a first patient are identified. In an example, the one or more first images may be retrieved from a first patient profile associated with the first patient (e.g., the first patient profile may be stored on a user profile database comprising a plurality of user profiles associated with a plurality of users).

In some examples, the one or more first images may comprise a first set of images (e.g., a first set of one or more images) associated with frontal position, a second set of images (e.g., a second set of one or more images) associated with lateral position, a third set of images (e.g., a third set of one or more images) associated with ¾ position, a fourth set of images (e.g., a fourth set of one or more images) associated with 12 o'clock position and/or one or more other sets of images associated with one or more other positions. In an example, the first set of images (e.g., one or more images in which a position of the head of the first patient is in frontal position) may comprise one or more images (e.g., an image of a close up view and/or an image of a non-close up view) in which the mouth of the first patient is in the smile state, one or more images (e.g., an image of a close up view and/or an image of a non-close up view) in which the mouth of the first patient is in the closed lips state, one or more images (e.g., an image of a close up view and/or an image of a non-close up view) in which the mouth of the first patient is in the rest state, one or more images (e.g., an image of a close up view and/or an image of a non-close up view) in which the mouth of the first patient is in a vocalization state associated with the first patient pronouncing the term "emma", one or more images (e.g., an image of a close up view and/or an image of a non-close up view) in which the mouth of the first patient is in a vocalization state associated with the first patient pronouncing the letter "e", one or more images (e.g., an image of a close up view and/or an image of a non-close up view) in which the mouth of the first patient is in a vocalization state associated with the first patient pronouncing the letter "s", one or more images (e.g., an image of a close up view and/or an image of a non-close up view) in which the mouth of the first patient is in a vocalization state associated with the first patient pronouncing the letter "f", one or more images (e.g., an image of a close up view and/or an image of a non-close up view) in which the mouth of the first patient is in a vocalization state associated with the first patient pronouncing the letter "v", one or more images (e.g., an image of a close up view and/or an image of a non-close up view) in which the mouth of the first patient is in the retractor state, one or more images (e.g., an image of a close up view and/or an image of a non-close up view) in which the mouth of the first patient is in the rubber dam state, one or more images (e.g., an image of a close up view and/or an image of a non-close up view) in which the mouth of the first patient is in the contractor state, one or more images (e.g., an image of a close up view and/or an image of a non-close up view) in which the mouth of the first patient is in the shade guide state and/or one or more images (e.g., an image of a close up view and/or an image of a non-close up view) in which the mouth of the first patient is in the mirror state. Alternatively and/or additionally, the second set of images (e.g., one or more images in which a position of the head of the first patient is in lateral position) may comprise one or more images (e.g., an image of a close up view and/or an image of a non-close up view) in which the mouth of the first patient is in the smile state, one or more images (e.g., an image of a close up view and/or an image of a non-close up view) in which the mouth of the first patient is in the closed lips state, one or more images (e.g., an image of a close up view and/or an image of a non-close up view) in which the mouth of the first patient is in the rest state, one or more images (e.g., an image of a close up view and/or an image of a non-close up view) in which the mouth of the first patient is in a vocalization state associated with the first patient pronouncing the term "emma", one or more images (e.g., an image of a close up view and/or an image of a non-close up view) in which the mouth of the first patient is in a vocalization state associated with the first patient pronouncing the letter "e", one or more images (e.g., an image of a close up view and/or an image of a non-close up view) in which the mouth of the first patient is in a vocalization state associated with the first patient pronouncing the letter "s", one or more images (e.g., an image of a close up view and/or an image of a non-close up view) in which the mouth of the first patient is in a vocalization state associated with the first patient pronouncing the letter "f", one or more images (e.g., an image of a close up view and/or an image of a non-close up view) in which the mouth of the first patient is in a vocalization state associated with the first patient pronouncing the letter "v", one or more images (e.g., an image of a close up view and/or an image of a non-close up view) in which the mouth of the first patient is in the retractor state, one or more images (e.g., an image of a close up view and/or an image of a non-close up view) in which the mouth of the first patient is in the rubber dam state, one or more images (e.g., an image of a close up view and/or an image of a non-close up view) in which the mouth of the first patient is in the contractor state, one or more images (e.g., an image of a close up view and/or an image of a non-close up view) in which the mouth of the first patient is in the shade guide state and/or one or more images (e.g., an image of a close up view and/or an image of a non-close up view) in which the mouth of the first patient is in the mirror state. Alternatively and/or additionally, the third set of images (e.g., one or more images in which a position of the head of the first patient is in ¾ position) may comprise one or more images (e.g., an image of a close up view and/or an image of a non-close up view) in which the mouth of the first patient is in the smile state, one or more images (e.g., an image of a close up view and/or an image of a non-close up view) in which the mouth of the first patient is in the closed lips state, one or more images (e.g., an image of a close up view and/or an image of a non-close up view) in which the mouth of the first patient is in the rest state, one or more images (e.g., an image of a close up view and/or an image of a non-close up view) in which the mouth of the first patient is in a vocalization state associated with the first patient pronouncing the term "emma", one or more images (e.g., an image of a close up view and/or an image of a non-close up view) in which the mouth of the first patient is in a vocalization state associated with the first patient pronouncing the letter "e", one or more images (e.g., an image of a close up view and/or an image of a non-close up view) in which the mouth of the first patient is in a vocalization state associated with the first patient pronouncing the letter "s", one or more images (e.g., an image of a close up view and/or an image of a non-close up view) in which the mouth of the first patient is in a vocalization state associated with the first patient pronouncing the letter "f", one or more images (e.g., an image of a close up view and/or an image of a non-close up view) in which the mouth of the first patient is in a vocalization state associated with the first patient pronouncing the letter "v", one or more images (e.g., an image of a close up view and/or an image of a non-close up view) in which the mouth of the first patient is in the retractor state, one or more images (e.g., an image of a close up view and/or an image of a non-close up view) in which the mouth of the first patient is in the rubber dam state, one or more images (e.g., an image of a close up view and/or an image of a non-close up view) in which the mouth of the first patient is in the contractor state, one or more images (e.g., an image of a close up view and/or an image of a non-close up view) in which the mouth of the first patient is in the shade guide state and/or one or more images (e.g., an image of a close up view and/or an image of a non-close up view) in which the mouth of the first patient is in the mirror state. Alternatively and/or additionally, the fourth set of images (e.g., one or more images in which a position of the head of the first patient is in 12 o'clock position) may comprise one or more images (e.g., an image of a close up view and/or an image of a non-close up view) in which the mouth of the first patient is in the smile state, one or more images (e.g., an image of a close up view and/or an image of a non-close up view) in which the mouth of the first patient is in the closed lips state, one or more images (e.g., an image of a close up view and/or an image of a non-close up view) in which the mouth of the first patient is in the rest state, one or more images (e.g., an image of a close up view and/or an image of a non-close up view) in which the mouth of the first patient is in a vocalization state associated with the first patient pronouncing the term "emma", one or more images (e.g., an image of a close up view and/or an image of a non-close up view) in which the mouth of the first patient is in a vocalization state associated with the first patient pronouncing the letter "e", one or more images (e.g., an image of a close up view and/or an image of a non-close up view) in which the mouth of the first patient is in a vocalization state associated with the first patient pronouncing the letter "s", one or more images (e.g., an image of a close up view and/or an image of a non-close up view) in which the mouth of the first patient is in a vocalization state associated with the first patient pronouncing the letter "f", one or more images (e.g., an image of a close up view and/or an image of a non-close up view) in which the mouth of the first patient is in a vocalization state associated with the first patient pronouncing the letter "v", one or more images (e.g., an image of a close up view and/or an image of a non-close up view) in which the mouth of the first patient is in the retractor state, one or more images (e.g., an image of a close up view and/or an image of a non-close up view) in which the mouth of the first patient is in the rubber dam state, one or more images (e.g., an image of a close up view and/or an image of a non-close up view) in which the mouth of the first patient is in the contractor state, one or more images (e.g., an image of a close up view and/or an image of a non-close up view) in which the mouth of the first patient is in the shade guide state and/or one or more images (e.g., an image of a close up view and/or an image of a non-close up view) in which the mouth of the first patient is in the mirror state.

In an example, the one or more first images may be one or more images that are captured using the image capture system and/or the image capture interface discussed with respect to the example method 100 of FIG. 1. In an example, the one or more first images may comprise the first image 702, the second image and/or at least some of the plurality of images (e.g., captured via the image capture process) discussed with respect to the example method 100 of FIG. 1.

At 804, first landmark information may be determined based upon the one or more first images. For example, one, some and/or all of the one or more first images may be analyzed to determine the first landmark information. In some examples, the first landmark information may comprise a first set of facial landmarks of the first patient, a first set of dental landmarks of the first patient, a first set of gingival landmarks of the first patient, a first set of labial landmarks of the first patient and/or a first set of oral landmarks of the first patient.

In an example, the first set of facial landmarks may comprise a first set of facial landmark points of the face of the first patient. For example, the first set of facial landmark points may be determined based upon an image of the one or more first images, such as an image comprising a representation of a non-close up view of the first patient. In an example, the first set of facial landmark points may be determined using the facial landmark point identification model (discussed with respect to the example method 100 of FIG. 1). An example of the first set of facial landmark points is shown in FIG. 2 (e.g., a facial landmark point of the first set of facial landmark points is shown with reference number 204). In an example, the first set of facial landmark points may comprise at least one of a glabella landmark point, a tip of nose landmark point, a subnasal landmark point, a philtrum landmark point, a menton landmark point, a pupillary landmark point (e.g., middle of pupil landmark point), a medial canthus landmark point, etc.

Figure 9:
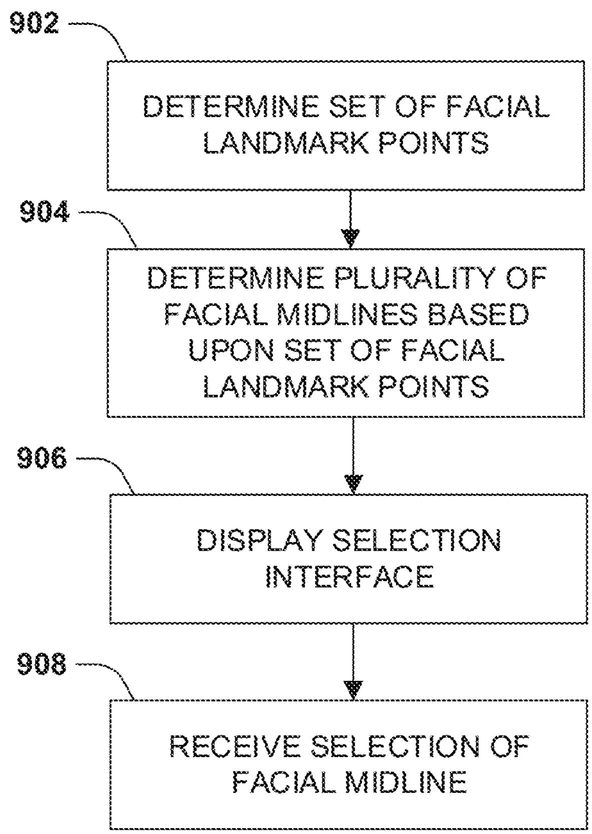
FIG. 9 is an illustration of an example method for determining a first facial midline.

In an example, the first set of facial landmark may comprise a first facial midline of the face of the first patient. FIG. 9 illustrates an example method 900 for determining the first facial midline. At 902, the first set of facial landmark points is determined. At 904, a plurality of facial midlines is determined based upon the first set of facial landmark points (and/or based upon other information). At 906, a facial midline selection interface may be displayed via a client device, such as a client device associated with a dental treatment professional. The facial midline selection interface may comprise representations of the plurality of facial midlines. At 908, a selection of the first facial midline, among the plurality of facial midlines, may be received. The selection of the first facial midline may be received via the facial midline selection interface. For example, the first facial midline may be used (by the landmark information system for landmark analysis, for example) based upon the selection of the first facial midline. Alternatively and/or additionally, one or more other facial midlines (of the plurality of facial midlines), other than the first facial midline, may be discarded and/or may not be used based upon the selection of the first facial midline.

Figure 10A:
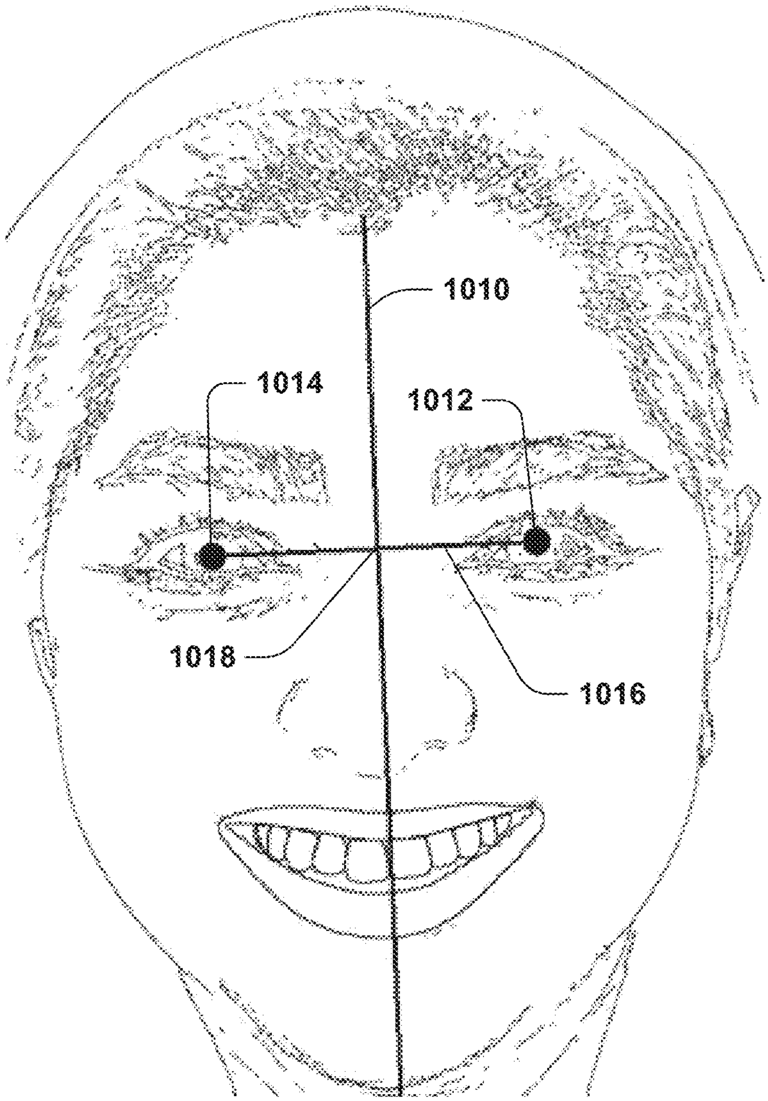
FIGS. 10A-10E illustrate determination of facial midlines, according to some embodiments.

FIGS. 10A-10E illustrate examples of determining the plurality of facial midlines. FIG. 10A illustrates determination of a second facial midline 1010 of the plurality of facial midlines. The second facial midline 1010 may be determined based upon two pupillary landmark points of the first set of facial landmark points. For example, the two pupillary landmark points may comprise a first pupillary landmark point 1014 and a second pupillary landmark point 1012. The second facial midline 1010 may be determined based upon a line 1016 (e.g., an inter-pupillary line) between the first pupillary landmark point 1014 and the second pupillary landmark point 1012 (e.g., the line 1016 extends from the first pupillary landmark point 1014 to the second pupillary landmark point 1012). In some examples, the second facial midline 1010 may be generated to be perpendicular to the line 1016 and to extend through a center point 1018 between the first pupillary landmark point 1014 and the second pupillary landmark point 1012 (e.g., a distance between the center point 1018 and the first pupillary landmark point 1014 may be the same as a distance between the center point 1018 and the second pupillary landmark point 1012).

Figure 10B:
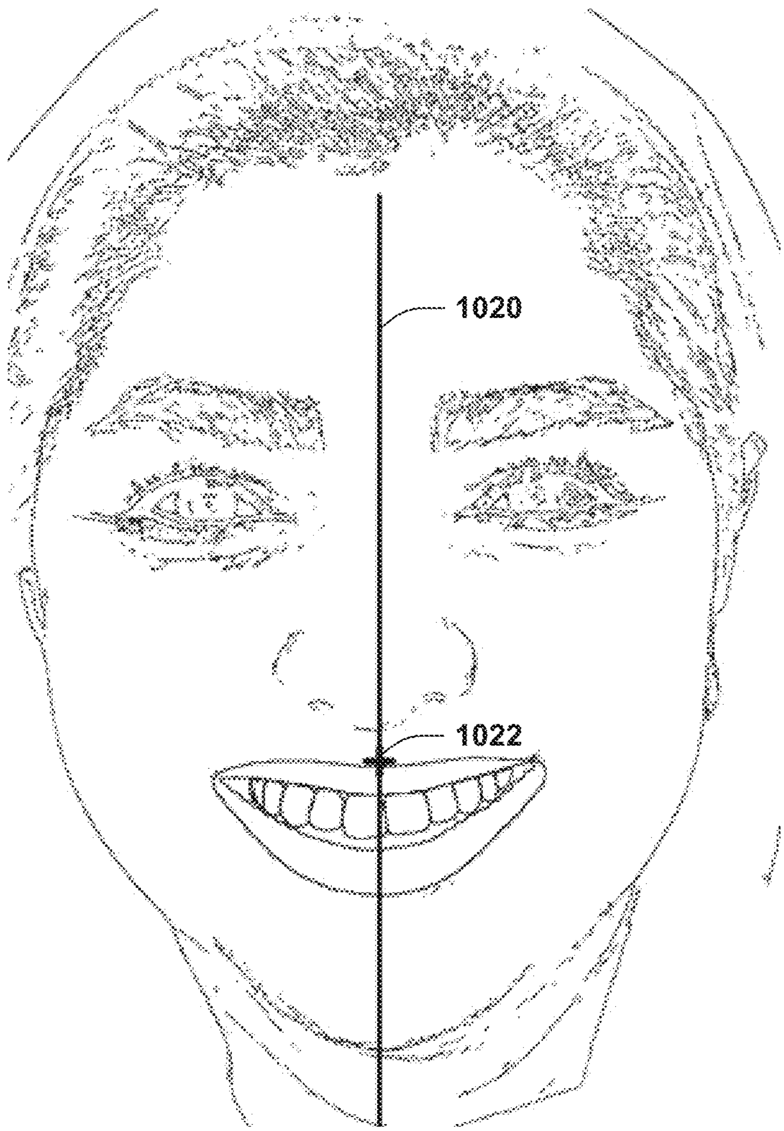

FIG. 10B illustrates determination of a third facial midline 1020 of the plurality of facial midlines. The third facial midline 1020 may be determined based upon a philtrum landmark point 1022 of the first set of facial landmark points. In an example, the third facial midline 1020 may be generated to be parallel to a vertical axis (e.g., y-axis) of an image of the first patient (e.g., an image based upon which the first set of facial landmark points are identified) and to cross the philtrum landmark point 1022.

Figure 10C:
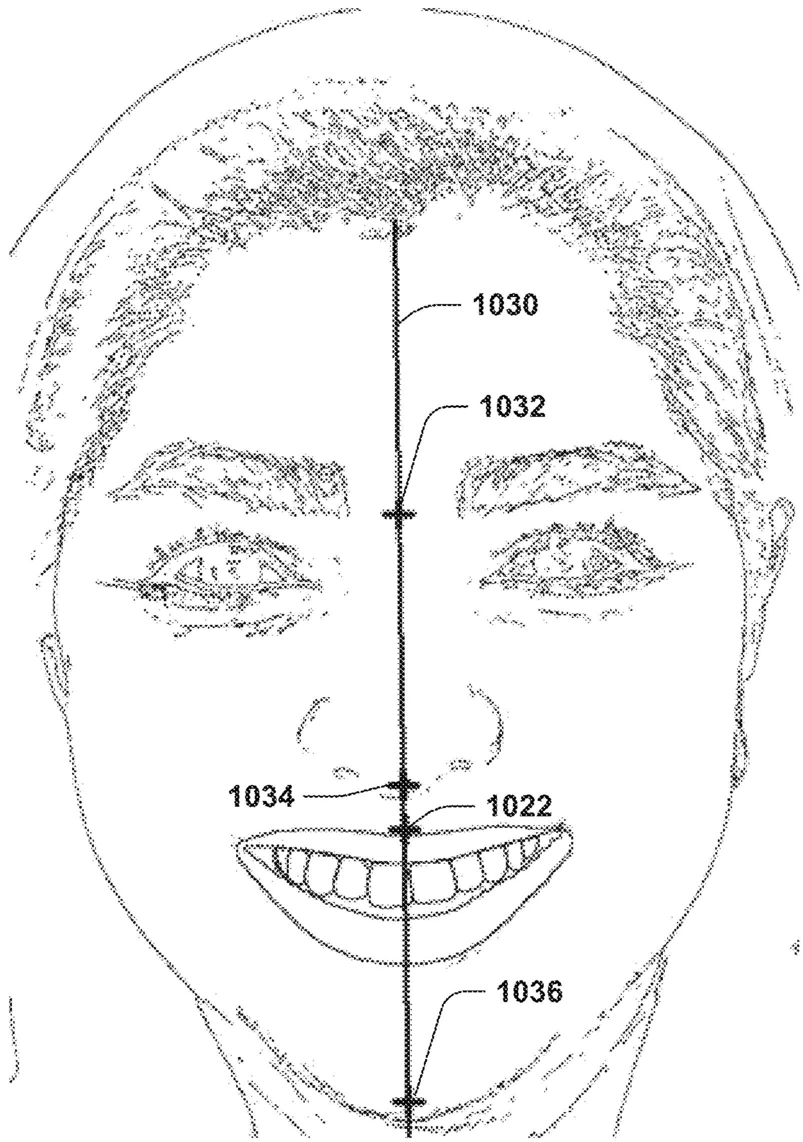

FIG. 10C illustrates determination of a fourth facial midline 1030 of the plurality of facial midlines. The fourth facial midline 1030 may be determined based upon a glabella landmark point 1032 of the first set of facial landmark points, a tip of nose landmark point 1034 of the first set of facial landmark points, the philtrum landmark point 1022 of the first set of facial landmark points, and/or a chin landmark point 1036 of the first set of facial landmark points. In an example, the fourth facial midline 1030 may be generated to extend through the glabella landmark point 1032, the tip of nose landmark point 1034, the philtrum landmark point 1022, and/or the chin landmark point 1036. In an example in which the glabella landmark point 1032, the tip of nose landmark point 1034, the philtrum landmark point 1022, and/or the chin landmark point 1036 have different horizontal axis (e.g., x-axis) values (e.g., horizontal axis coordinates), the fourth facial midline 1030 may have multiple line segments with varying slopes (e.g., a line segment of the fourth facial midline 1030 between the glabella landmark point 1032 and the tip of nose landmark point 1034 may have a different slope than a line segment of the fourth facial midline 1030 between the philtrum landmark point 1022 and the chin landmark point 1036).

Figure 10D:
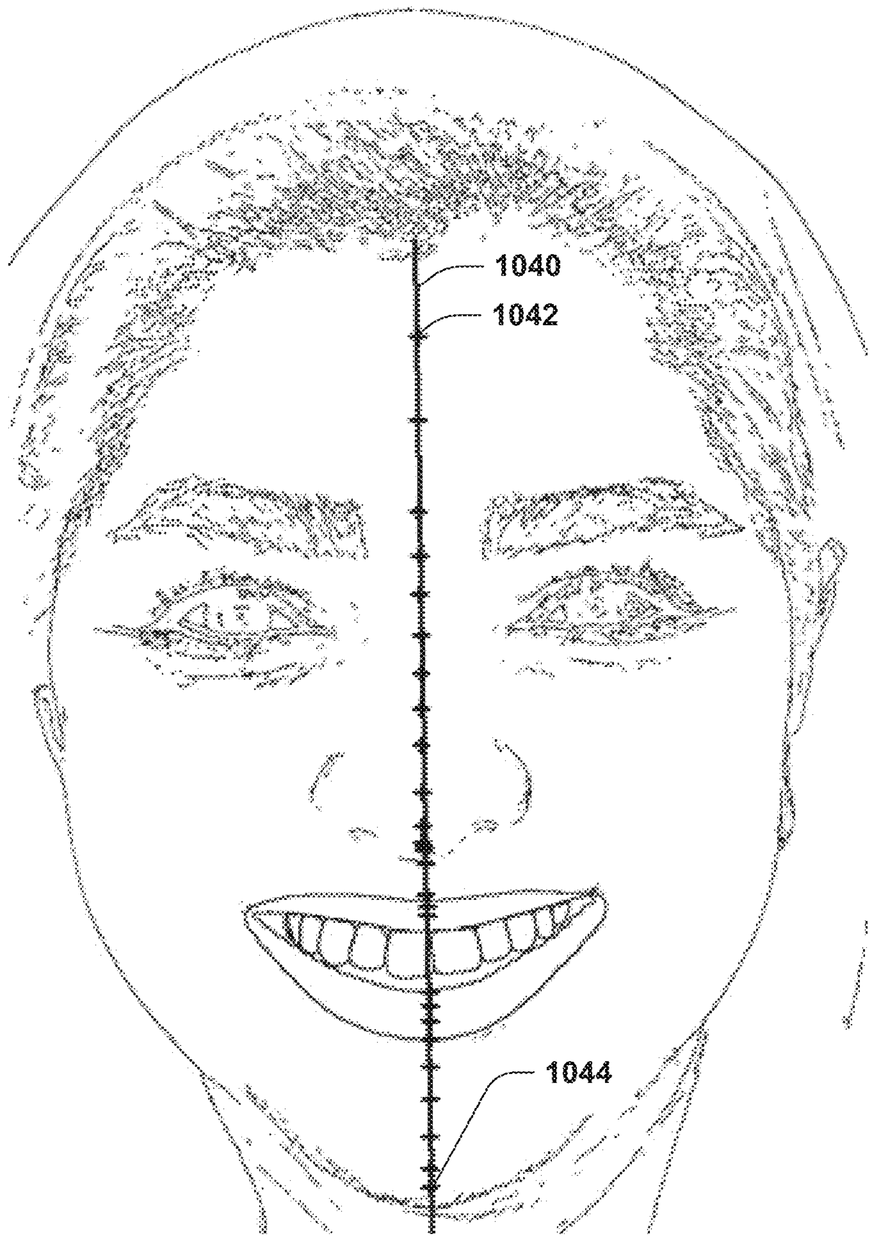

FIG. 10D illustrates determination of a fifth facial midline 1040 of the plurality of facial midlines. The fifth facial midline 1040 may be determined based upon a plurality of middle facial landmark points of the first set of facial landmark points. In some examples, the plurality of facial landmark points may correspond to landmark points, of the first set of facial landmark points, associated with a laterally center area of the face of the first patient (e.g., the plurality of facial landmark points may comprise facial landmark points that are classified as being at and/or near a lateral center of a face). In an example, the plurality of facial landmark points may comprise 28 facial landmark points (or other quantity of facial landmark points). In an example, the plurality of facial landmark points may comprise a forehead landmark point 1042 (e.g., a top of forehead landmark point), wherein the forehead landmark point 1042 may be a highest point of the plurality of facial landmark points. In an example, the plurality of facial landmark points may comprise a landmark point 1044 (e.g., a menton landmark point) at or below a chin of the first patient, wherein the landmark point 1044 may be a lowest point of the plurality of facial landmark points. In some examples, one or more operations (e.g., mathematical operations) may be performed using the plurality of facial landmark points to determine the fifth facial midline 1040. In an example, a least squares polynomial fit algorithm is used to fit a polynomial (e.g., a polynomial of degree 1, such as p(x)=mx+b) to the plurality of facial landmark points, wherein the fifth facial midline 1040 is based upon the polynomial, such as where the polynomial is an equation of the fifth facial midline 1040. In some examples, a squared error may be minimized to determine a slope and/or an intercept of the polynomial (such as based upon $E=\Sigma_{i=0}^{k}|p(x_i)-y_i|^2$).

Figure 10E:
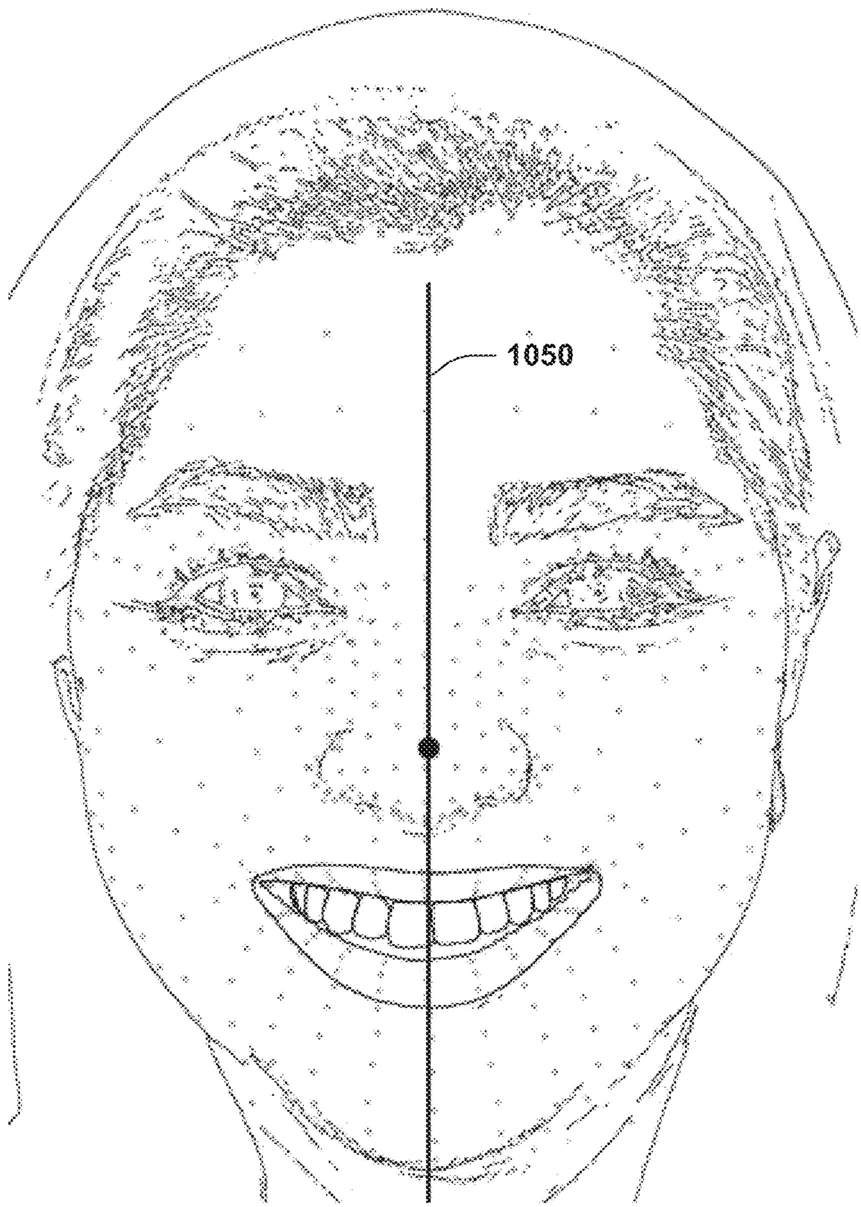

FIG. 10E illustrates determination of a sixth facial midline 1050 of the plurality of facial midlines. The sixth facial midline 1050 may be determined based upon horizontal axis values (e.g., values indicating lateral positions) of facial landmark points of the first set of facial landmark points (e.g., horizontal axis values of some or all facial landmark points of the first set of facial landmark points). A horizontal axis value of a point corresponds to a lateral position of the point. In some examples, a first horizontal axis value may be determined based upon the horizontal axis values. For example, the first horizontal axis value may be an average of the horizontal axis values. In some examples, the first horizontal axis value may be the horizontal axis value (e.g., x-axis value) of the sixth facial midline 1050 (e.g., an equation of the sixth facial midline 1050 may be x=a, wherein a is the first horizontal axis value). For example, the sixth facial midline 1050 is parallel to a vertical axis (e.g., y-axis).

In an example, the first landmark information (e.g., the first set of dental landmarks, the first set of gingival landmarks and/or the first set of labial landmarks) may comprise first segmentation information indicative of boundaries of teeth of the first patient, gums of the first patient and/or one or more lips of the first patient. In an example, the first segmentation information may be generated based upon one or more images of the one or more first images, such as an image comprising a representation of a non-close up view of the first patient and/or an image comprising a representation of a close up view of the first patient. In an example, the first segmentation information may be generated using the segmentation model 704 (discussed with respect to FIG. 7A and/or the example method 100 of FIG. 1) using one or more of the techniques provided herein with respect to the example method 100. Examples of the first segmentation information are shown in FIGS. 7B-7K. In an example, the first segmentation information may comprise instance segmentation information and/or semantic segmentation information.

In some examples, the first set of facial landmarks may comprise lip landmarks of the first patient. For example, the lip landmarks may comprise boundaries of lips of the first patient (indicated by the first segmentation information, for example). Alternatively and/or additionally, the lip landmarks may comprise one or more facial landmark points of the first set of facial landmark points.

In some examples, the first set of facial landmarks may comprise one or more nose landmarks of the first patient. For example, the one or more nose landmarks may comprise boundaries of a nose of the first patient. Alternatively and/or additionally, the nose landmarks may comprise one or more facial landmark points (e.g., at least one of subnasal landmark point, tip of nose landmark point, ala landmark point, etc.) of the first set of facial landmark points.

In some examples, the first set of facial landmarks may comprise cheek landmarks of the first patient. For example, the cheek landmarks may comprise an inner boundary, of a cheek, in the mouth of the first patient.

In some examples, the first set of dental landmarks may comprise at least one of one or more mesial lines of one or more teeth (e.g., mesial lines associated with mesial edges of central incisors), one or more distal lines of one or more teeth (e.g., distal lines associated with distal edges of central incisors and/or lateral incisors), one or more axial lines of one or more teeth, one or more dental plaque areas of one or more teeth (e.g., one or more areas of one or more teeth that have plaque), one or more caries, one or more erosion areas of one or more teeth (e.g., one or more areas of one or more teeth that are eroded), one or more abrasion areas of one or more teeth (e.g., one or more areas of one or more teeth that have abrasions), one or more abfraction areas of one or more teeth (e.g., one or more areas of one or more teeth in which tooth substance is lost), one or more attrition areas of one or more teeth (e.g., one or more areas of one or more teeth in which tooth structure and/or tissue is lost as a result of tooth-on-tooth contact), one or more contact areas (e.g., an area in which teeth are in contact with each other), a smile line of the first patient, one or more incisal embrasures, etc.

In some examples, the first set of gingival landmarks may comprise at least one of one or more gingival zeniths of gums of the first patient, one or more gingival lines of one or more teeth (e.g., gingival lines associated with gums of central incisors, lateral incisors and/or canines), papilla (e.g., interdental gingiva), one or more gingival levels of the first patient, one or more pathologies, etc.

In an example, the first set of oral landmarks may comprise at least one of one or more oral mucosa areas of oral mucosa of the first patient, a tongue area of the first patient, a sublingual area of the first patient, a soft palate area of the first patient, a hard palate area of the first patient, etc.

Figure 11A:
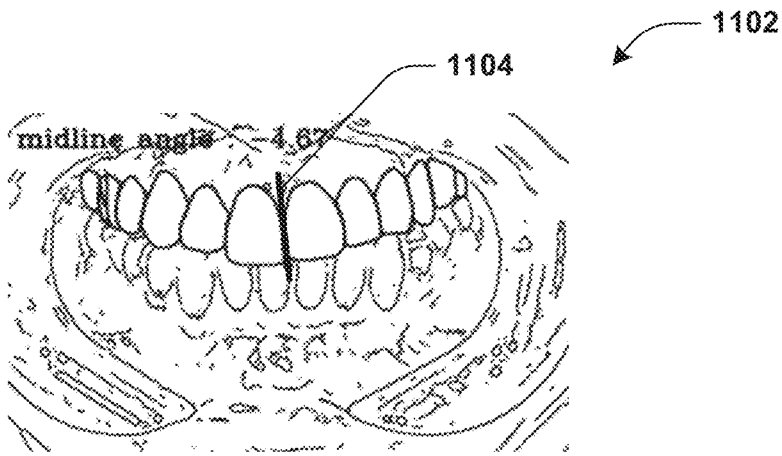
FIG. 11A illustrates a dental midline overlaying a representation of a mouth of a patient in retractor state, according to some embodiments.
Figure 11B:
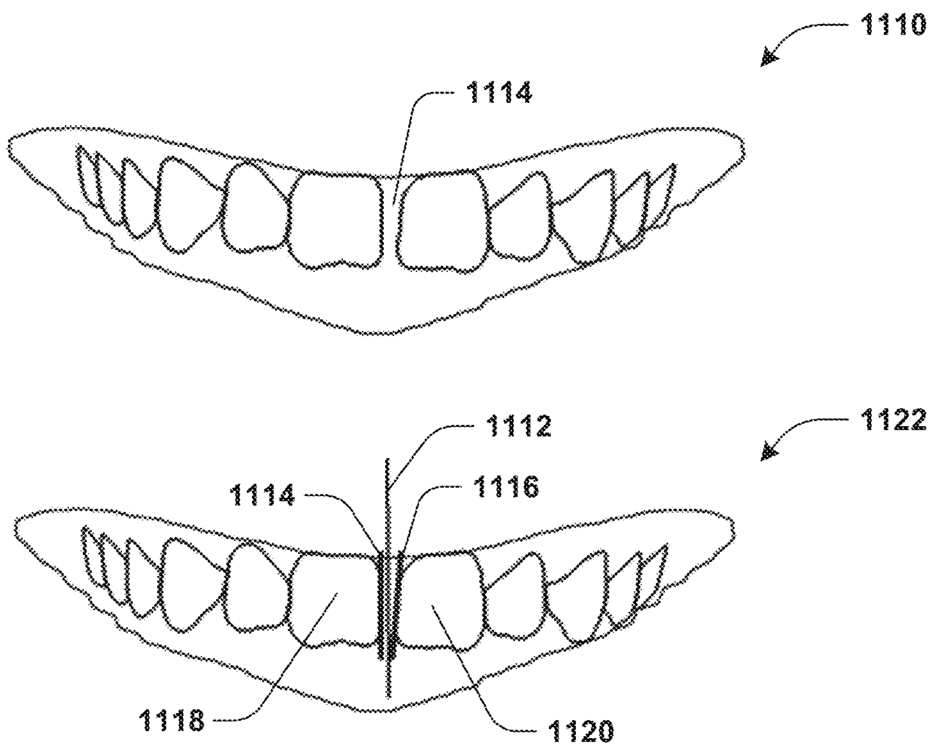
FIG. 11B illustrates determination of one or more dental midlines based upon first segmentation information, according to some embodiments.

In an example, the first set of dental landmarks may comprise one or more dental midlines (e.g., one or more mesial lines of one or more teeth). In an example, the one or more dental midlines may comprise an upper dental midline corresponding to a midline of upper teeth (e.g., upper central incisors) of the first patient and/or a lower dental midline corresponding to a midline of lower teeth (e.g., lower central incisors) of the first patient. In an example, the one or more dental midlines may be determined based upon the first segmentation information. For example, the first segmentation information may be analyzed to identify one or more mesial edges of one or more teeth, wherein the one or more dental midlines may be determined based upon the one or more mesial edges (e.g., the one or more mesial edges may comprise a mesial edge of a right central incisor and/or a mesial edge of a left central incisor, wherein a dental midline may be determined based upon the mesial edge of the right central incisor and/or the mesial edge of the left central incisor). In some examples, the one or more dental midlines may be determined using a dental midline determination system. In an example, the dental midline determination system may comprise a Convolutional Neural Network (CNN). In an example, the dental midline determination system may comprise U-Net and/or other convolutional network architecture. Examples of the one or more dental midlines are shown in FIGS. 11A-11B. FIG. 11A illustrates a dental midline 1104 (e.g., an upper dental midline) overlaying a representation of a mouth of the first patient in retractor state. FIG. 11B illustrates example determination of the one or more dental midlines based upon the first segmentation information. An example representation 1110 of the first segmentation information shows a diastema condition (e.g., a gap 1114 exists between upper central incisors).

In an example in which there is the diastema condition (e.g., the gap 1114 between upper central incisors), the one or more dental midlines may comprise a first dental midline 1114 (e.g., a first mesial line associated with a mesial edge of a right central incisor 1118) and a second dental midline 1116 (e.g., a second mesial line associated with a mesial edge of a left central incisor 1120). FIG. 11B shows a representation 1122 of the first dental midline 1114, the second dental midline 1116 and/or an example facial midline 1112 (e.g., the first facial midline) overlaying the example representation 1110 of the first segmentation information.

Figure 12:
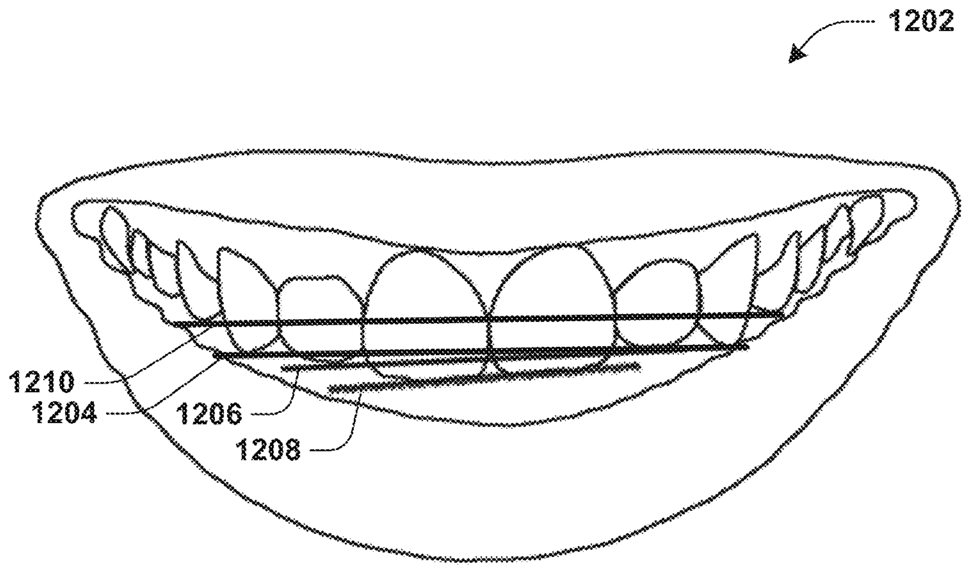
FIG. 12 illustrates an example of one or more incisal planes and/or one or more occlusal planes.

In an example, the first set of dental landmarks may comprise one or more incisal planes and/or one or more occlusal planes. In an example, an incisal plane of the one or more incisal planes may extend from a first incisal edge of a first anterior tooth to a second incisal edge of a second anterior tooth (e.g., the second anterior tooth may be opposite and/or may mirror the first anterior tooth). In an example, an occlusal plane of the one or more occlusal planes may extend from a first occlusal edge of a first posterior tooth to a second occlusal edge of a second posterior tooth (e.g., the second posterior tooth may be opposite and/or may mirror the first posterior tooth). In an example, the one or more incisal planes and/or the one or more occlusal planes may be generated based upon the first segmentation information. For example, the first segmentation information may be analyzed to identify one or more incisal edges of one or more teeth (e.g., anterior teeth), wherein the one or more incisal planes may be generated based upon the one or more incisal edges. Alternatively and/or additionally, the first segmentation information may be analyzed to identify one or more occlusal edges of one or more teeth (e.g., posterior teeth), wherein the one or more occlusal planes may be generated based upon the one or more occlusal edges. FIG. 12 illustrates an example of the one or more incisal planes and/or the one or more occlusal planes. In FIG. 12, the one or more incisal planes and/or the one or more occlusal planes overlay an example representation 1202 of the first segmentation information. In an example, the one or more incisal planes comprise a first incisal plane 1204 extending from an incisal edge of a right canine to an incisal edge of a left canine, a second incisal plane 1206 extending from an incisal edge of a right lateral incisor to an incisal edge of a left lateral incisor and/or a third incisal plane 1208 extending from an incisal edge of a right central incisor to an incisal edge of a left central incisor. In an example, the one or more occlusal planes may comprise an occlusal plane 1210 extending from an occlusal edge of a right first bicuspid to an occlusal edge of a left first bicuspid.

Figure 13:
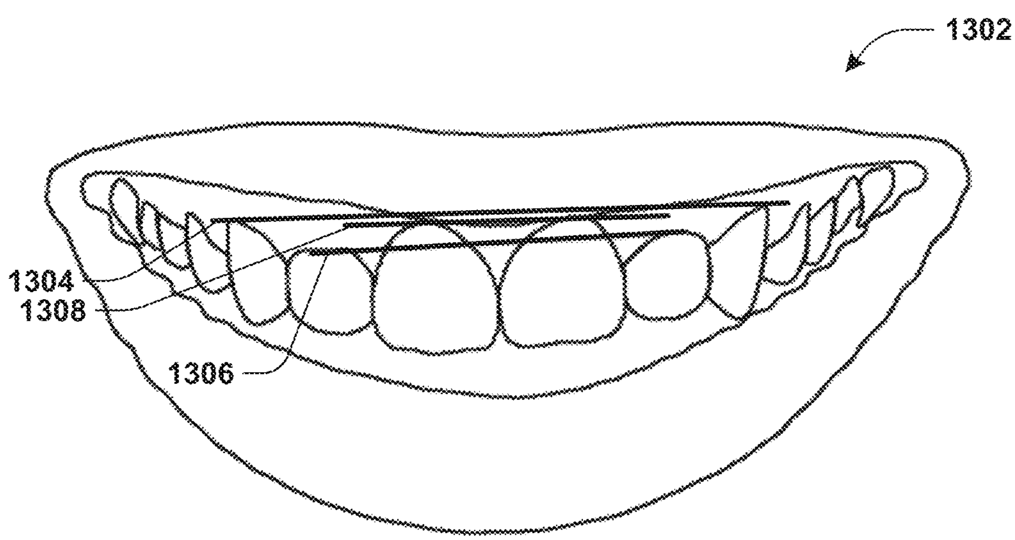
FIG. 13 illustrates an example of one or more gingival planes.

In an example, the first set of gingival landmarks may comprise one or more gingival planes. In an example, a gingival plane of the one or more gingival planes may extend from a first gingival point of a first tooth to a second gingival point of a second tooth (e.g., the second tooth may be opposite and/or may mirror the first tooth). In some examples, the first gingival point may be at a boundary between the first tooth and gums of the first patient. In an example, the first gingival point may correspond to a first gingival zenith over the first tooth (and/or the first gingival point may be in an area of gums that comprises and/or is adjacent to the first gingival zenith). In some examples, the second gingival point may be at a boundary between the second tooth and gums of the first patient. In an example, the second gingival point may correspond to a second gingival zenith over the second tooth (and/or the second gingival point may be in an area of gums that comprises and/or is adjacent to the second gingival zenith). In an example, the one or more gingival planes may be generated based upon the first segmentation information. For example, the first segmentation information may be analyzed to identify one or more boundaries that separate one or more teeth from gums of the first patient (and/or to identify one or more gingival zeniths), wherein the one or more gingival planes may be generated based upon the one or more boundaries (and/or the one or more gingival zeniths). FIG. 13 illustrates an example of the one or more gingival planes. In FIG. 13, the one or more gingival planes overlay an example representation 1302 of the first segmentation information. In an example, the one or more gingival planes comprise a first gingival plane 1304 extending from a gingival point (e.g., a gingival zenith) of a right canine to a gingival point (e.g., a gingival zenith) of a left canine, a second gingival plane 1306 extending from a gingival point (e.g., a gingival zenith) of a right lateral incisor to a gingival point (e.g., a gingival zenith) of a left lateral incisor and/or a third gingival plane 1308 extending from a gingival point (e.g., a gingival zenith) of a right central incisor to a gingival point (e.g., a gingival zenith) of a left central incisor.

Figure 14A:
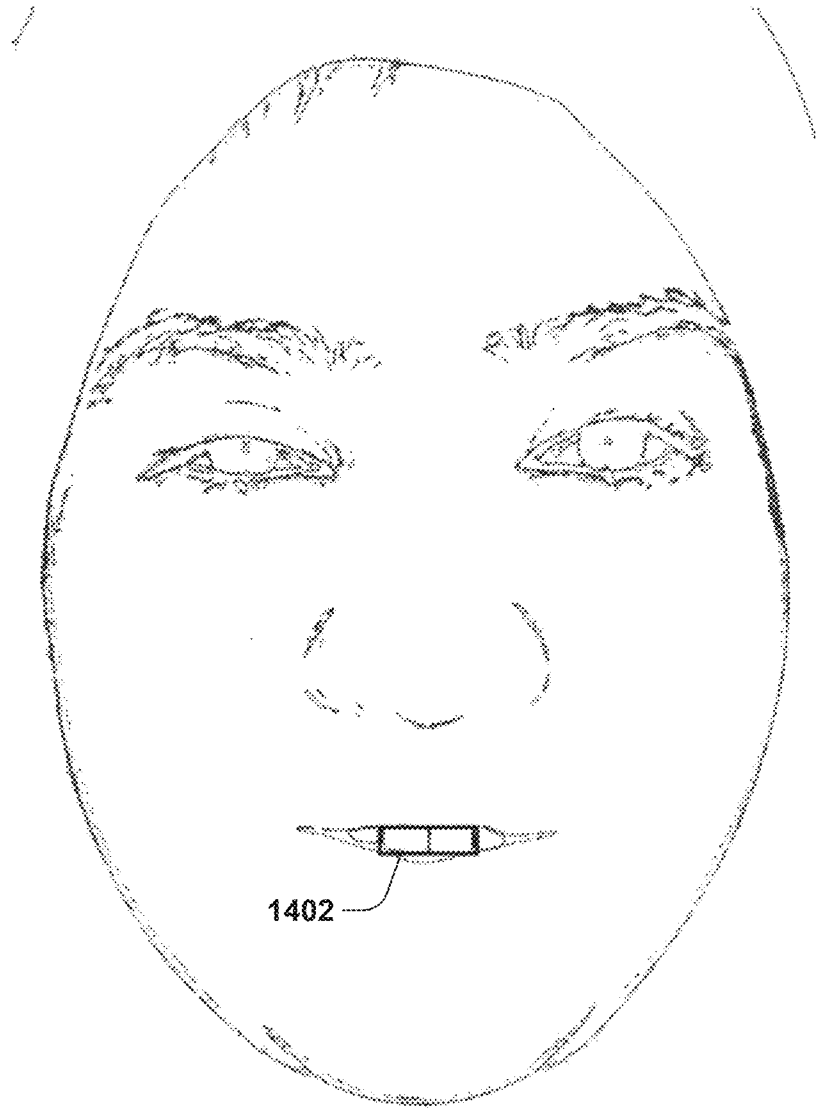
FIGS. 14A-14C illustrate examples of one or more tooth show areas.
Figure 14B:
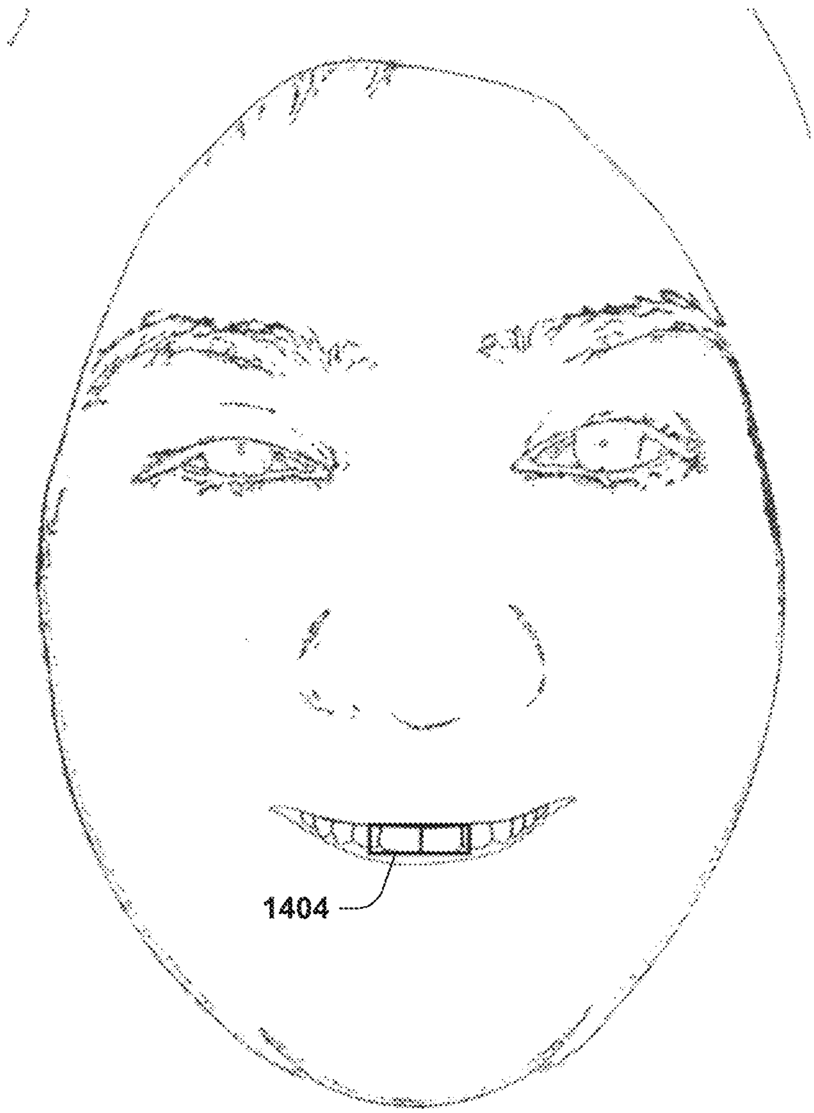
Figure 14C:
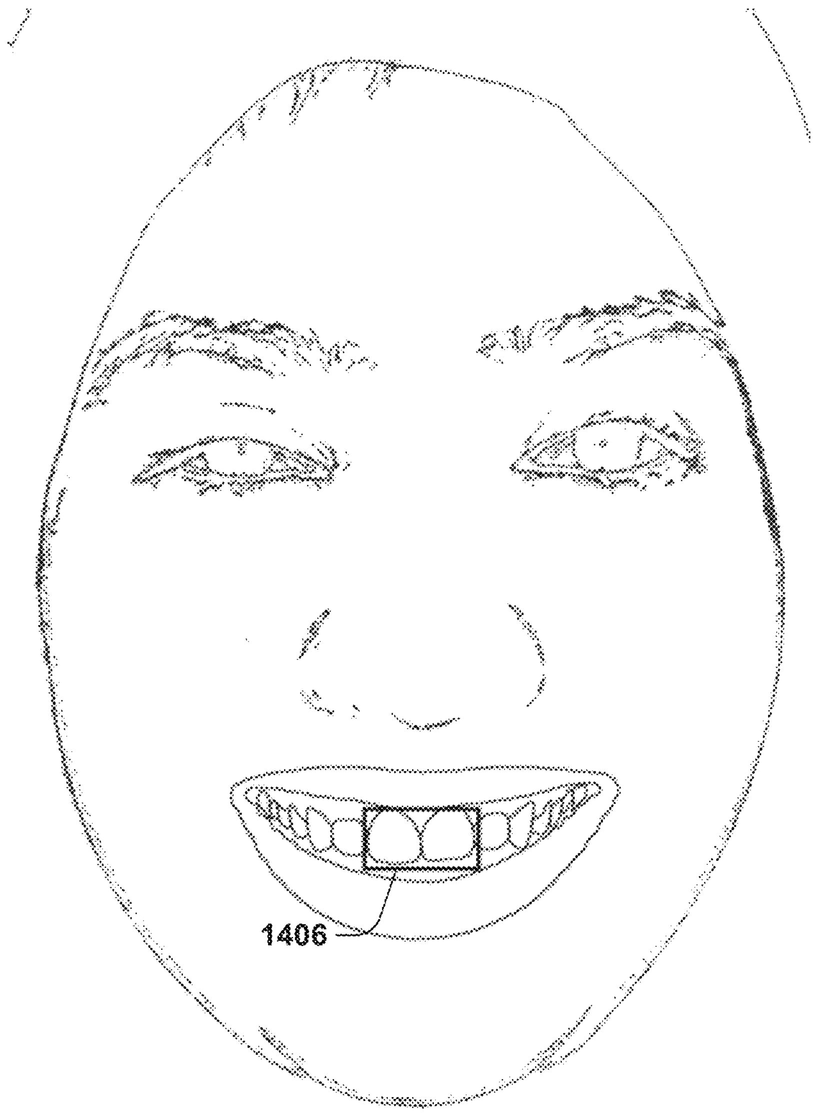

In an example, the first set of dental landmarks may comprise one or more tooth show areas. In an example, a tooth show area of the one or more tooth show areas may correspond to an area in which one or more teeth of the first patient are exposed. For example, a tooth show area of the one or more tooth show areas may correspond to an area in which two upper central incisors are exposed. In some examples, the one or more tooth show areas may comprise tooth show areas associated with multiple mouth states of the first patient. In an example, the one or more tooth show areas may be determined based upon the first segmentation information. For example, the one or more tooth show areas may be determined based upon boundaries of teeth indicated by the first segmentation information. FIGS. 14A-14C illustrate examples of the one or more tooth show areas. FIG. 14A illustrates a first tooth show area 1402 of the one or more tooth show areas. The first tooth show area 1402 may be associated with a vocalization state associated with the first patient pronouncing the term "emma". In an example, the first tooth show area 1402 may be determined based upon segmentation information, of the first segmentation information, indicative of boundaries of teeth and/or lips of the first patient when the first patient is in the vocalization state associated with the first patient pronouncing the term "emma" (e.g., the segmentation information may be generated based upon an image in which the mouth of the first patient is in the vocalization state associated with the first patient pronouncing the term "emma", such as where the image is captured after and/or upon completion of pronouncing the term "emma"). FIG. 14B illustrates a second tooth show area 1404 of the one or more tooth show areas. The second tooth show area 1404 may be associated with a vocalization state associated with the first patient pronouncing the letter "e". In an example, the second tooth show area 1404 may be determined based upon segmentation information, of the first segmentation information, indicative of boundaries of teeth and/or lips of the first patient when the first patient is in the vocalization state associated with the first patient pronouncing the letter "e" (e.g., the segmentation information may be generated based upon an image in which the mouth of the first patient is in the vocalization state associated with the first patient pronouncing the letter "e", such as where the image is captured while the first patient is pronouncing the letter "e"). FIG. 14C illustrates a third tooth show area 1406 of the one or more tooth show areas. The third tooth show area 1406 may be associated with the smile state. In an example, the third tooth show area 1406 may be determined based upon segmentation information, of the first segmentation information, indicative of boundaries of teeth and/or lips of the first patient when the first patient is in the smile state (e.g., the segmentation information may be generated based upon an image in which the mouth of the first patient is in the smile state, such as where the image is captured while the first patient is smiling). Alternatively and/or additionally, the one or more tooth show areas may comprise a fourth tooth show area (not shown) associated with the retractor state. In an example, the fourth tooth show area may be determined based upon segmentation information, of the first segmentation information, indicative of boundaries of teeth and/or lips of the first patient when the first patient is in the retractor state (e.g., the segmentation information may be generated based upon an image in which the mouth of the first patient is in the retractor state, such as where the image is captured while a retractor is in the mouth of the first patient).

Figure 15:
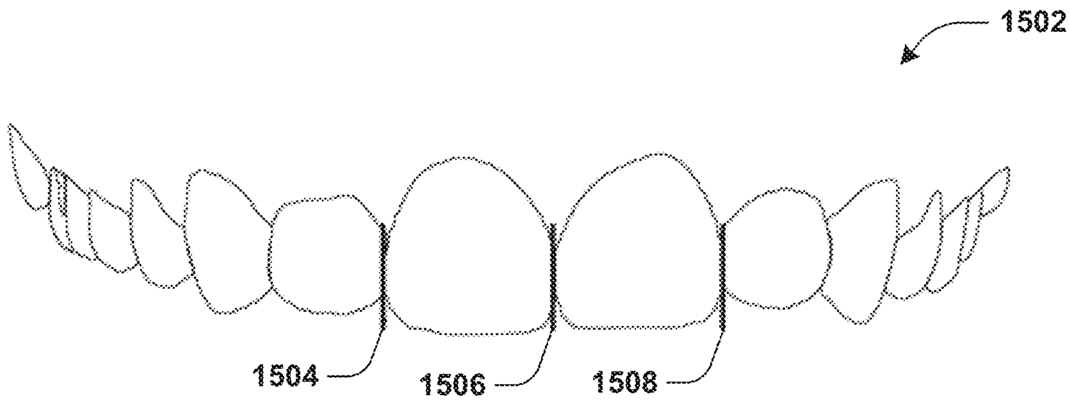
FIG. 15 illustrates examples of one or more tooth edge lines.

In an example, the first set of dental landmarks may comprise one or more tooth edge lines. In an example, a tooth edge line of the one or more tooth edge lines may be positioned at an edge (e.g., a mesial edge or a distal edge) of a tooth. FIG. 15 illustrates examples of the one or more tooth edge lines. In FIG. 15, the one or more tooth edge lines overlay an example representation 1502 of the first segmentation information. A tooth edge line of the one or more tooth edge lines may be parallel to a vertical axis. In some examples, the one or more tooth edge lines comprise a first tooth edge line 1504 based upon a distal edge of a right upper central incisor and/or a second tooth edge line 1504 based upon a distal edge of a left upper central incisor. In some examples, an incisor midline 1506 (of the first set of dental landmarks, for example) may be determined based upon the first tooth edge line 1504 and the second tooth edge line 1504. For example, a lateral position of the incisor midline 1506 may be equidistant from a lateral position of the first tooth edge line 1504 and the second tooth edge line 1504.

Figure 16:
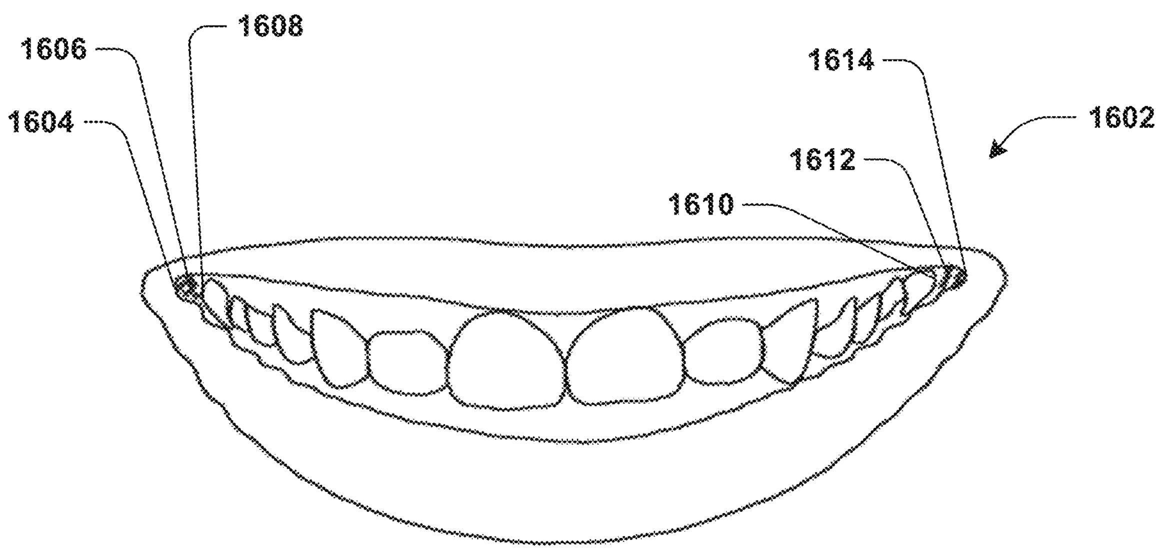
FIG. 16 illustrates examples of one or more buccal corridor areas.

In an example, the first set of oral landmarks may comprise one or more buccal corridor areas. In an example, a buccal corridor area corresponds to a space between an edge of teeth of the first patient and at least one of an inner cheek, a commissure (e.g., lateral commissure) of lips, etc. of the first patient. In some examples, the one or more buccal corridor areas may be determined based upon the first segmentation information. For example, the first segmentation information may be analyzed to identify an edge point of teeth of the first patient and a commissural point of lips of the first patient, wherein a buccal corridor area of the one or more buccal corridor areas is identified based upon the edge point and/or the commissural point. Alternatively and/or additionally, the commissural point may be determined based upon the first set of facial landmark points (e.g., the first set of facial landmark points may comprise a landmark point corresponding to the commissural point). FIG. 16 illustrates examples of the one or more buccal corridor areas. In FIG. 16, the one or more buccal corridor areas overlay a representation 1602 of the first segmentation information. In an example, the one or more buccal corridor areas comprises a first buccal corridor area 1606 (e.g., right buccal corridor area) and/or a second buccal corridor area 1612 (e.g., left buccal corridor area). The first buccal corridor area 1606 corresponds to an area between a first commissure 1604 (e.g., right commissure of lips of the first patient) and a first edge 1608 of teeth of the first patient. The first edge 1608 may correspond to an outer edge (e.g., right outer edge) of teeth of the first patient. The second buccal corridor area 1612 corresponds to an area between a second commissure 1614 (e.g., left commissure of lips of the first patient) and a second edge 1610 of teeth of the first patient. The second edge 1610 may correspond to an outer edge (e.g., left outer edge) of teeth of the first patient.

In some examples, first characteristic information may be determined based upon the one or more first images. For example, one, some and/or all of the one or more first images may be analyzed to determine the first characteristic information indicative of one or more characteristics of at least one of one or more facial characteristics, one or more dental characteristics, one or more gingival characteristics, etc. In an example, the first characteristic information may comprise at least one of a skin color of the face of the first patient, a lip color of one or more lips of the first patient, a hair color of hair of the first patient, a color of gums of the first patient, etc.

At 806, a landmark information interface may be displayed via a first client device. In an example, the first client device may be associated with a dental treatment professional such as at least one of a dentist, a mouth design dentist, an orthodontist, a dental technician, a mouth design technician, etc. For example, the dental treatment professional may use the landmark information interface to at least one of identify one or more landmarks of the first patient, identify relationships between landmarks of the first patient, diagnose one or more medical conditions of the first patient, form a treatment plan for treating one or more medical conditions of the first patient, etc. The first client device may be at least one of a phone, a smartphone, a wearable device, a laptop, a tablet, a computer, etc.

In some examples, the landmark information interface may comprise a representation of a first image of the one or more first images and/or one or more graphical objects indicative of one or more relationships between landmarks of the first landmark information and/or one or more landmarks of the first landmark information. In some examples, one, some and/or all of the one or more graphical objects may be displayed overlaying the representation of the first image. In some examples, a thickness of one or more lines, curves and/or shapes of the one or more graphical objects may be at most a threshold thickness (e.g., the threshold thickness may be a thickness of one pixel, a thickness of two pixels or other thickness) to increase display accuracy of the one or more graphical objects and/or such that the one or more graphical objects accurately identify the one or more landmarks and/or the one or more relationships. In an example, the representation of the first image may be an unedited version of the first image. Alternatively and/or additionally, the first image may be modified (e.g., processed using one or more image processing techniques) to generate the representation of the first image. Alternatively and/or additionally, the representation of the first image may comprise a representation of segmentation information (of the first segmentation information, for example) generated based upon the first image (e.g., the representation may be indicative of boundaries of features in the first image, such as at least one of one or more facial features, one or more dental features, one or more gingival features, etc.). In some examples, the landmark information interface may display the one or more graphical objects overlaying the representation. In an example, a graphical object of the one or more graphical objects may comprise (e.g., may be) at least one of a set of text, an image, a shape (e.g., a line, a circle, a rectangle, etc.), etc.

In some examples, the landmark information interface may comprise one or more graphical objects indicative of one or more characteristics of the first characteristic information.

Figure 17A:
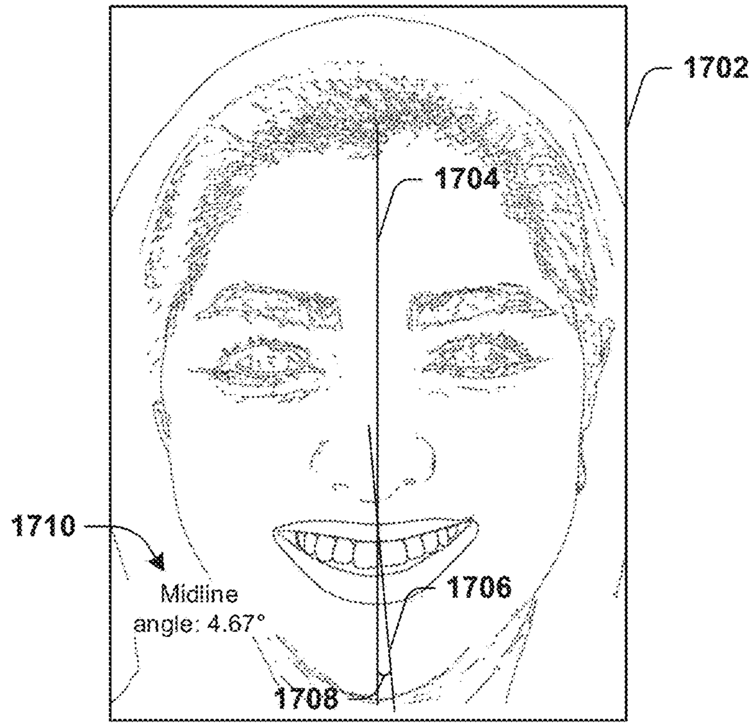
FIG. 17A illustrates an example of a landmark information interface.
Figure 17B:
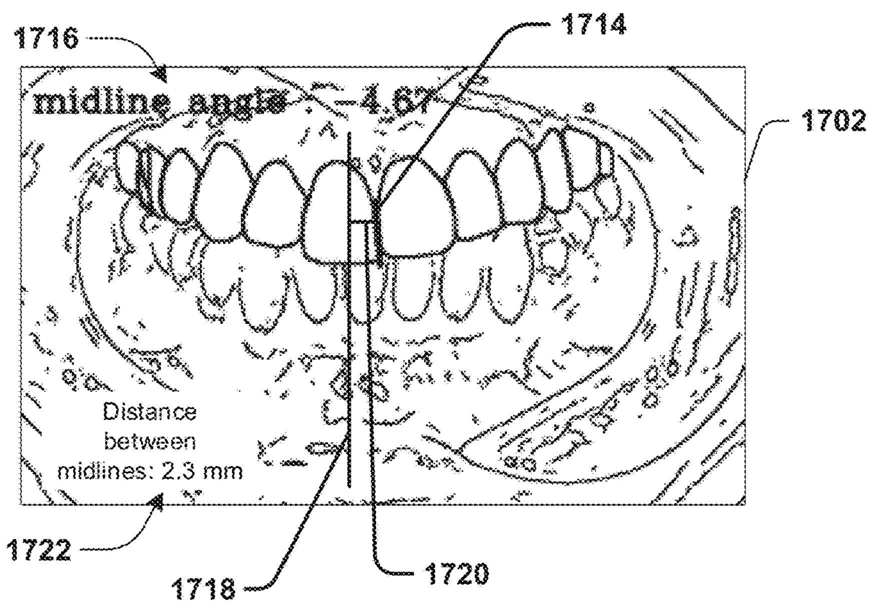
FIG. 17B illustrates an example of a landmark information interface.

In an example, the landmark information interface may display one or more graphical objects indicating the first facial midline (e.g., a graphical object corresponding to the first facial midline may be displayed based upon the selection of the first facial midline, from among the plurality of facial midlines, via the facial midline selection interface), the one or more dental midlines and/or a relationship between the first facial midline and a dental midline of the one or more dental midlines. In an example, the relationship comprises a distance between the first facial midline and the dental midline, whether or not the distance is larger than a threshold distance (e.g., the threshold distance may be 2 millimeters or other value), an angle of the dental midline relative to the first facial midline and/or whether or not the angle is larger than a threshold angle (e.g., the threshold angle may be 0.5 degrees or other value). FIG. 17A illustrates an example of the landmark information interface (shown with reference number 1702) displaying a graphical object 1704 indicating the first facial midline, a graphical object 1706 indicating the dental midline, and/or a graphical object 1710 indicating an angle 1708 of the dental midline relative to the first facial midline. In an example, the graphical object 1710 (and/or a different graphical object displayed via the landmark information interface 1702) may indicate whether or not the angle 1708 is larger than the threshold angle. For example, if the angle 1708 is larger than the threshold angle, the graphical object 1710 (and/or a different graphical object displayed via the landmark information interface 1702) may be displayed having a first color (e.g., red). Alternatively and/or additionally, if the angle 1708 is smaller than the threshold angle, the graphical object 1710 (and/or a different graphical object displayed via the landmark information interface 1702) may be displayed having a second color (e.g., green). In an example, the angle 1708 being larger than the threshold angle may be indicative of a medical condition, an aesthetic condition and/or a dental condition of the first patient (e.g., a problematic condition for which one or more treatments may be provided). Accordingly, indicating that the angle 1708 is larger than the threshold angle may enable a user (e.g., dental treatment professional) to accurately and/or quickly identify and/or treat the medical condition, the aesthetic condition and/or the dental condition. In some examples, the dental midline may be determined based upon segmentation information, of the first segmentation information, generated based upon an image (of the one or more first images) comprising a representation of a close up view of the first patient (e.g., a close up view of the first patient in frontal position). In the example shown in FIG. 17A, the graphical object 1704, the graphical object 1706, and/or the graphical object 1710 are displayed overlaying a representation of an image comprising a view (e.g., a non-close up view) of the first patient in frontal position. FIG. 17B illustrates an example of the landmark information interface 1702 displaying a graphical object 1718 indicating the first facial midline, a graphical object 1714 indicating the dental midline, a graphical object 1716 indicating the angle 1708 of the dental midline relative to the first facial midline and/or a graphical object 1722 indicating a distance 1720 between the first facial midline and the dental midline. In an example, the graphical object 1716 (and/or a different graphical object displayed via the landmark information interface 1702) may indicate whether or not the angle 1708 is larger than the threshold angle (e.g., a color of the graphical object 1716 may indicate whether or not the angle 1708 is larger than the threshold angle). In an example, the graphical object 1722 (and/or a different graphical object displayed via the landmark information interface 1702) may indicate whether or not the distance 1720 between the first facial midline and the dental midline is larger than the threshold distance (e.g., a color of the graphical object 1722 may indicate whether or not the distance 1720 is larger than the threshold distance). In an example, the distance 1720 being larger than the threshold distance may be indicative of a medical condition, an aesthetic condition and/or a dental condition of the first patient (e.g., a problematic condition for which one or more treatments may be provided). Accordingly, indicating that the distance 1720 is larger than the threshold distance may enable a user (e.g., dental treatment professional) to accurately and/or quickly identify and/or treat the medical condition, the aesthetic condition and/or the dental condition. In some examples, the distance 1720 may be determined based upon a quantity of pixels (e.g., a pixel distance) between the first facial midline and the dental midline (e.g., one or more other distances provided herein may be determined based upon a quantity of pixels and/or a pixel distance between two points. For example, one or more operations (e.g., mathematical operations) may be performed using the quantity of pixels and/or a pixel size (e.g., a distance across one pixel). In the example shown in FIG. 17B, the graphical object 1718, the graphical object 1714, the graphical object 1716 and/or the graphical object 1722 are displayed overlaying a representation of an image comprising a view (e.g., a close up view) of the first patient in frontal position (such as a view of the first patient in retractor state).

In some examples, the landmark information interface 1702 may display a graphical object comprising a representation of segmentation information of the first segmentation information. In an example, the graphical object may be indicative of boundaries of at least one of teeth of the first patient, gums of the first patient, lips of the first patient, dentin layer of the first patient (e.g., dentin layer of composite veneers and/or teeth of the first patient), etc. For example, the graphical object may enable a user (e.g., the dental treatment professional) to distinguish between at least one of teeth, gums, lips, dentin layer, etc. Examples of the graphical object are shown in FIGS. 7B-7K. In an example, the graphical object may have multiple colors representative of different features (e.g., teeth, gums, lips, etc.), such as shown in FIGS. 7E-7I). In an example, the graphical object may be displayed overlaying a representation of an image of the one or more first images. In an example, the segmentation information (of the first segmentation information) may be determined based upon a different image, other than the image, of the one or more first images. In an example, the segmentation information may be determined based upon an image comprising a close up view of the first patient and/or the representation of the image (on which the representation of the segmentation information is overlaid) may show a non-close up view of the first patient.

In some examples, the landmark information interface 1702 may display one or more graphical objects indicating one or more facial landmarks of the first set of facial landmarks of the face of the first patient. For example, the one or more facial landmarks may comprise one, some and/or all of the first set of facial landmarks. In some examples, a graphical object of the one or more graphical objects may comprise a shape (e.g., a line, a curve, a circle and/or a point) marking a position of a facial landmark and/or may comprise a set of text identifying the facial landmark (e.g., the set of text may comprise one or more letters and/or one or more terms that identify the facial landmark, such as “FM” or “Facial Midline” to identify the first facial midline). In an example, the set of text may be displayed in response to a selection of the shape via the landmark information interface 1702. In an example, the one or more graphical objects indicating the one or more facial landmarks may be displayed overlaying a representation of an image of the one or more first images.

In an example, the landmark information interface 1702 may display one or more graphical objects indicating one or more facial landmark points of the first set of facial landmark points of the face of the first patient. For example, the one or more facial landmark points may comprise one, some and/or all of the first set of facial landmark points. In some examples, a graphical object of the one or more graphical objects may comprise a shape (e.g., a circle and/or a point) marking a position of a facial landmark point and/or may comprise a set of text identifying the facial landmark point (e.g., the set of text may comprise one or more letters and/or one or more terms that identify the facial landmark point, such as “G” or “Glabella” to identify a glabella landmark point). In an example, the set of text may be displayed in response to a selection of the shape via the landmark information interface 1702. In an example, the one or more graphical objects indicating the one or more facial landmark points may be displayed overlaying a representation of an image of the one or more first images.

In some examples, the landmark information interface 1702 may display one or more graphical objects indicating one or more dental landmarks of the first set of dental landmarks of the first patient. For example, the one or more dental landmarks may comprise one, some and/or all of the first set of dental landmarks. In some examples, a graphical object of the one or more graphical objects may comprise a shape (e.g., a line, a curve, a circle and/or a point) marking a position of a dental landmark and/or may comprise a set of text identifying the dental landmark (e.g., the set of text may comprise one or more letters and/or one or more terms that identify the dental landmark, such as “Abf” or “Abfraction” to identify an abfraction area). In an example, the set of text may be displayed in response to a selection of the shape via the landmark information interface 1702. In an example, the one or more graphical objects indicating the one or more dental landmarks may be displayed overlaying a representation of an image of the one or more first images.

In some examples, the landmark information interface 1702 may display one or more graphical objects indicating one or more gingival landmarks of the first set of gingival landmarks of the first patient. For example, the one or more gingival landmarks may comprise one, some and/or all of the first set of gingival landmarks. In some examples, a graphical object of the one or more graphical objects may comprise a shape (e.g., a line, a curve, a circle and/or a point) marking a position of a gingival landmark and/or may comprise a set of text identifying the gingival landmark (e.g., the set of text may comprise one or more letters and/or one or more terms that identify the gingival landmark, such as “Z” or “Zenith” to identify a gingival zenith). In an example, the set of text may be displayed in response to a selection of the shape via the landmark information interface 1702. In an example, the one or more graphical objects indicating the one or more gingival landmarks may be displayed overlaying a representation of an image of the one or more first images.

In some examples, the landmark information interface 1702 may display one or more graphical objects indicating one or more oral landmarks of the first set of oral landmarks of the first patient. For example, the one or more oral landmarks may comprise one, some and/or all of the first set of oral landmarks. In some examples, a graphical object of the one or more graphical objects may comprise a shape (e.g., a line, a curve, a circle and/or a point) marking a position of a mouth landmark and/or may comprise a set of text identifying the mouth landmark (e.g., the set of text may comprise one or more letters and/or one or more terms that identify the mouth landmark, such as “OM” or “Oral mucosa” to identify an oral mucosa area). In an example, the set of text may be displayed in response to a selection of the shape via the landmark information interface 1702. In an example, the one or more graphical objects indicating the one or more oral landmarks may be displayed overlaying a representation of an image of the one or more first images.

In some examples, the landmark information interface 1702 may display one or more graphical objects indicating the one or more incisal planes. In an example, a graphical object of the one or more graphical objects may comprise a shape (e.g., a line) representative of an incisal plane of the one or more incisal planes (such as the first incisal plane 1204, the second incisal plane 1206 and/or the third incisal plane 1208 shown in FIG. 12), wherein the graphical object (and/or a different graphical object displayed via the landmark information interface 1702) may indicate whether or not an angle associated with the incisal plane (e.g., an angle of the incisal plane relative to a horizontal axis) is larger than a first incisal plane threshold angle and/or a second incisal plane threshold angle. For example, a color of the graphical object may indicate whether or not the angle is larger than the first incisal plane threshold angle and/or the second incisal plane threshold angle. In an example, the first incisal plane threshold angle is smaller than the second incisal plane threshold angle. In an example, the angle being larger than the first incisal plane threshold angle may be indicative of a medical condition, an aesthetic condition and/or a dental condition of the first patient (e.g., a problematic condition for which one or more treatments may be provided) with a first level of criticality. In an example, the angle being larger than the second incisal plane threshold angle may be indicative of a medical condition, an aesthetic condition and/or a dental condition of the first patient (e.g., a problematic condition for which one or more treatments may be provided) with a second level of criticality (higher than the first level of criticality, for example). In an example, the color of the graphical object may be green if the angle is not larger than the first incisal plane threshold angle (e.g., the first incisal plane threshold angle may be 0 degrees or other value). In an example, the color of the graphical object may be yellow (to indicate a condition with the first level of criticality) if the angle is larger than the first incisal plane threshold angle and smaller than the second incisal plane threshold angle (e.g., the second incisal plane threshold angle may be 4 degrees or other value). In an example, the color of the graphical object may be red (to indicate a condition with the second level of criticality higher than the first level of criticality) if the angle is larger than the second incisal plane threshold angle. Indicating that the angle is larger than the first incisal plane threshold angle or the second incisal plane threshold angle may enable a user (e.g., dental treatment professional) to accurately and/or quickly identify and/or treat a medical condition, an aesthetic condition and/or a dental condition. In some examples, a deviation of maxilla and/or mandible may be determined based upon the one or more incisal planes (e.g., an angle associated with an incisal plane being larger than the first incisal plane threshold angle and/or the second incisal plane threshold angle may be indicative of the deviation of maxilla and/or mandible), wherein an indication of the deviation of maxilla and/or mandible may be displayed via the landmark information interface 1702. Indicating the deviation of maxilla and/or mandible may enable a user (e.g., dental treatment professional) to accurately and/or quickly identify and/or treat the deviation of maxilla and/or mandible.

In some examples, the landmark information interface 1702 may display one or more graphical objects indicating the one or more occlusal planes. In an example, a graphical object of the one or more graphical objects may comprise a shape (e.g., a line) representative of an occlusal plane of the one or more occlusal planes (such as the occlusal plane 1210 shown in FIG. 12), wherein the graphical object (and/or a different graphical object displayed via the landmark information interface 1702) may indicate whether or not an angle associated with the occlusal plane (e.g., an angle of the occlusal plane relative to a horizontal axis) is larger than a first occlusal plane threshold angle and/or a second occlusal plane threshold angle. For example, a color of the graphical object may indicate whether or not the angle is larger than the first occlusal plane threshold angle and/or the second occlusal plane threshold angle. In an example, the first occlusal plane threshold angle is smaller than the second occlusal plane threshold angle. In an example, the angle being larger than the first occlusal plane threshold angle may be indicative of a medical condition, an aesthetic condition and/or a dental condition of the first patient (e.g., a problematic condition for which one or more treatments may be provided) with a first level of criticality. In an example, the angle being larger than the second occlusal plane threshold angle may be indicative of a medical condition, an aesthetic condition and/or a dental condition of the first patient (e.g., a problematic condition for which one or more treatments may be provided) with a second level of criticality (higher than the first level of criticality, for example). In an example, the color of the graphical object may be green if the angle is not larger than the first occlusal plane threshold angle (e.g., the first occlusal plane threshold angle may be 0 degrees or other value). In an example, the color of the graphical object may be yellow (to indicate a condition with the first level of criticality) if the angle is larger than the first occlusal plane threshold angle and smaller than the second occlusal plane threshold angle (e.g., the second occlusal plane threshold angle may be 4 degrees or other value). In an example, the color of the graphical object may be red (to indicate a condition with the second level of criticality higher than the first level of criticality) if the angle is larger than the second occlusal plane threshold angle. Indicating that the angle is larger than the first occlusal plane threshold angle or the occlusal incisal plane threshold angle may enable a user (e.g., dental treatment professional) to accurately and/or quickly identify and/or treat a medical condition, an aesthetic condition and/or a dental condition. In some examples, a deviation of maxilla and/or mandible may be determined based upon the one or more occlusal planes (e.g., an angle associated with an occlusal plane being larger than the first occlusal plane threshold angle and/or the second occlusal plane threshold angle may be indicative of the deviation of maxilla and/or mandible), wherein an indication of the deviation of maxilla and/or mandible may be displayed via the landmark information interface 1702.

In some examples, the landmark information interface 1702 may display one or more graphical objects indicating the one or more gingival planes. In an example, a graphical object of the one or more graphical objects may comprise a shape (e.g., a line) representative of a gingival plane of the one or more gingival planes (such as the first gingival plane 1304, the second gingival plane 1306 and/or the third gingival plane 1308 shown in FIG. 13), wherein the graphical object (and/or a different graphical object displayed via the landmark information interface 1702) may indicate whether or not an angle associated with the gingival plane (e.g., an angle of the gingival plane relative to a horizontal axis) is larger than a first gingival plane threshold angle and/or a second gingival plane threshold angle. For example, a color of the graphical object may indicate whether or not the angle is larger than the first gingival plane threshold angle and/or the second gingival plane threshold angle. In an example, the first gingival plane threshold angle is smaller than the second gingival plane threshold angle. In an example, the angle being larger than the first gingival plane threshold angle may be indicative of a medical condition, an aesthetic condition and/or a dental condition of the first patient (e.g., a problematic condition for which one or more treatments may be provided) with a first level of criticality. In an example, the angle being larger than the second gingival plane threshold angle may be indicative of a medical condition, an aesthetic condition and/or a dental condition of the first patient (e.g., a problematic condition for which one or more treatments may be provided) with a second level of criticality (higher than the first level of criticality, for example). In an example, the color of the graphical object may be green if the angle is not larger than the first gingival plane threshold angle (e.g., the first gingival plane threshold angle may be 0 degrees or other value). In an example, the color of the graphical object may be yellow (to indicate a condition with the first level of criticality) if the angle is larger than the first gingival plane threshold angle and smaller than the second gingival plane threshold angle (e.g., the second gingival plane threshold angle may be 4 degrees or other value). In an example, the color of the graphical object may be red (to indicate a condition with the second level of criticality higher than the first level of criticality) if the angle is larger than the second gingival plane threshold angle. In some examples, the one or more graphical objects indicating the one or more gingival planes may enable a user (e.g., the dental treatment professional) to diagnose a condition associated with gingival zeniths of the first patient and/or provide one or more treatments for correcting one or more gingival zeniths of the first patient. Alternatively and/or additionally, the one or more graphical objects may show a deviation of maxilla and/or mandible of the first patient and/or may enable a user (e.g., the dental treatment professional) to identify deviation of maxilla and/or mandible of the first patient. In some examples, the one or more graphical objects indicating the one or more gingival planes may enable a user (e.g., the dental treatment professional) to diagnose a condition associated with maxilla and/or mandible of the first patient and/or provide one or more treatments for correcting deviation of maxilla and/or mandible of the first patient. In some examples, a deviation of maxilla and/or mandible may be determined based upon the one or more gingival planes (e.g., an angle associated with a gingival plane being larger than the first gingival plane threshold angle and/or the second gingival plane threshold angle may be indicative of the deviation of maxilla and/or mandible), wherein an indication of the deviation of maxilla and/or mandible may be displayed via the landmark information interface 1702.

In some examples, the landmark information interface 1702 may display one or more tooth show graphical objects indicating the one or more tooth show areas. In an example, a tooth show graphical object of the one or more tooth show graphical objects may comprise a shape (e.g., a rectangle) representative of a tooth show area of the one or more tooth show areas (such as shown in FIGS. 14A-14C). In some examples, the one or more tooth show graphical objects may comprise a tooth show graphical object comprising a shape (e.g., a rectangle, such as shown in FIG. 14A) indicating boundaries of the first tooth show area 1402, wherein the tooth show graphical object may be displayed overlaying a representation of an image associated with a vocalization state associated with the first patient pronouncing the term "emma". In some examples, the one or more tooth show graphical objects may comprise a tooth show graphical object comprising a shape (e.g., a rectangle, such as shown in FIG. 14B) indicating boundaries of the second tooth show area 1404, wherein the tooth show graphical object may be displayed overlaying a representation of an image associated with a vocalization state associated with the first patient pronouncing the letter "e". In some examples, the one or more tooth show graphical objects may comprise a tooth show graphical object comprising a shape (e.g., a rectangle, such as shown in FIG. 14C) indicating boundaries of the third tooth show area 1406, wherein the tooth show graphical object may be displayed overlaying a representation of an image associated with the smile state.

In some examples, the landmark information interface 1702 may display one or more graphical objects indicating at least one of a desired incisal edge vertical position of one or more teeth (e.g., one or more anterior teeth) of the first patient, a maximum vertical length of the one or more teeth of the first patient, a minimum vertical length of the one or more teeth of the first patient, etc. In an example, the one or more teeth may comprise central incisors, such as upper central incisors, of the first patient. In some examples, the maximum vertical length and/or the minimum vertical length may be determined based upon the one or more tooth show areas.

Figure 18:
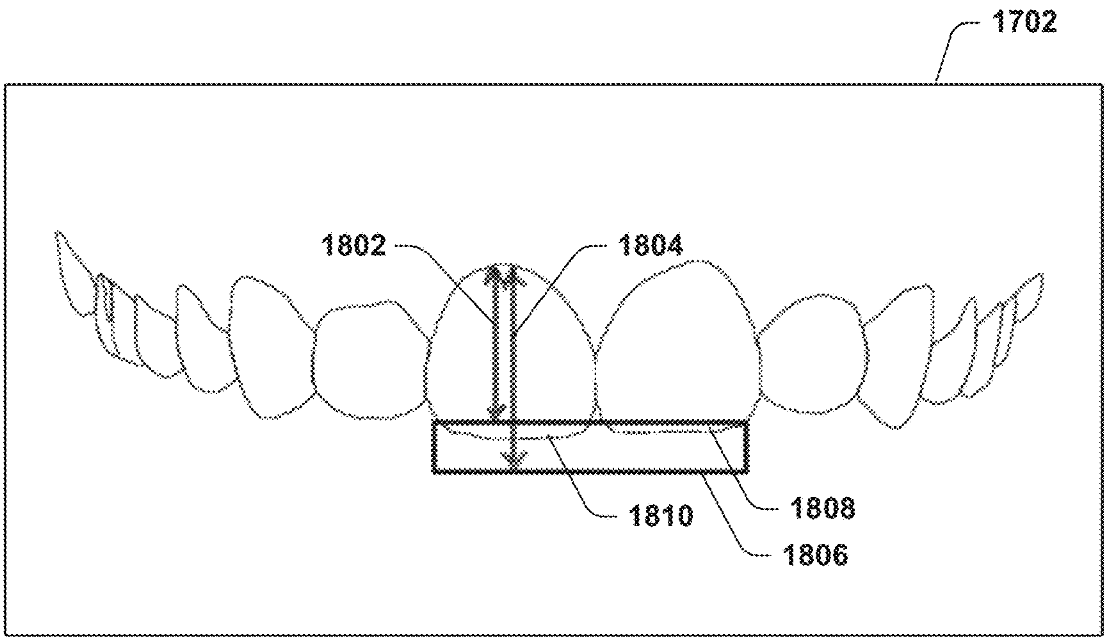
FIG. 18 illustrates an example of a landmark information interface.

Alternatively and/or additionally, the maximum vertical length and/or the minimum vertical length may be determined based upon one or more tooth widths of one or more teeth of the first patient (e.g., the one or more tooth widths may comprise a width of a right upper central incisor and/or a width of a left upper central incisor). In an example, a desired vertical length of the one or more teeth may be from about 75% of a tooth width of the one or more tooth widths to about 80% of the tooth width, wherein the minimum vertical length may be equal to about a product of 0.75 and the tooth width and/or the maximum vertical length may be equal to about a product of 0.8 and the tooth width. In some examples, the desired incisal edge vertical position may be based upon at least one of the maximum vertical length, the minimum vertical length, the one or more tooth show areas, segmentation information of the first segmentation information, etc. In some examples, the desired incisal edge vertical position corresponds to a range of vertical positions, of one or more incisal edges of the one or more teeth, with which the one or more teeth meet the maximum vertical length and the minimum vertical length. FIG. 18 illustrates an example of the landmark information interface 1702 displaying a graphical object 1802 indicating the minimum vertical length, a graphical object 1804 indicating the maximum vertical length, and/or a graphical object 1806 indicating the desired incisal edge vertical position. In the example shown in FIG. 18, the graphical object 1802, the graphical object 1804, and/or the graphical object 1806 are displayed overlaying a representation of an image comprising a view (e.g., a close up view) of the first patient in frontal position (e.g., the representation of the image may be a representation of segmentation information, of the first segmentation information, generated based upon the image). In some examples, the landmark information interface 1702 may indicate whether or not one or more incisal edges of the one or more teeth (e.g., the one or more incisal edges may comprise an incisal edge 1810 and/or an incisal edge 1808) are within the desired incisal edge vertical position. In an example, one or more colors of one or more graphical objects (e.g., at least one of the graphical object 1804, the one or more tooth show graphical objects, etc.) may indicate whether or not the one or more incisal edges of the one or more teeth are within the desired incisal edge vertical position. In some examples, the one or more incisal edges of the one or more teeth not being within the desired incisal edge vertical position may be indicative of a medical condition, an aesthetic condition and/or a dental condition of the first patient (e.g., a problematic condition for which one or more treatments may be provided).

In some examples, the landmark information interface 1702 may display one or more graphical objects indicating the one or more tooth edge lines and/or the incisor midline 1506. In an example, a graphical object of the one or more graphical objects may comprise a shape (e.g., a line) representative of a tooth edge line of the one or more tooth edge lines (such as the first tooth edge line 1504 and/or the second tooth edge line 1508 shown in FIG. 15). Alternatively and/or additionally, a graphical object of the one or more graphical objects may comprise a shape (e.g., a line) representative of the incisor midline 1506, wherein the graphical object may enable a user (e.g., the dental treatment professional) to develop a diastema closure treatment plan based upon the incisor midline 1506.

Figure 19:
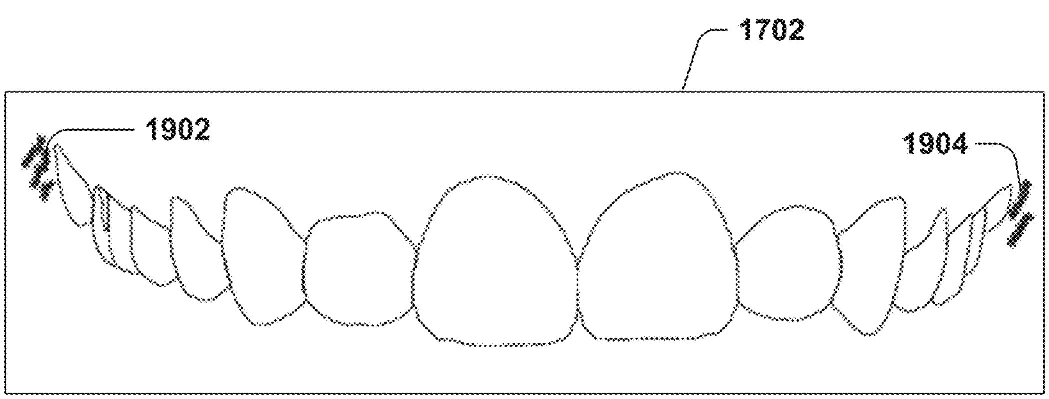
FIG. 19 illustrates an example of a landmark information interface.

In some examples, the landmark information interface 1702 may display one or more buccal corridor graphical objects indicating the one or more buccal corridor areas. In an example, a buccal corridor graphical object of the one or more buccal corridor graphical objects may identify a position and/or a size of a buccal corridor area of the one or more buccal corridor areas. Alternatively and/or additionally, a buccal corridor graphical object of the one or more buccal corridor graphical objects (and/or one or more other graphical objects displayed via the landmark information interface 1702) may indicate whether or not a width of a buccal corridor is larger than a threshold width. In some examples, the threshold width corresponds a threshold proportion (e.g., 11% or other percentage) of a smile width of the first patient (e.g., the threshold width may be determined based upon the threshold proportion and the smile width). In an example, the smile width may correspond to a width of inner boundaries (and/or outer boundaries) of lips of the first patient, such as a distance between commissures of the first patient (e.g., a distance between the first commissure 1604 and the second commissure 1614 of the first patient shown in FIG. 16). FIG. 19 illustrates an example of the landmark information interface 1702 displaying a graphical object 1902 indicating the first buccal corridor area 1606 and/or a graphical object 1904 indicating the second buccal corridor area 1612. In the example shown in FIG. 19, the graphical object 1902 and/or the graphical object 1904 are displayed overlaying a representation of an image comprising a view (e.g., a close up view) of the first patient in frontal position (e.g., the representation of the image may be a representation of segmentation information, of the first segmentation information, generated based upon the image). In some examples, the landmark information interface 1702 may indicate whether or not a width of the first buccal corridor area 1606 and/or a width of the second buccal corridor area 1612 are larger than the threshold width. In an example, a color the graphical object 1902 (and/or one or more other graphical objects displayed by the landmark information interface 1702) may indicate whether or not the width of the first buccal corridor area 1606 is larger than the threshold width. In some examples, the width of the first buccal corridor area 1606 being larger than the threshold width may be indicative of a medical condition, an aesthetic condition and/or a dental condition of the first patient (e.g., a problematic condition for which one or more treatments may be provided).

Figure 20A:
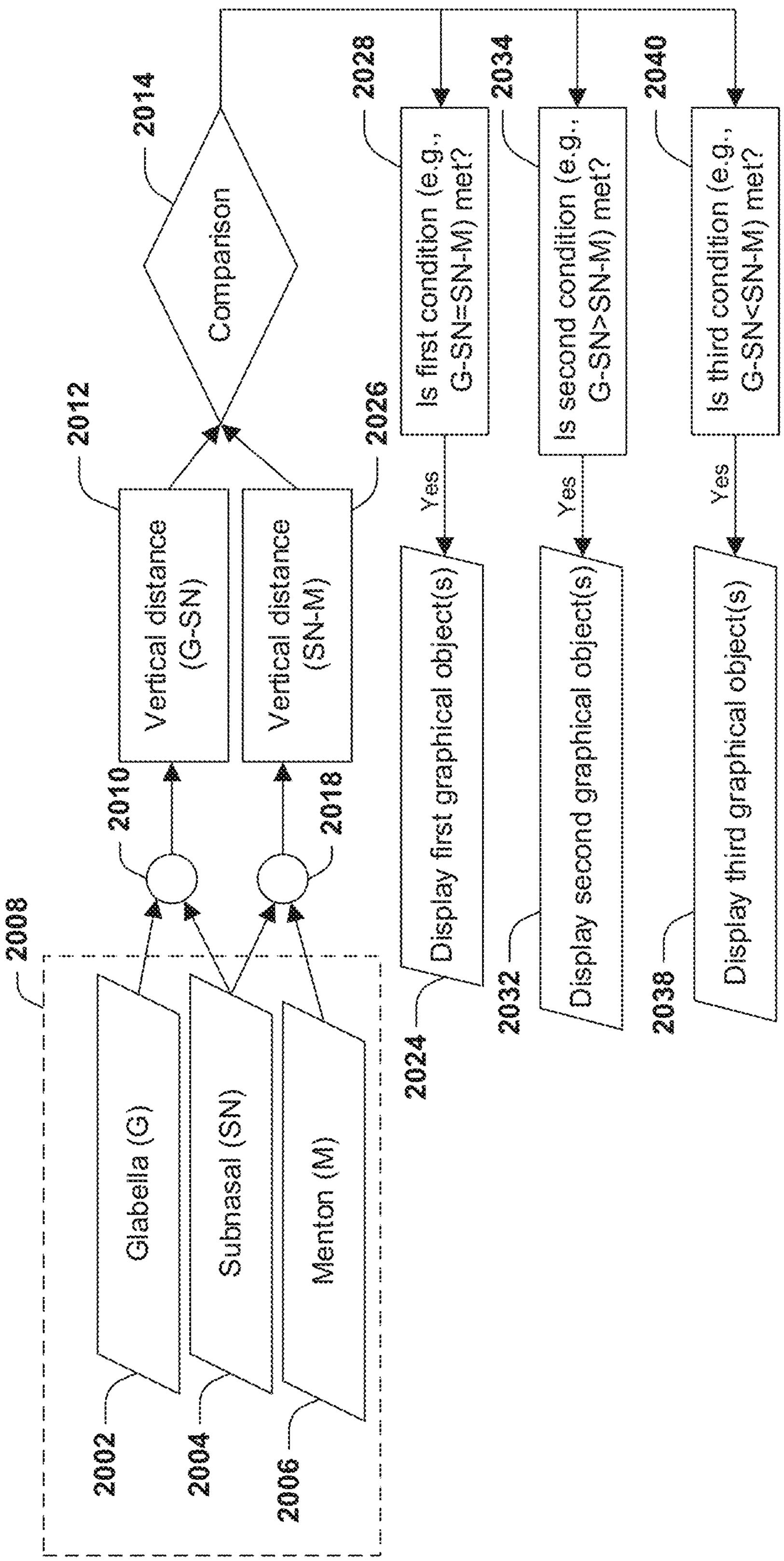
FIGS. 20A-20B illustrate determination of one or more relationships between landmarks of first landmark information and/or presentation of one or more graphical objects, indicative of the one or more relationships, via a landmark information interface, according to some embodiments.
Figure 20B:
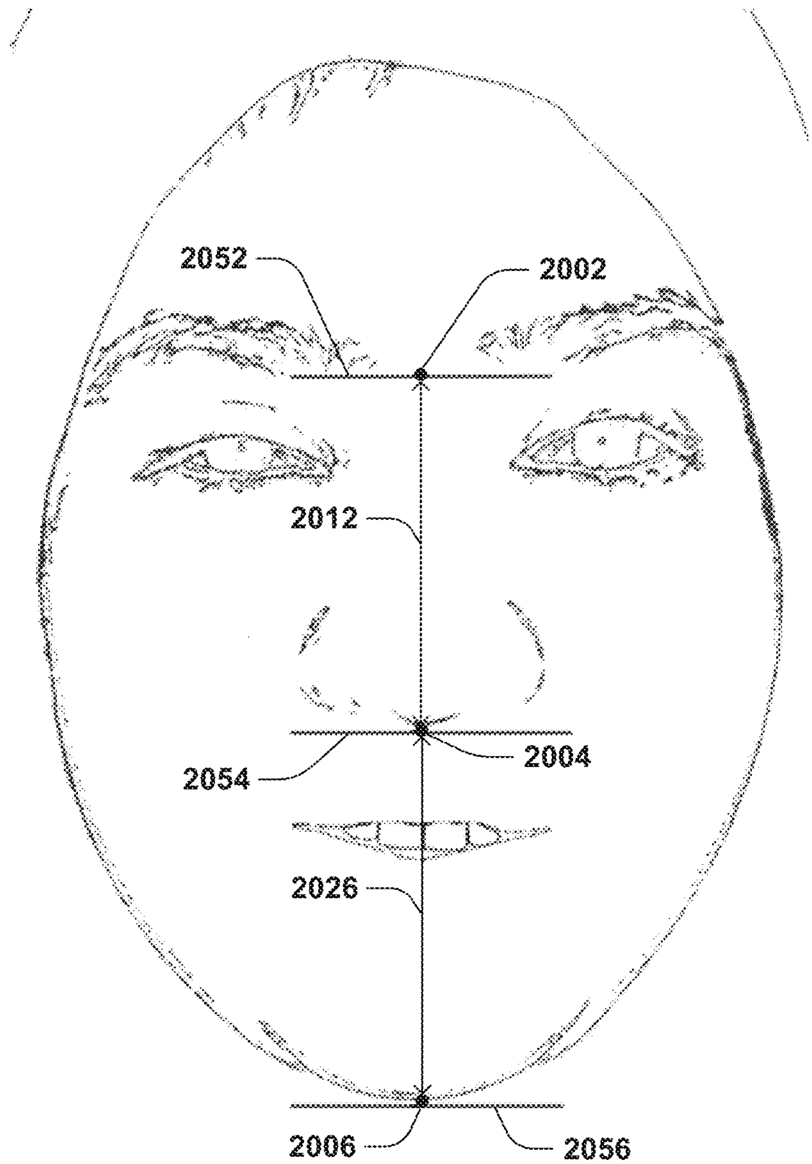

FIGS. 20A-20B illustrate determination of one or more relationships (e.g., facial height analysis relationships) between landmarks of the first landmark information and/or presentation of one or more graphical objects, indicative of the one or more relationships, via the landmark information interface 1702. In FIG. 20A, a plurality of facial landmark points 2008 may be determined. The first set of facial landmark points may comprise the plurality of facial landmark points 2008. In some examples, the plurality of facial landmark points 2008 may be determined based upon an image (e.g., shown in FIG. 20B), of the one or more first images, associated with the resting state and/or a vocalization state associated with the first patient pronouncing the term "emma". The plurality of facial landmark points 2008 may comprise a glabella landmark point 2002, a subnasal landmark point 2004 and/or a menton landmark point 2006. Examples of the plurality of facial landmark points 2008 are shown in FIG. 20B.

In FIG. 20A, the glabella landmark point 2002 and the subnasal landmark point 2004 may be input to a distance determination module 2010. The distance determination module 2010 may determine a first vertical distance 2012 between the glabella landmark point 2002 and the subnasal landmark point 2004. An example of the first vertical distance 2012 is shown in FIG. 20B. In an example shown in FIG. 20B, the first vertical distance 2012 may correspond to a distance (e.g., a vertical axis distance) between a vertical position 2052 of the glabella landmark point 2002 and a vertical position 2054 of the subnasal landmark point 2004.

In FIG. 20A, the subnasal landmark point 2004 and the menton landmark point 2006 may be input to a distance determination module 2018. The distance determination module 2018 may determine a second vertical distance 2026 between the subnasal landmark point 2004 and the menton landmark point 2006. An example of the second vertical distance 2026 is shown in FIG. 20B. In an example shown in FIG. 20B, the second vertical distance 2026 may correspond to a distance (e.g., a vertical axis distance) between a vertical position 2054 of the subnasal landmark point 2004 and a vertical position 2056 of the menton landmark point 2006. In an example, the first vertical distance 2012 and/or the second vertical distance 2026 may be in units of millimeters.

The first vertical distance 2012 and/or the second vertical distance 2026 may be compared, at 2014, to determine one or more relationships between the first vertical distance 2012 and the second vertical distance 2026. In some examples, the one or more relationships may be based upon (and/or may comprise) whether or not a first condition is met, whether or not a second condition is met and/or whether or not a third condition is met.

In an example, the first condition is a condition that the first vertical distance 2012 is equal to the second vertical distance 2026, the second condition is a condition that the first vertical distance 2012 is larger than the second vertical distance 2026, and/or the third condition is a condition that the first vertical distance 2012 is smaller than the second vertical distance 2026. For example, it may be determined, at 2028, that the first condition is met based upon a determination that the first vertical distance 2012 is equal to the second vertical distance 2026. Alternatively and/or additionally, it may be determined, at 2034, that the second condition is met based upon a determination that the first vertical distance 2012 is larger than the second vertical distance 2026. Alternatively and/or additionally, it may be determined, at 2040, that the third condition is met based upon a determination that the first vertical distance 2012 is smaller than the second vertical distance 2026.

Alternatively and/or additionally, the first condition is a condition that a difference between the first vertical distance 2012 and the second vertical distance 2026 is less than a threshold difference, the second condition is a condition that the first vertical distance 2012 is larger than a first threshold distance based upon the second vertical distance 2026, and/or the third condition is a condition that the first vertical distance 2012 is smaller than a second threshold distance based upon the second vertical distance 2026. In an example, the first threshold distance may be based upon (e.g., equal to) a sum of the second vertical distance 2026 and the threshold difference. In an example, the first threshold distance may be based upon (e.g., equal to) the second vertical distance 2026 subtracted by the threshold difference. For example, it may be determined, at 2028, that the first condition is met based upon a determination that the difference between the first vertical distance 2012 and the second vertical distance 2026 is less than the threshold difference. Alternatively and/or additionally, it may be determined, at 2034, that the second condition is met based upon a determination that the first vertical distance 2012 is larger than the first threshold distance. Alternatively and/or additionally, it may be determined, at 2040, that the third condition is met based upon a determination that the first vertical distance 2012 is smaller than the second threshold distance.

In some examples, in response to a determination that the first condition is met, one or more first graphical objects may be displayed, at 2024, via the landmark information interface 1702. In some examples, the one or more first graphical objects may comprise a graphical object indicating that the first condition is met. For example, a color (e.g., green) of the graphical object may indicate that the first condition is met. In an example, the graphical object may comprise at least one of a set of text (e.g., "facial height"), one or more lines (e.g., a line between the glabella landmark point 2002 and the subnasal landmark point 2004, a line between the subnasal landmark point 2004 and the menton landmark point 2006 and/or a line between the glabella landmark point 2002 and the menton landmark point 2006), etc. Alternatively and/or additionally, the one or more first graphical objects may be displayed overlaying a representation of an image, such as an image (e.g., shown in FIG. 20B), of the one or more first images, associated with the resting state and/or the vocalization state associated with the first patient pronouncing the term "emma".

In some examples, the second condition being met may be indicative of a medical condition, an aesthetic condition and/or a dental condition of the first patient (e.g., a problematic condition for which one or more treatments may be provided), such as a condition associated with the first vertical distance 2012 being larger than normal and/or the second vertical distance 2026 being smaller than normal. In some examples, in response to a determination that the second condition is met, one or more second graphical objects may be displayed, at 2032, via the landmark information interface 1702. In some examples, the one or more second graphical objects may comprise a graphical object indicating that the second condition is met (and/or that the first condition is not met). In an example, the graphical object may comprise at least one of a set of text (e.g., "facial height"), one or more lines (e.g., a line between the glabella landmark point 2002 and the subnasal landmark point 2004, a line between the subnasal landmark point 2004 and the menton landmark point 2006 and/or a line between the glabella landmark point 2002 and the menton landmark point 2006), etc. For example, a color (e.g., red) of the graphical object may indicate that the second condition is met (and/or that the first condition is not met). Alternatively and/or additionally, the one or more second graphical objects may comprise a set of text (e.g., "middle ⅓ of face is longer than normal or lower ⅓ of face is shorter than normal"). Alternatively and/or additionally, the one or more second graphical objects may be displayed overlaying a representation of an image, such as an image (e.g., shown in FIG. 20B), of the one or more first images, associated with the resting state and/or the vocalization state associated with the first patient pronouncing the term "emma".

In some examples, the third condition being met may be indicative of a medical condition, an aesthetic condition and/or a dental condition of the first patient (e.g., a problematic condition for which one or more treatments may be provided), such as a condition associated with the first vertical distance 2012 being smaller than normal and/or the second vertical distance 2026 being larger than normal. In some examples, in response to a determination that the third condition is met, one or more third graphical objects may be displayed, at 2038, via the landmark information interface 1702. In some examples, the one or more third graphical objects may comprise a graphical object indicating that the third condition is met (and/or that the first condition is not met). In an example, the graphical object may comprise at least one of a set of text (e.g., "facial height"), one or more lines (e.g., a line between the glabella landmark point 2002 and the subnasal landmark point 2004, a line between the subnasal landmark point 2004 and the menton landmark point 2006 and/or a line between the glabella landmark point 2002 and the menton landmark point 2006), etc. For example, a color (e.g., red) of the graphical object may indicate that the third condition is met (and/or that the first condition is not met). Alternatively and/or additionally, the one or more third graphical objects may comprise a set of text (e.g., "middle ⅓ of face is shorter than normal or lower ⅓ of face is longer than normal"). Alternatively and/or additionally, the one or more third graphical objects may be displayed overlaying a representation of an image, such as an image (e.g., shown in FIG. 20B), of the one or more first images, associated with the resting state and/or the vocalization state associated with the first patient pronouncing the term "emma".

Figure 21A:
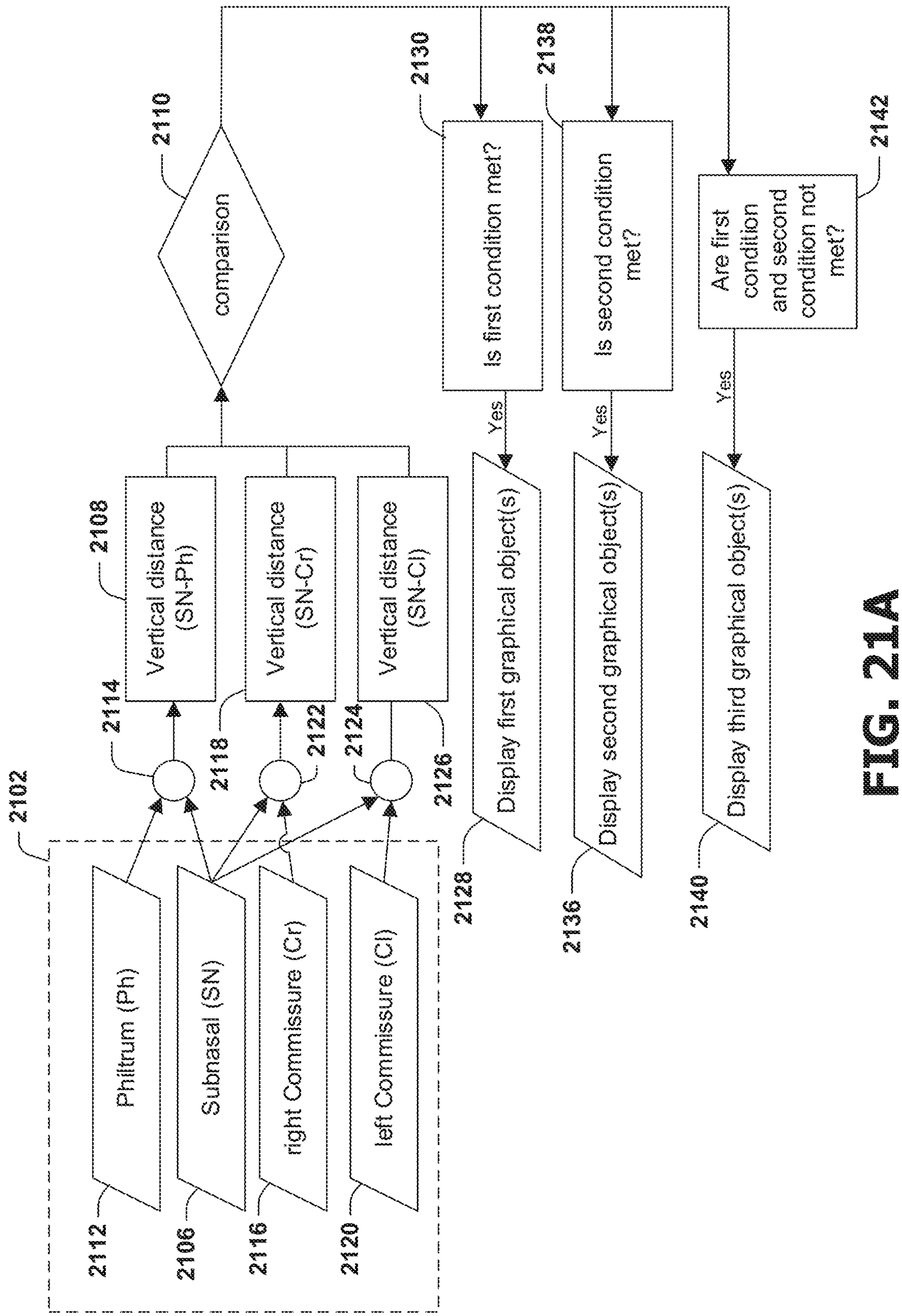
FIGS. 21A-21B illustrate determination of one or more relationships between landmarks of first landmark information and/or presentation of one or more graphical objects, indicative of the one or more relationships, via a landmark information interface, according to some embodiments.
Figure 21B:
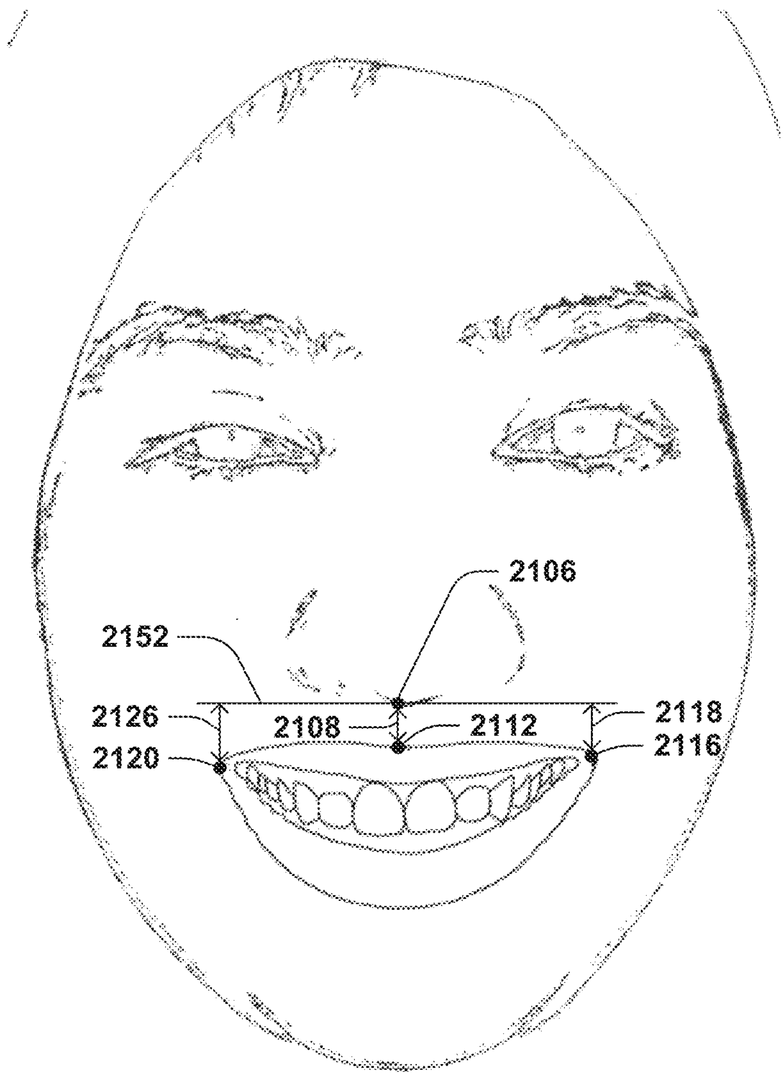

FIGS. 21A-21B illustrate determination of one or more relationships (e.g., upper lip analysis relationships) between landmarks of the first landmark information and/or presentation of one or more graphical objects, indicative of the one or more relationships, via the landmark information interface 1702. In FIG. 21A, a plurality of facial landmark points 2102 may be determined. The first set of facial landmark points may comprise the plurality of facial landmark points 2102. In some examples, the plurality of facial landmark points 2102 may be determined based upon an image (e.g., shown in FIG. 21B), of the one or more first images, associated with the smile state. The plurality of facial landmark points 2102 may comprise a subnasal landmark point 2106, a philtrum landmark point 2112, a right commissure landmark point 2116 and/or a left commissure landmark point 2120. Examples of the plurality of facial landmark points 2102 are shown in FIG. 21B.

In FIG. 21A, the subnasal landmark point 2106 and the philtrum landmark point 2112 may be input to a distance determination module 2114. The distance determination module 2114 may determine a first vertical distance 2108 between the subnasal landmark point 2106 and the philtrum landmark point 2112. An example of the first vertical distance 2108 is shown in FIG. 21B. In an example shown in FIG. 21B, the first vertical distance 2108 may correspond to a distance (e.g., a vertical axis distance) between a vertical position 2152 of the subnasal landmark point 2106 and a vertical position of the philtrum landmark point 2112.

In FIG. 21A, the subnasal landmark point 2106 and the right commissure landmark point 2116 may be input to a distance determination module 2122. The distance determination module 2122 may determine a second vertical distance 2118 between the subnasal landmark point 2106 and the right commissure landmark point 2116. An example of the second vertical distance 2118 is shown in FIG. 21B. In an example shown in FIG. 21B, the second vertical distance 2118 may correspond to a distance (e.g., a vertical axis distance) between the vertical position 2152 of the subnasal landmark point 2106 and a vertical position of the right commissure landmark point 2116.

In FIG. 21A, the subnasal landmark point 2106 and the left commissure landmark point 2120 may be input to a distance determination module 2124. The distance determination module 2124 may determine a third vertical distance 2126 between the subnasal landmark point 2106 and the left commissure landmark point 2120. An example of the third vertical distance 2126 is shown in FIG. 21B. In an example shown in FIG. 21B, the third vertical distance 2126 may correspond to a distance (e.g., a vertical axis distance) between the vertical position 2152 of the subnasal landmark point 2106 and a vertical position of the left commissure landmark point 2120.

The first vertical distance 2108, the second vertical distance 2118 and/or the third vertical distance 2126 may be compared, at 2110, to determine one or more relationships between the first vertical distance 2108, the second vertical distance 2118 and/or the third vertical distance 2126. In some examples, the one or more relationships may be based upon (and/or may comprise) whether or not a first condition is met and/or whether or not a second condition is met.

In an example, when the first patient is in smiling state, the first vertical distance 2108 should be larger than the second vertical distance 2118 and the third vertical distance 2126 (where the first vertical distance 2108, the second vertical distance 2118 and the third vertical distance 2126 are determined based upon an image in which the first user is in smiling state).

In an example, the first condition is a condition that the first vertical distance 2108 is larger than or equal to the second vertical distance 2118 and the first vertical distance 2108 is larger than or equal to the third vertical distance 2126. In an example, the second condition is a condition that the first vertical distance 2108 is smaller than the second vertical distance 2118 and the first vertical distance is smaller than the third vertical distance 2126. For example, it may be determined, at 2130, that the first condition is met based upon a determination that the first vertical distance 2108 is larger than or equal to the second vertical distance 2118 and the first vertical distance is larger than or equal to the third vertical distance 2126. Alternatively and/or additionally, it may be determined, at 2138, that the second condition is met based upon a determination that the first vertical distance 2108 is smaller than the second vertical distance 2118 and the first vertical distance is smaller than the third vertical distance 2126.

In some examples, in response to a determination that the first condition is met, one or more first graphical objects may be displayed, at 2128, via the landmark information interface 1702. In some examples, the one or more first graphical objects may comprise a graphical object indicating that the first condition is met. For example, a color (e.g., green) of the graphical object may indicate that the first condition is met. In an example, the graphical object may comprise a set of text (e.g., "upper lip"). Alternatively and/or additionally, the one or more first graphical objects may be displayed overlaying a representation of an image, such as an image (e.g., shown in FIG. 21B), of the one or more first images, associated with the smile state.

In some examples, the second condition being met may be indicative of a medical condition, an aesthetic condition and/or a dental condition of the first patient (e.g., a problematic condition for which one or more treatments may be provided), such as a condition associated with an upper lip of the first patient being shorter than normal and/or hypermobile. In some examples, in response to a determination that the second condition is met, one or more second graphical objects may be displayed, at 2136, via the landmark information interface 1702. In some examples, the one or more second graphical objects may comprise a graphical object indicating that the second condition is met (and/or that the first condition is not met). In an example, the graphical object may comprise a set of text (e.g., "upper lip"). For example, a color (e.g., red) of the graphical object may indicate that the second condition is met (and/or that the first condition is not met). Alternatively and/or additionally, the one or more second graphical objects may comprise a set of text (e.g., "upper lip is shorter than normal or is hypermobile"). Alternatively and/or additionally, the one or more second graphical objects may be displayed overlaying a representation of an image, such as an image (e.g., shown in FIG. 21B), of the one or more first images, associated with the smile state.

In some examples, it may be determined, at 2142, that the first condition and the second condition are not met. The first condition and the second condition not being met may be indicative of a medical condition, an aesthetic condition and/or a dental condition of the first patient (e.g., a problematic condition for which one or more treatments may be provided), such as a condition associated with an upper lip of the first patient being unsymmetrical. In some examples, in response to a determination that the first condition and the second condition are not met, one or more third graphical objects may be displayed, at 2140, via the landmark information interface 1702. In some examples, the one or more third graphical objects may comprise a graphical object indicating that the first condition and the second condition are not met. In an example, the graphical object may comprise a set of text (e.g., "upper lip"). For example, a color (e.g., red) of the graphical object may indicate that the first condition and the second condition are not met. Alternatively and/or additionally, the one or more third graphical objects may comprise a set of text (e.g., "unsymmetrical upper lip"). Alternatively and/or additionally, the one or more third graphical objects may be displayed overlaying a representation of an image, such as an image (e.g., shown in FIG. 21B), of the one or more first images, associated with the smile state.

FIGS. 22A-22E illustrate determination of one or more relationships (e.g., lateral view analysis relationships) between landmarks of the first landmark information and/or presentation of one or more graphical objects, indicative of the one or more relationships, via the landmark information interface 1702.

Figure 22A:
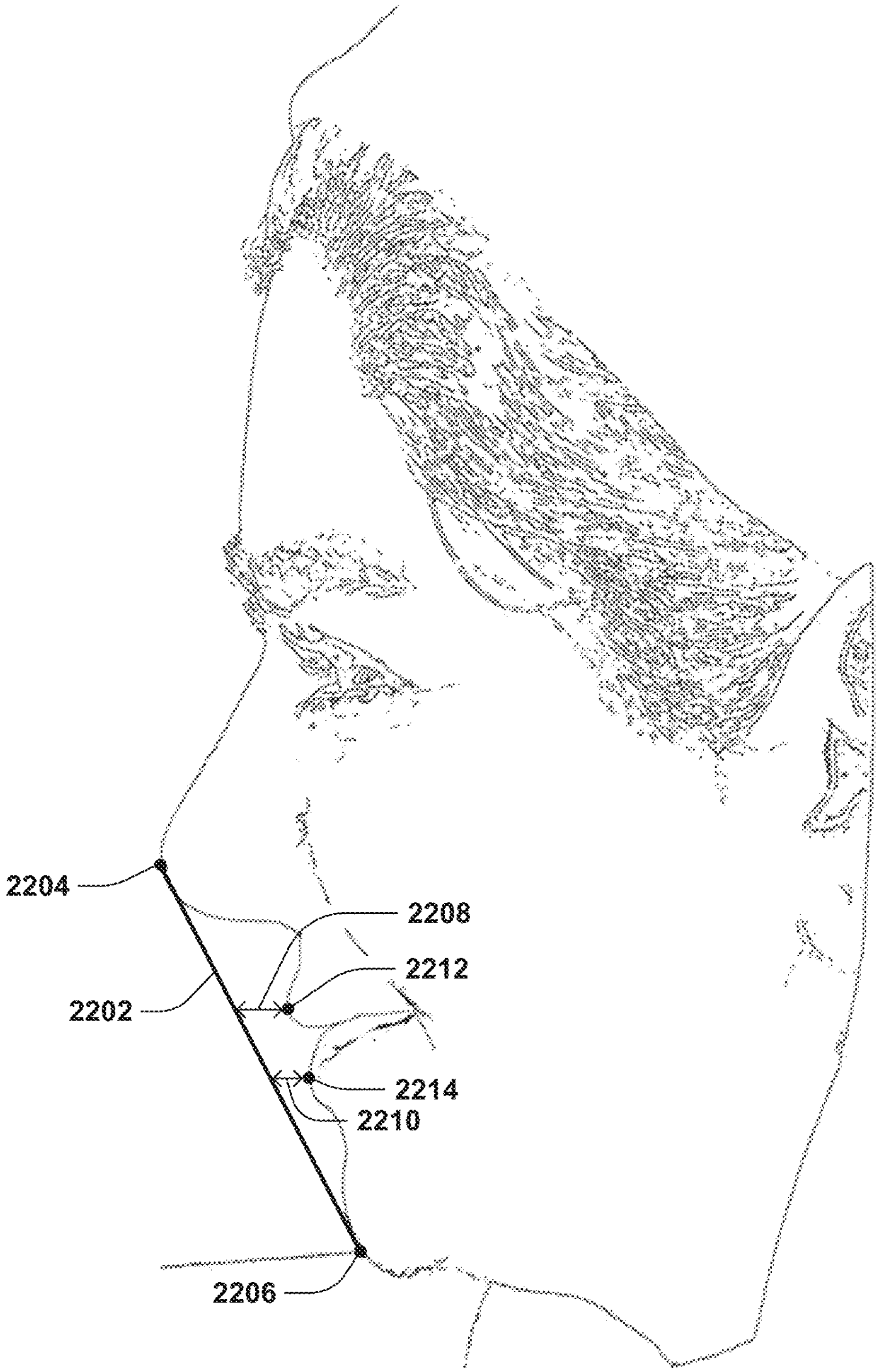
FIGS. 22A-22E illustrate determination of one or more relationships between landmarks of first landmark information and/or presentation of one or more graphical objects, indicative of the one or more relationships, via a landmark information interface, according to some embodiments.

In FIG. 22A, an E-line 2202 may be generated. In some examples, the E-line 2202 may be generated based upon a nose landmark point 2204 (e.g., tip of nose landmark point) and/or a pogonion landmark point 2206. For example, the E-line 2202 may extend from the nose landmark point 2204 to the pogonion landmark point 2206. In some examples, the first set of facial landmark points may comprise the nose landmark point 2204, the pogonion landmark point 2206, an upper lip landmark point 2212 and/or a lower lip landmark point 2214. In some examples, the nose landmark point 2204, the pogonion landmark point 2206, the upper lip landmark point 2212 and/or the lower lip landmark point 2214 may be determined based upon an image (e.g., shown in FIG. 22A), of the one or more first images, associated with the lateral position of the first patient. In some examples, a first distance 2208 between the E-line 2202 and the upper lip landmark point 2212 may be determined. A second distance 2210 between the E-line 2202 and the lower lip landmark point 2214 may be determined.

In some examples, the landmark information interface 1702 may display one or more graphical objects indicative of at least one of the E-line 2202, the first distance 2208, the second distance 2210, the nose landmark point 2204, the pogonion landmark point 2206, the upper lip landmark point 2212 and/or the lower lip landmark point 2214. In an example, the one or more graphical objects may be displayed overlaying a representation of an image (e.g., the image shown in FIG. 22A) associated with lateral position of the first patient.

Alternatively and/or additionally, the one or more graphical objects may be indicative of whether or not the first distance 2208 meets a first condition and/or whether or not the second distance 2210 meets a second condition. In an example, the first condition is a condition that the first distance 2208 is equal to a first value (e.g., 2 millimeters). Alternatively and/or additionally, the first condition is a condition that a difference between the first distance 2208 and the first value is less than a threshold difference. In some examples, in response to a determination that the first condition is met, one or more graphical objects may be displayed, via the landmark information interface 1702, indicating that the first condition is met (e.g., the one or more graphical objects may comprise a set of text, such as "upper lip position", and/or the graphical object may be a color, such as green, indicating that the first condition is met). Alternatively and/or additionally, in response to a determination that the first condition is not met, one or more graphical objects may be displayed, via the landmark information interface 1702, indicating that the first condition is not met (e.g., the one or more graphical objects may comprise a set of text, such as "upper lip position", and/or the graphical object may be a color, such as red, indicating that the first condition is not met). In some examples, the first condition not being met may be indicative of a medical condition, an aesthetic condition and/or a dental condition of the first patient (e.g., a problematic condition for which one or more treatments may be provided), such as a condition associated with an upper lip of the first patient being closer than normal or farther than normal to the E-line 2202. In an example, the second condition is a condition that the second distance 2210 is equal to a second value (e.g., 4 millimeters). Alternatively and/or additionally, the second condition is a condition that a difference between the second distance 2210 and the second value is less than a threshold difference. In some examples, in response to a determination that the second condition is met, one or more graphical objects may be displayed, via the landmark information interface 1702, indicating that the second condition is met (e.g., the one or more graphical objects may comprise a set of text, such as "lower lip position", and/or the graphical object may be a color, such as green, indicating that the second condition is met). Alternatively and/or additionally, in response to a determination that the second condition is not met, one or more graphical objects may be displayed, via the landmark information interface 1702, indicating that the second condition is not met (e.g., the one or more graphical objects may comprise a set of text, such as "lower lip position", and/or the graphical object may be a color, such as red, indicating that the second condition is not met). In some examples, the second condition not being met may be indicative of a medical condition, an aesthetic condition and/or a dental condition of the first patient (e.g., a problematic condition for which one or more treatments may be provided), such as a condition associated with a lower lip of the first patient being closer than normal or farther than normal to the E-line 2202.

Figure 22B:
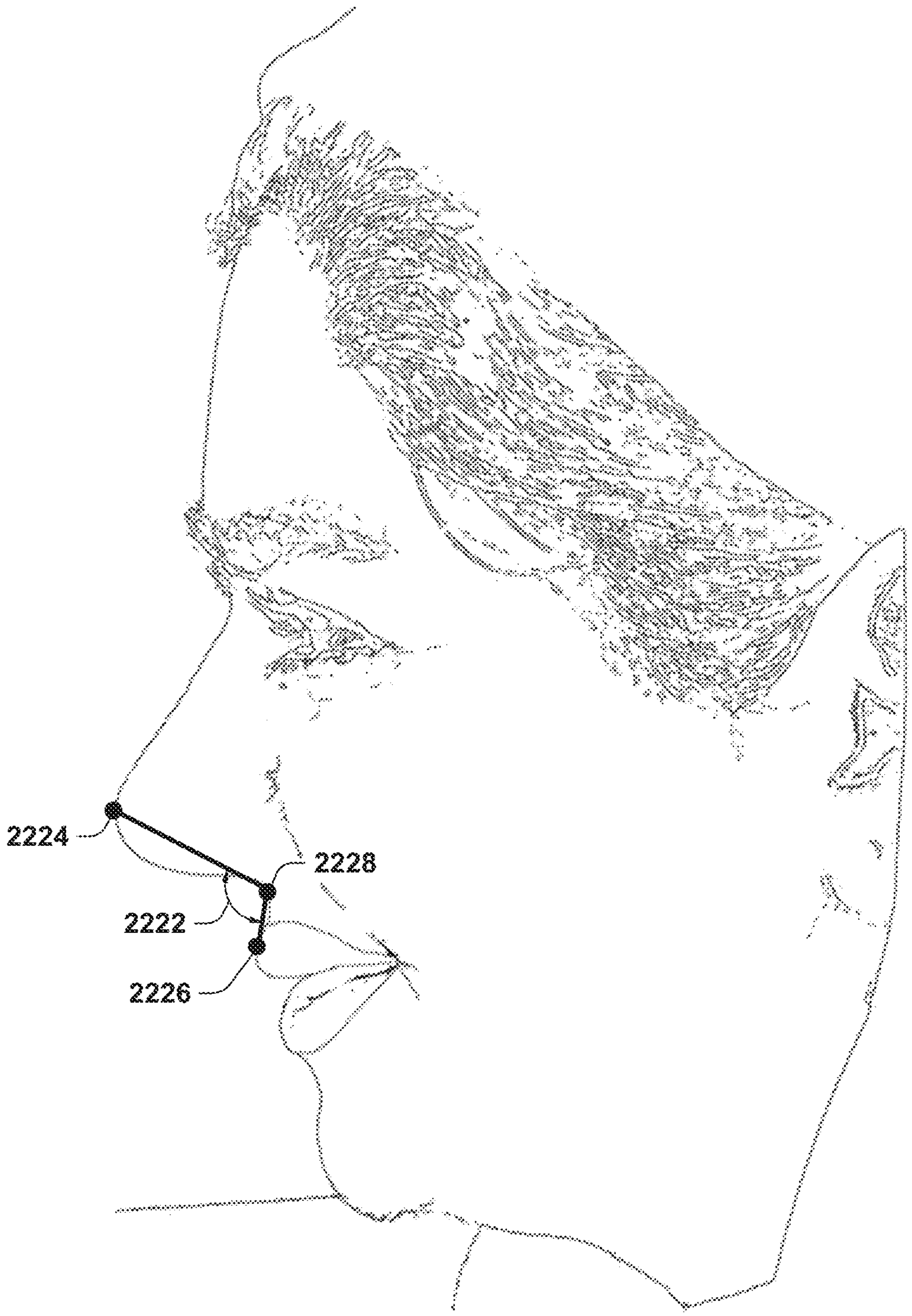

In FIG. 22B, a nasiolabal angle (NLA) 2222 may be determined. In some examples, the NLA 2222 may be determined based upon a nose landmark point 2224 (e.g., tip of nose landmark point), a subnasal landmark point 2228 and/or an upper lip landmark point 2226. For example, the NLA 2222 may correspond to an angle of a first line (e.g., a line extending from the nose landmark point 2224 to the subnasal landmark point 2228) relative to a second line (e.g., a line extending from the subnasal landmark point 2228 to the upper lip landmark point 2226). In some examples, the first set of facial landmark points may comprise the nose landmark point 2224, the subnasal landmark point 2228 and/or the upper lip landmark point 2226. In some examples, the nose landmark point 2224, the subnasal landmark point 2228 and/or the upper lip landmark point 2226 may be determined based upon an image (e.g., shown in FIG. 22B), of the one or more first images, associated with the lateral position of the first patient.

In some examples, the landmark information interface 1702 may display one or more graphical objects indicative of at least one of the NLA 2222, the first line, the second line, the nose landmark point 2204, the nose landmark point 2224, the subnasal landmark point 2228 and/or the upper lip landmark point 2226. In an example, the one or more graphical objects may be displayed overlaying a representation of an image (e.g., the image shown in FIG. 22B) associated with lateral position of the first patient.

Alternatively and/or additionally, the one or more graphical objects may be indicative of whether or not the NLA 2222 meets a first condition. In an example, the first condition is a condition that the NLA 2222 is within a range of values. In some examples, if the first patient is male, the range of values corresponds to a first range of values (e.g., 90 degrees to 95 degrees). In some examples, if the first patient is female, the range of values corresponds to a second range of values (e.g., 100 degrees to 105 degrees). In some examples, in response to a determination that the first condition is met, one or more graphical objects may be displayed, via the landmark information interface 1702, indicating that the first condition is met (e.g., the one or more graphical objects may comprise a set of text, such as "NLA", and/or the graphical object may be a color, such as green, indicating that the first condition is met). Alternatively and/or additionally, in response to a determination that the first condition is not met, one or more graphical objects may be displayed, via the landmark information interface 1702, indicating that the first condition is not met (e.g., the one or more graphical objects may comprise a set of text, such as "NLA", and/or the graphical object may be a color, such as red, indicating that the first condition is not met). In some examples, the first condition not being met may be indicative of a medical condition, an aesthetic condition and/or a dental condition of the first patient (e.g., a problematic condition for which one or more treatments may be provided), such as a condition associated with the NLA 2222 of the first patient being larger or smaller than normal.

Figure 22C:
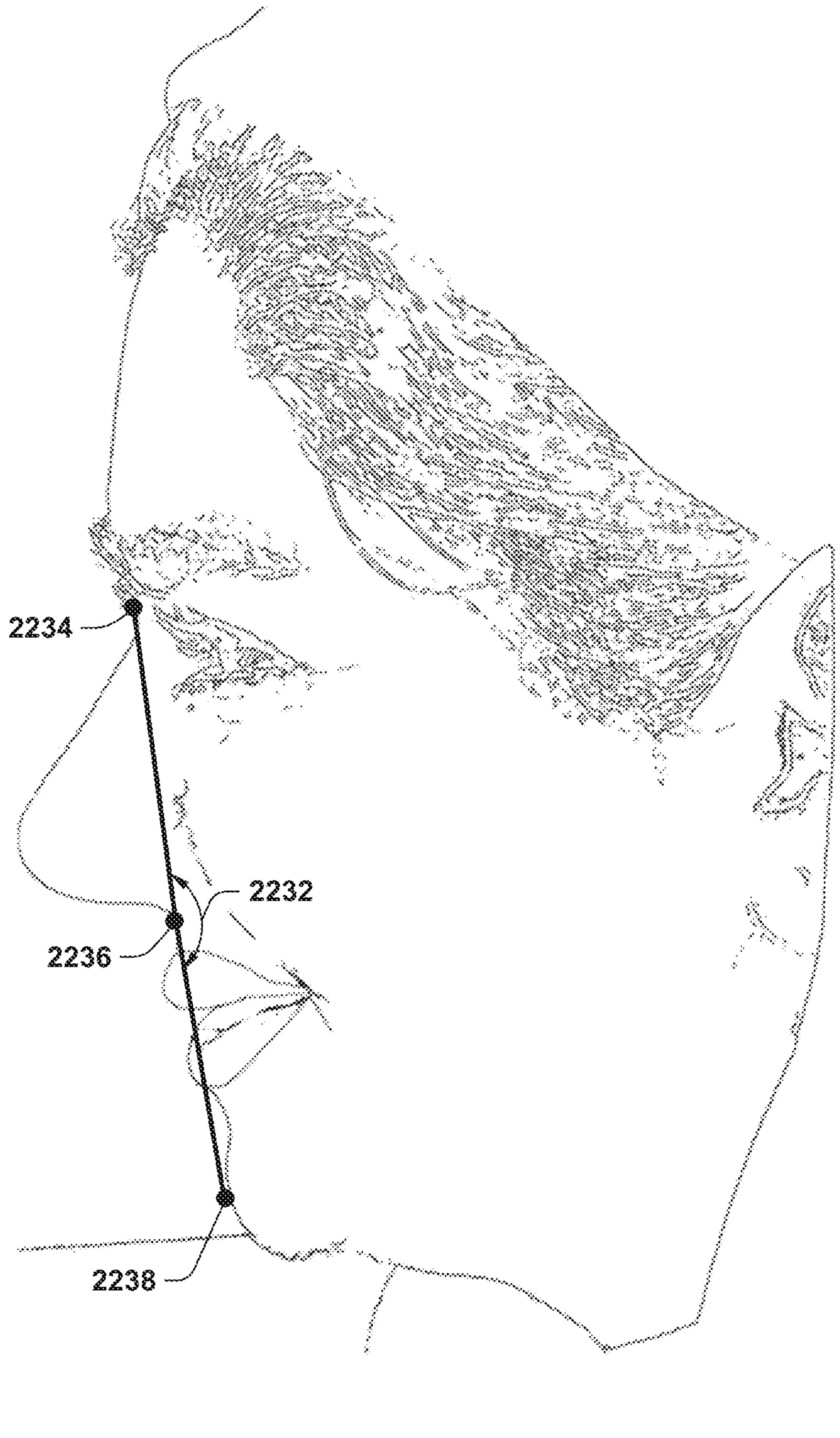

In FIG. 22C, a profile angle 2232 may be determined. In some examples, the profile angle 2232 may be determined based upon a glabella landmark point 2234, a subnasal landmark point 2236 and/or a pogonion landmark point 2238. For example, the profile angle 2232 may correspond to an angle of a first line (e.g., a line extending from the glabella landmark point 2234 to the subnasal landmark point 2236) relative to a second line (e.g., a line extending from the subnasal landmark point 2236 to the pogonion landmark point 2238). In some examples, the first set of facial landmark points may comprise the glabella landmark point 2234, the subnasal landmark point 2236 and/or the pogonion landmark point 2238. In some examples, the glabella landmark point 2234, the subnasal landmark point 2236 and/or the pogonion landmark point 2238 may be determined based upon an image (e.g., shown in FIG. 22C), of the one or more first images, associated with the lateral position of the first patient.

In some examples, the landmark information interface 1702 may display one or more graphical objects indicative of at least one of the profile angle 2232, the first line, the second line, the nose landmark point 2204, the glabella landmark point 2234, the subnasal landmark point 2236 and/or the pogonion landmark point 2238. In an example, the one or more graphical objects may be displayed overlaying a representation of an image (e.g., the image shown in FIG. 22C) associated with lateral position of the first patient.

Alternatively and/or additionally, the one or more graphical objects may be indicative of whether or not the profile angle 2232 meets a first condition, whether or not the profile angle 2232 meets a second condition and/or whether or not the profile angle 2232 meets a third condition. In an example, the first condition is a condition that the profile angle 2232 is within a range of values (e.g., 170 degrees to 180 degrees). In an example, the second condition is a condition that the profile angle 2232 is smaller than the range of values. In an example, the third condition is a condition that the profile angle 2232 is larger than the range of values. In some examples, in response to a determination that the first condition is met, one or more graphical objects may be displayed, via the landmark information interface 1702, indicating that the first condition is met (e.g., the one or more graphical objects may comprise a set of text, such as "Profile Normal", and/or the graphical object may be a color, such as green, indicating that the first condition is met). Alternatively and/or additionally, in response to a determination that the second condition is met, one or more graphical objects may be displayed, via the landmark information interface 1702, indicating that the second condition is met and/or that the first condition is not met (e.g., the one or more graphical objects may comprise a set of text, such as "Profile=Convex", and/or the graphical object may be a color, such as red, indicating that the second condition is met and/or the first condition is not met). In some examples, the second condition being met may be indicative of a medical condition, an aesthetic condition and/or a dental condition of the first patient (e.g., a problematic condition for which one or more treatments may be provided), such as a condition associated with the first patient having a convex profile. Alternatively and/or additionally, in response to a determination that the third condition is met, one or more graphical objects may be displayed, via the landmark information interface 1702, indicating that the third condition is met and/or that the first condition is not met (e.g., the one or more graphical objects may comprise a set of text, such as "Profile=Concave", and/or the graphical object may be a color, such as red, indicating that the third condition is met and/or the first condition is not met). In some examples, the third condition being met may be indicative of a medical condition, an aesthetic condition and/or a dental condition of the first patient (e.g., a problematic condition for which one or more treatments may be provided), such as a condition associated with the first patient having a concave profile.

Figure 22D:
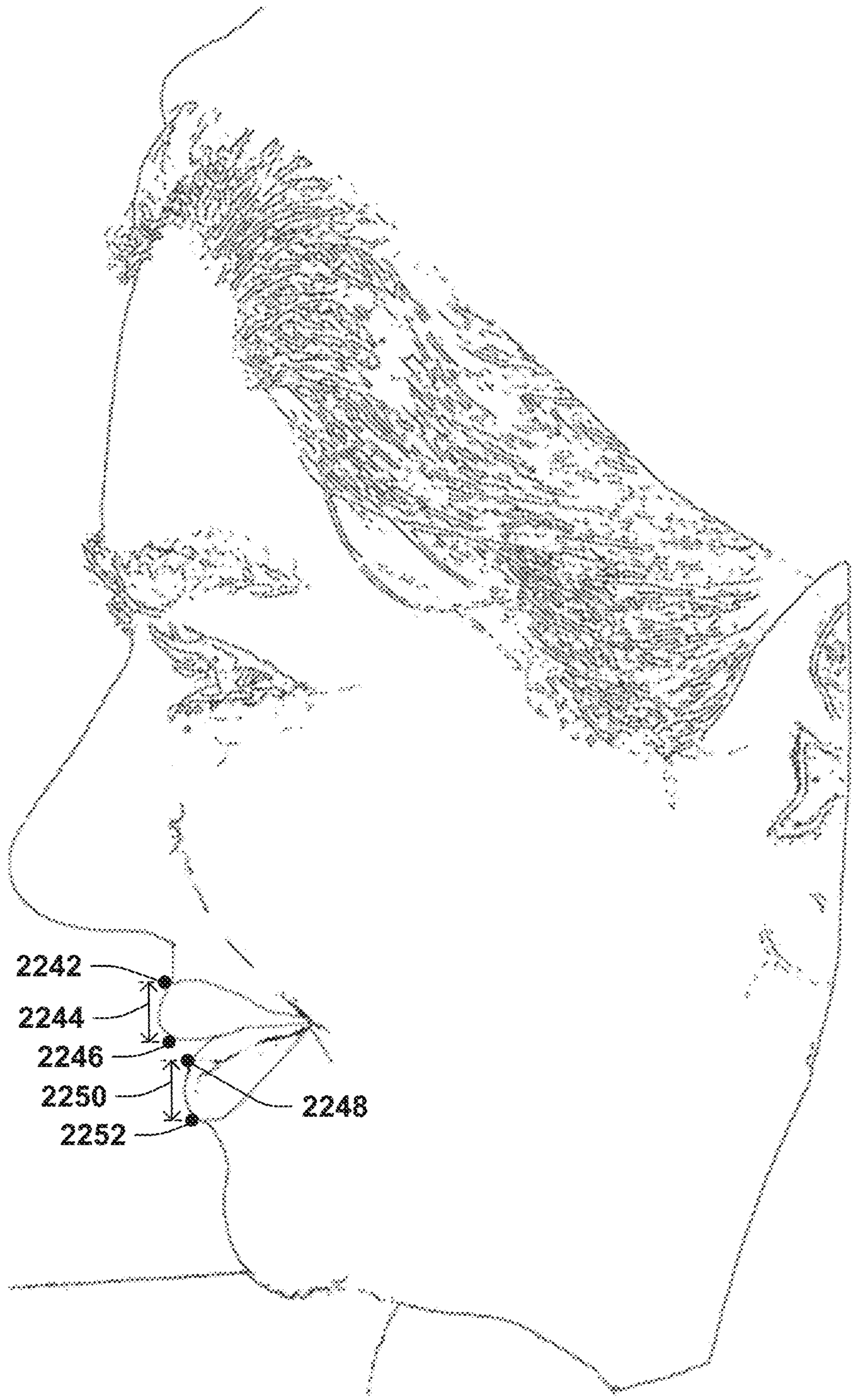

In FIG. 22D, an upper lip height 2244 and/or a lower lip height 2250 may be determined. In some examples, the upper lip height 2244 may be determined based upon an upper lip outer landmark point 2242 (e.g., the upper lip outer landmark point 2242 may be a middle of an outer boundary of upper lip vermillion) and/or an upper lip inner landmark point 2246 (e.g., the upper lip outer landmark point 2246 may be a middle of an inner boundary of upper lip vermillion). In some examples, the lower lip height 2250 may be determined based upon a lower lip outer landmark point 2252 (e.g., the lower lip outer landmark point 2252 may be a middle of an outer boundary of lower lip vermillion) and/or a lower lip inner landmark point 2248 (e.g., the lower lip inner landmark point 2248 may be a middle of an inner boundary of lower lip vermillion).

In some examples, the landmark information interface 1702 may display one or more graphical objects indicative of at least one of the upper lip height 2244, the lower lip height 2250, the upper lip outer landmark point 2242, the upper lip inner landmark point 2246, the lower lip outer landmark point 2252 and/or the lower lip inner landmark point 2248. In an example, the one or more graphical objects may be displayed overlaying a representation of an image (e.g., the image shown in FIG. 22D) associated with lateral position of the first patient.

Alternatively and/or additionally, the one or more graphical objects may be indicative of whether or not the upper lip height 2244 and/or the lower lip height 2250 meet a first condition, whether or not the upper lip height 2244 and/or the lower lip height 2250 meet a second condition and/or whether or not upper lip height 2244 and/or the lower lip height 2250 meet a third condition.

The upper lip height 2244 divided by the lower lip height 2250 is equal to a first value. In an example, the first condition is a condition that the first value is equal to a second value (e.g., 0.5). In an example, the second condition is a condition that the first value is smaller than the second value. In an example, the third condition is a condition that the first value is larger than the second value.

Alternatively and/or additionally, the first condition is a condition that difference between the first value and the second value is less than a threshold difference. In an example, the second condition is a condition that the first value is smaller than a third value equal to the second value subtracted by the threshold difference. In an example, the third condition is a condition that the first value is larger than a fourth value equal to a sum of the second value and the threshold difference.

In some examples, in response to a determination that the first condition is met, one or more graphical objects may be displayed, via the landmark information interface 1702, indicating that the first condition is met (e.g., the one or more graphical objects may comprise a set of text, such as "Lip Height Normal", and/or the graphical object may be a color, such as green, indicating that the first condition is met). Alternatively and/or additionally, in response to a determination that the second condition is met, one or more graphical objects may be displayed, via the landmark information interface 1702, indicating that the second condition is met and/or that the first condition is not met (e.g., the one or more graphical objects may comprise a set of text, such as "Lip Height" and/or "Thin Lip", and/or the graphical object may be a color, such as red, indicating that the second condition is met and/or the first condition is not met). In some examples, the second condition being met may be indicative of a medical condition, an aesthetic condition and/or a dental condition of the first patient (e.g., a problematic condition for which one or more treatments may be provided), such as a condition associated with the first patient having a thinner than normal upper lip and/or thicker than normal lower lip. Alternatively and/or additionally, in response to a determination that the third condition is met, one or more graphical objects may be displayed, via the landmark information interface 1702, indicating that the third condition is met and/or that the first condition is not met (e.g., the one or more graphical objects may comprise a set of text, such as "Lip Height" and/or "Thick Lip", and/or the graphical object may be a color, such as red, indicating that the third condition is met and/or the first condition is not met). In some examples, the third condition being met may be indicative of a medical condition, an aesthetic condition and/or a dental condition of the first patient (e.g., a problematic condition for which one or more treatments may be provided), such as a condition associated with the first patient having a thicker than normal upper lip and/or thinner than normal lower lip.

Figure 22E:
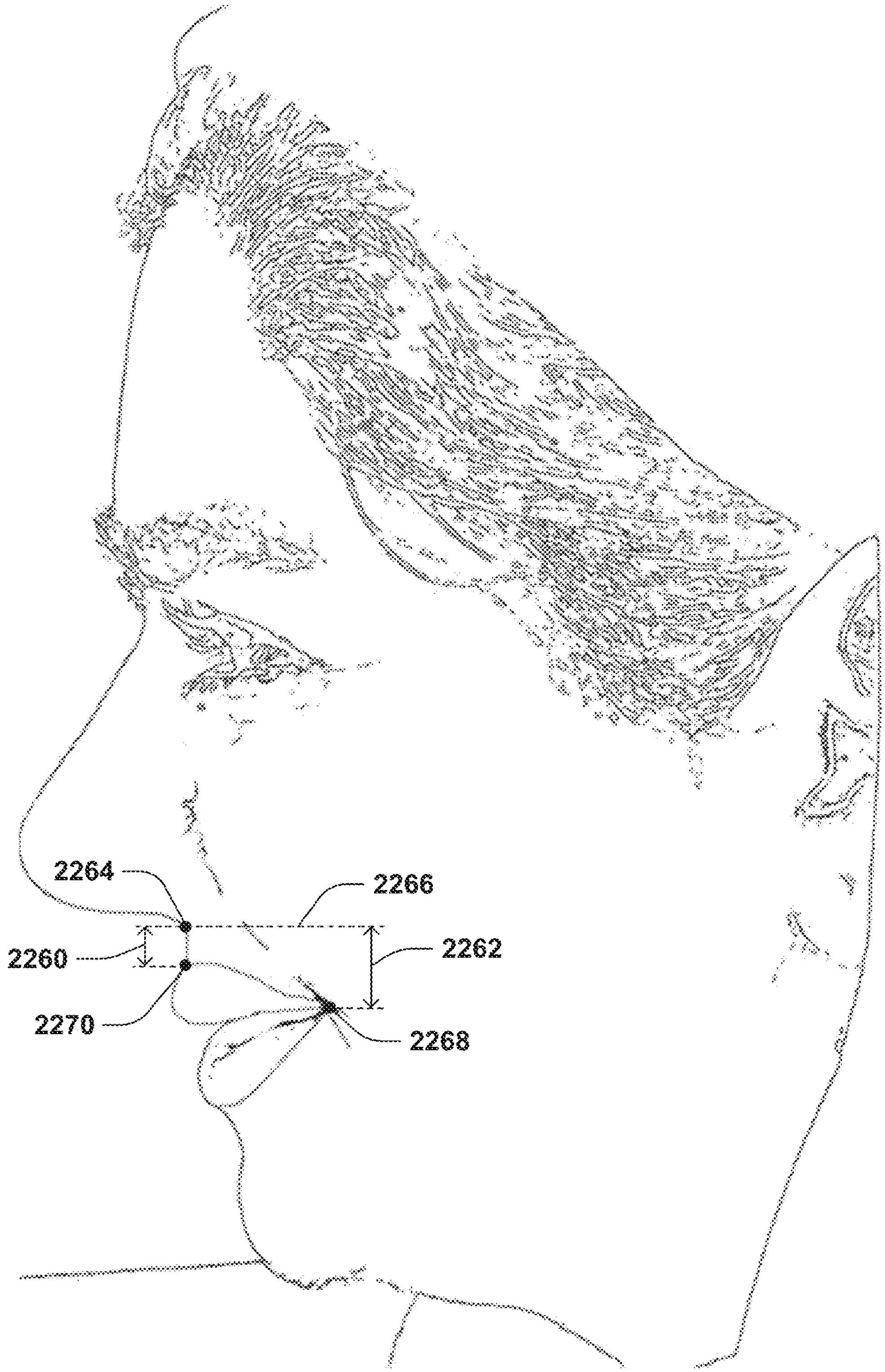

In FIG. 22E, a first vertical distance 2260 between a subnasal landmark point 2264 and an upper lip outer landmark point 2270 (e.g., the upper lip outer landmark point 2270 may be a middle of an outer boundary of upper lip vermillion) and/or a second vertical distance 2262 between the subnasal landmark point 2264 and a commissure landmark point 2268 may be determined. In some examples, the commissure landmark point 2268 may correspond to a commissure of lips of the first patient. The second vertical distance 2262 may correspond to a distance (e.g., a vertical axis distance) between the vertical position 2266 of the subnasal landmark point 2264 and a vertical position of the commissure landmark point 2268.

In some examples, the landmark information interface 1702 may display one or more graphical objects indicative of at least one of the first vertical distance 2260, the second vertical distance 2262, the subnasal landmark point 2264, the upper lip outer landmark point 2270 and/or the commissure landmark point 2268. In an example, the one or more graphical objects may be displayed overlaying a representation of an image (e.g., the image shown in FIG. 22E) associated with lateral position of the first patient.

Alternatively and/or additionally, the one or more graphical objects may be indicative of whether or not the first vertical distance 2260 and/or the second vertical distance 2262 meet a first condition. In an example, the first condition is a condition that the first vertical distance 2260 is within a range of values based upon the second vertical distance 2262. In an example, when the first patient is in smiling state, the first vertical distance 2260 should be larger than the second vertical distance 2262 (where the first vertical distance 2260 and the second vertical distance 2262 are determined based upon an image in which the first user is in smiling state). In some examples, the range of values ranges from a first value (e.g., the first value may be equal to a sum of the second vertical distance 2262 and 2 millimeters) to a second value (e.g., the second value may be equal to a sum of the second vertical distance 2262 and 3 millimeters). In some examples, in response to a determination that the first condition is met, one or more graphical objects may be displayed, via the landmark information interface 1702, indicating that the first condition is met (e.g., the one or more graphical objects may comprise a set of text, such as "Philtrum Height", and/or the graphical object may be a color, such as green, indicating that the first condition is met). Alternatively and/or additionally, in response to a determination that the first condition is not met, one or more graphical objects may be displayed, via the landmark information interface 1702, indicating that the first condition is not met (e.g., the one or more graphical objects may comprise a set of text, such as "Philtrum Height", and/or the graphical object may be a color, such as red, indicating that the first condition is not met). In some examples, the first condition not being met may be indicative of a medical condition, an aesthetic condition and/or a dental condition of the first patient (e.g., a problematic condition for which one or more treatments may be provided), such as a condition associated with a philtrum height of a philtrum of the first patient being larger or smaller than normal.

Figure 23A:
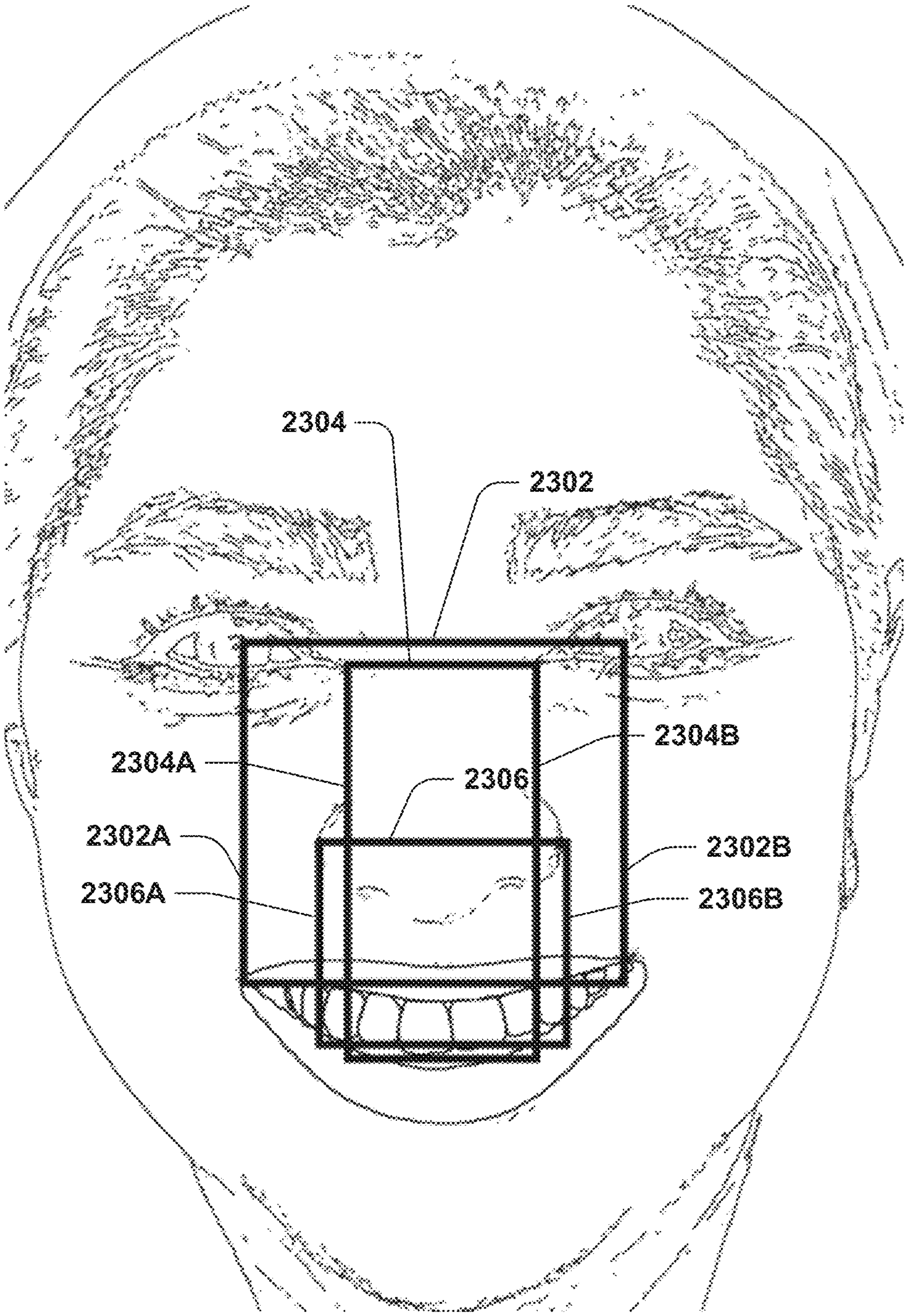
FIG. 23A illustrates determination of one or more facial boxes, according to some embodiments.
Figure 23B:
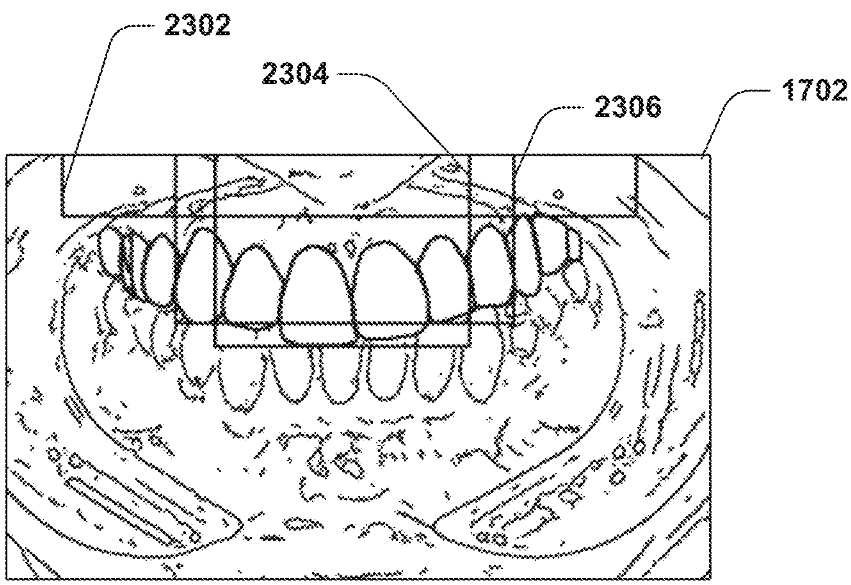
FIG. 23B illustrates an example of a landmark information interface displaying one or more graphical objects comprising at least a portion of one or more facial boxes.

FIGS. 23A-23B illustrates generation of one or more facial boxes and/or presentation of one or more graphical objects, indicative of the one or more facial boxes, via the landmark information interface 1702. In FIG. 22A, the one or more facial boxes may be generated.

The one or more facial boxes comprise an inter-pupillary box 2302. In some examples, the inter-pupillary box 2302 is generated based upon pupillary landmark points of the face of the first patient and/or one or more commissure landmark points (e.g., the one or more commissure landmark points may correspond to one or more commissures of lips of the first patient). In some examples, a lateral position of a line 2302A of the inter-pupillary box 2302 is based upon a first pupillary landmark point of the pupillary landmark points (e.g., the lateral position of the line 2302A is equal to a lateral position of the first pupillary landmark point) and/or a lateral position of a line 2302B of the inter-pupillary box 2302 is based upon a second pupillary landmark point of the pupillary landmark points (e.g., the lateral position of the line 2302B is equal to a lateral position of the second pupillary landmark point), wherein the line 2302A and/or the line 2302B may extend (e.g., parallel to a vertical axis) from a top vertical position (e.g., a vertical position based upon one or more vertical positions of one or more pupillary landmark points of the pupillary landmark points, such as a vertical position equal to at least one vertical position of the one or more vertical positions) to a bottom vertical position (e.g., a vertical position based upon, such as equal to, a vertical position of one or more vertical positions of the one or more commissure points).

The one or more facial boxes comprise a medial canthus box 2304. In some examples, the medial canthus box 2304 is generated based upon medial canthus landmark points of the face of the first patient and/or one or more incisal edges of one or more central incisors. In some examples, a lateral position of a line 2304A of the medial canthus box 2304 is based upon a first medial canthus landmark point of the medial canthus landmark points (e.g., the lateral position of the line 2304A is equal to a lateral position of the first medial canthus landmark point) and/or a lateral position of a line 2304B of the medial canthus box 2304 is based upon a second medial canthus landmark point of the medial canthus landmark points (e.g., the lateral position of the line 2304B is equal to a lateral position of the second medial canthus landmark point), wherein the line 2304A and/or the line 2304B may extend (e.g., parallel to a vertical axis) from a top vertical position (e.g., a vertical position based upon one or more vertical positions of one or more medial canthus landmark points of the medial canthus landmark points, such as a vertical position equal to at least one vertical position of the one or more vertical positions) to a bottom vertical position (e.g., a vertical position based upon, such as equal to, a vertical position of one or more vertical positions of the one or more incisal edges).

The one or more facial boxes comprise a nasal box 2306. In some examples, the nasal box 2306 is generated based upon ala landmark points of the face of the first patient and/or one or more incisal edges of one or more lateral incisors. In some examples, a lateral position of a line 2306A of the nasal box 2306 is based upon a first ala landmark point of the ala landmark points (e.g., the lateral position of the line 2306A is equal to a lateral position of the first ala landmark point) and/or a lateral position of a line 2306B of the nasal box 2306 is based upon a second ala landmark point of the ala landmark points (e.g., the lateral position of the line 2306B is equal to a lateral position of the second ala landmark point), wherein the line 2306A and/or the line 2306B may extend (e.g., parallel to a vertical axis) from a top vertical position (e.g., a vertical position based upon one or more vertical positions of one or more ala landmark points of the ala landmark points, such as a vertical position equal to at least one vertical position of the one or more vertical positions) to a bottom vertical position (e.g., a vertical position based upon, such as equal to, a vertical position of one or more vertical positions of the one or more incisal edges).

In some examples, the first set of facial landmark points may comprise the pupillary landmark points, the one or more commissure landmark points, the medial canthus landmark points, and/or the ala landmark points (used to determine the one or more facial boxes, for example). Alternatively and/or additionally, the pupillary landmark points, the one or more commissure landmark points, the medial canthus landmark points, and/or the ala landmark points (used to determine the one or more facial boxes, for example) may be determined based upon an image (e.g., shown in FIG. 23A), of the one or more first images, associated with the frontal position of the first patient and/or smile state of the first patient. Alternatively and/or additionally, the one or more incisal edges of the one or more central incisors and/or the one or more incisal edges of the one or more lateral incisors may be determined based upon segmentation information of the first segmentation information (e.g., the segmentation information of the first segmentation information may be generated based upon an image, of the one or more first images, associated with the frontal position of the first patient and/or smile state of the first patient).

FIG. 23B illustrates an example of the landmark information interface 1702 displaying one or more graphical objects comprising at least a portion of the one or more facial boxes. In some examples, the one or more graphical objects (e.g., at least a portion of the one or more facial boxes) may be displayed overlaying a representation of an image comprising a view (e.g., a close up view) of the first patient in frontal position (such as a view of the first patient in retractor state). Displaying the one or more graphical objects overlaying the representation of the image shown in FIG. 22B may enable a user (e.g., the dental treatment professional) to compare lines of the one or more facial boxes with teeth of the first patient. For example, whether or not a distal line of a distal edge of a lateral incisor complies with a lateral position of a medial canthus landmark point may be determined using the medial canthus box 2304 overlaying the representation of the image shown in FIG. 22B. The distal line of the distal edge of the lateral incisor not complying with the lateral position of the medial canthus landmark position (such as where a lateral distance between the distal line and a line of the medial canthus box 2304 exceeds a threshold distance) may be indicative of a medical condition, an aesthetic condition and/or a dental condition of the first patient (e.g., a problematic condition for which one or more treatments may be provided). Alternatively and/or additionally, whether or not a distal line of a distal edge of a canine complies with a lateral position of an ala landmark point may be determined using the nasal box 2306 overlaying the representation of the image shown in FIG. 22B. The distal line of the distal edge of the canine not complying with the lateral position of the ala landmark position (such as where a lateral distance between the distal line and a line of the nasal box 2306 exceeds a threshold distance) may be indicative of a medical condition, an aesthetic condition and/or a dental condition of the first patient (e.g., a problematic condition for which one or more treatments may be provided).

Figure 24A:
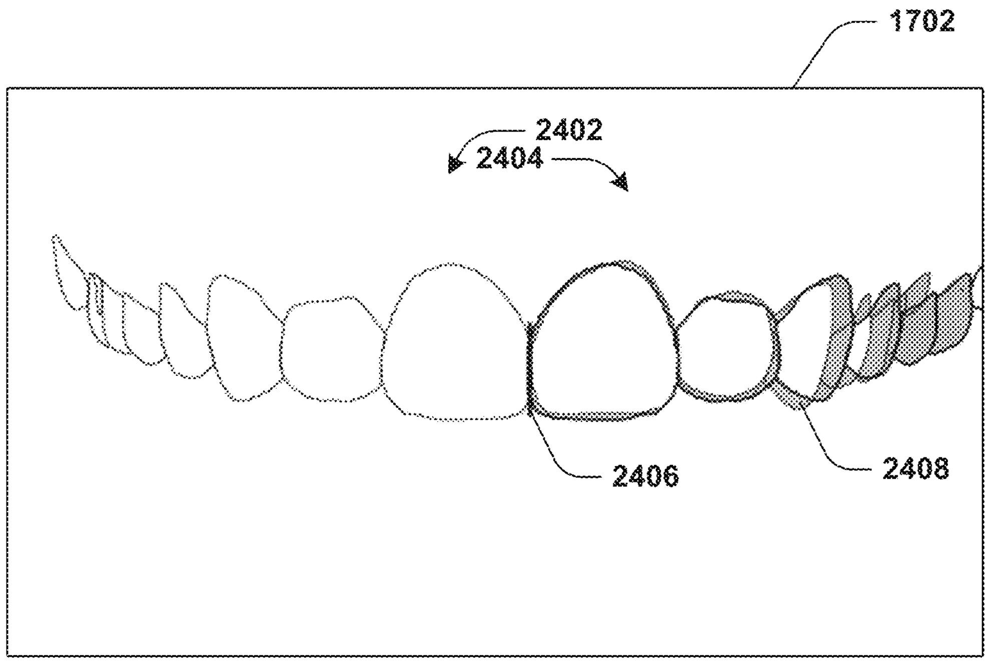
FIGS. 24A-24B illustrate a landmark information interface displaying one or more symmetrization graphical objects, according to some embodiments.
Figure 24B:
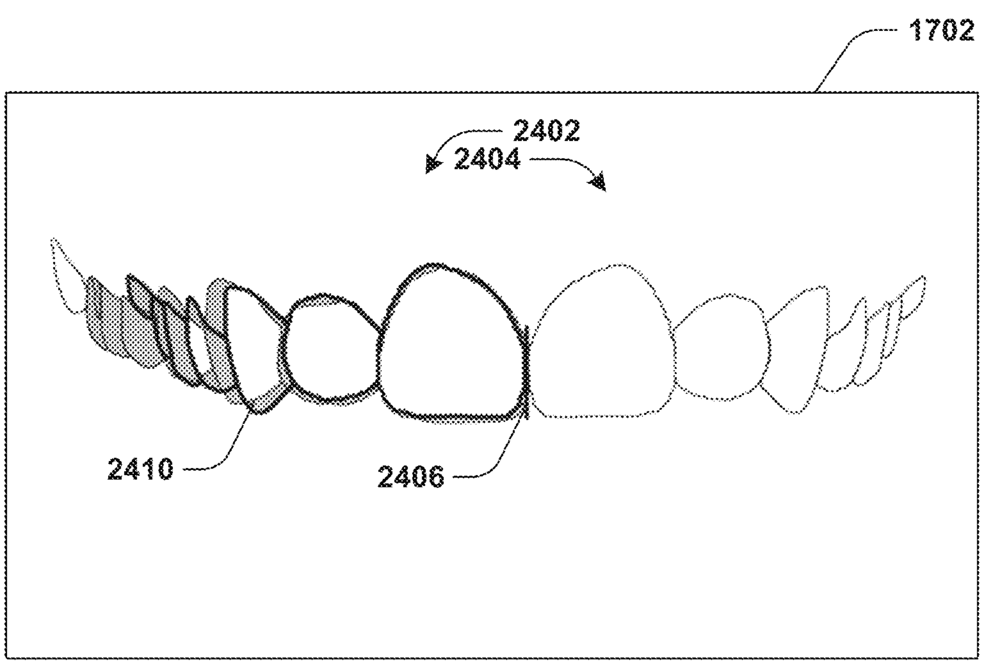

FIGS. 24A-24B illustrate the landmark information interface 1702 displaying one or more symmetrization graphical objects. In an example, a symmetrization graphical object may show differences between a first set of teeth of the first patient and a second set of teeth of the first patient, wherein the first set of teeth and the second set of teeth may be separated by a dental midline. In some examples, the one or more symmetrization graphical objects may be generated based upon the first segmentation information. FIG. 24A illustrates the landmark information interface 1702 displaying a first symmetrization graphical object showing differences 2408 (e.g., shown with shaded regions) between boundaries of a first set of teeth 2404 and boundaries of a mirror image of a second set of teeth 2402. The first set of teeth 2404 are on a first side of a dental midline 2406 and/or the second set of teeth 2404 are on a second side of the dental midline 2406. The mirror image of the second set of teeth 2402 may correspond to a mirror image, of the second set of teeth 2402, across the dental midline 2406 (e.g., the dental midline 2406 may correspond to an axis of symmetry of the first symmetrization graphical object). FIG. 24B illustrates the landmark information interface 1702 displaying a second symmetrization graphical object showing differences 2419 (e.g., shown with shaded regions) between boundaries of the second set of teeth 2402 and boundaries of a mirror image of the first set of teeth 2404. The mirror image of the first set of teeth 2404 may correspond to a mirror image, of the first set of teeth 2404, across the dental midline 2406 (e.g., the dental midline 2406 may correspond to an axis of symmetry of the second symmetrization graphical object).

Figure 25:
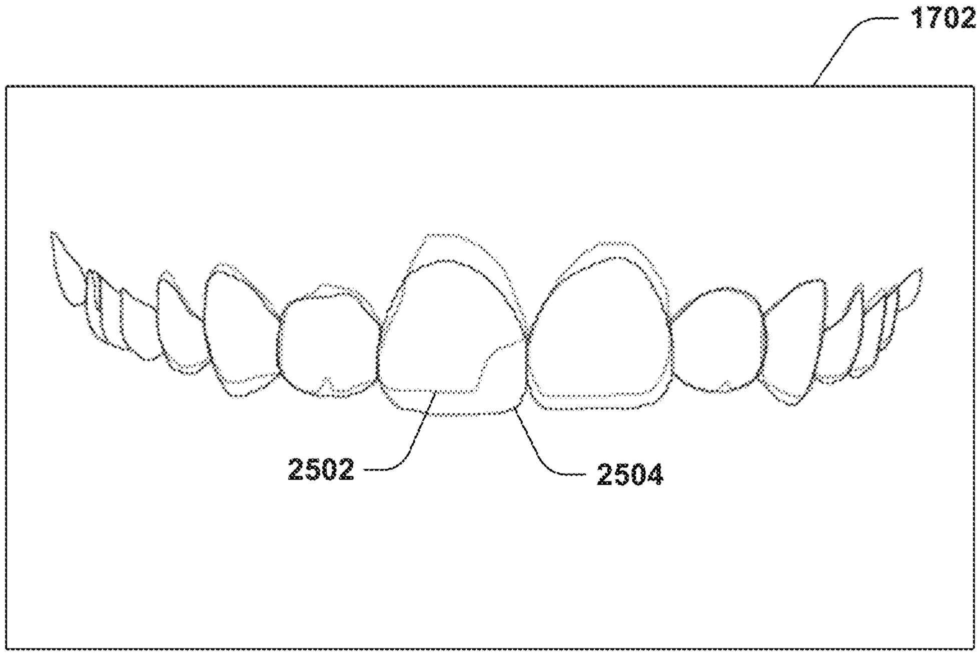
FIG. 25 illustrates a landmark information interface displaying a historical comparison graphical object, according to some embodiments.

FIG. 25 illustrates the landmark information interface 1702 displaying a historical comparison graphical object. In an example, the historical comparison graphical object may show differences between at least one of the face, facial features, teeth, jaws, gums, lips, etc. of the first patient at a first time and at least one of teeth, gums, lips, etc. of the first patient at a second time (e.g., a current time and/or a time when one or more images of the one or more first images are captured) different than the first time. In some examples, the historical comparison graphical object may be generated based upon the first landmark information (e.g., at least one of the first set of facial landmarks of the first patient, the first set of dental landmarks of the first patient, the first set of gingival landmarks of the first patient, the first set of oral landmarks, the first segmentation information, etc.) and/or historical landmark information (e.g., at least one of historical set of facial landmarks of the first patient, historical set of dental landmarks of the first patient, historical set of gingival landmarks of the first patient, historical set of oral landmarks, historical segmentation information, etc.), wherein the historical landmark information may be determined based upon one or more historical images (e.g., one or more historical images of the first patient captured at the first time). In some examples, the historical landmark information (and/or the one or more historical images based upon which the historical landmark information is determined) may be retrieved from the first patient profile associated with the first patient. In an example, the historical comparison graphical object in FIG. 25 may show boundaries 2502 of teeth of the first patient at the first time and/or boundaries 2504 of teeth of the first patient at the second time (e.g., for differentiation, the boundaries 2502 associated with the first time may be shown with a different color than the boundaries 2504 associated with the second time). In some examples, one or more abnormalities and/or one or more pathologies associated with at least one of the face, facial features, teeth, jaws, gums, lips, etc. of the first patient may be determined based upon the first landmark information and the historical landmark information, wherein the landmark information interface 1702 may display one or more indications of the one or more abnormalities and/or the one or more pathologies (e.g., the one or more abnormalities and/or the one or more pathologies may comprise at least one of vertical dimension loss, tooth decay, tooth wear, jaw deviation, gingivitis, periodontis, etc.). For example, the first landmark information may be compared with the historical landmark information to identify information comprising at least one of a change in tooth boundaries, a change in gingival levels, a change in position of a landmark, tooth decay, tooth wear, etc., wherein one or more graphical objects indicative of the information may be displayed via the landmark information interface 1702. Alternatively and/or additionally, one or more conditions (e.g., a medical condition, an aesthetic condition and/or a dental condition of the first patient) may be determined based upon the first landmark information and the historical landmark information (e.g., it may be determined that the first patient has a gingival recession condition such as periodontis based upon a determination that a rate at which gums of the first patient recede exceeds a threshold rate), wherein one or more graphical objects indicative of the information may be displayed via the landmark information interface 1702.

Figure 26A:
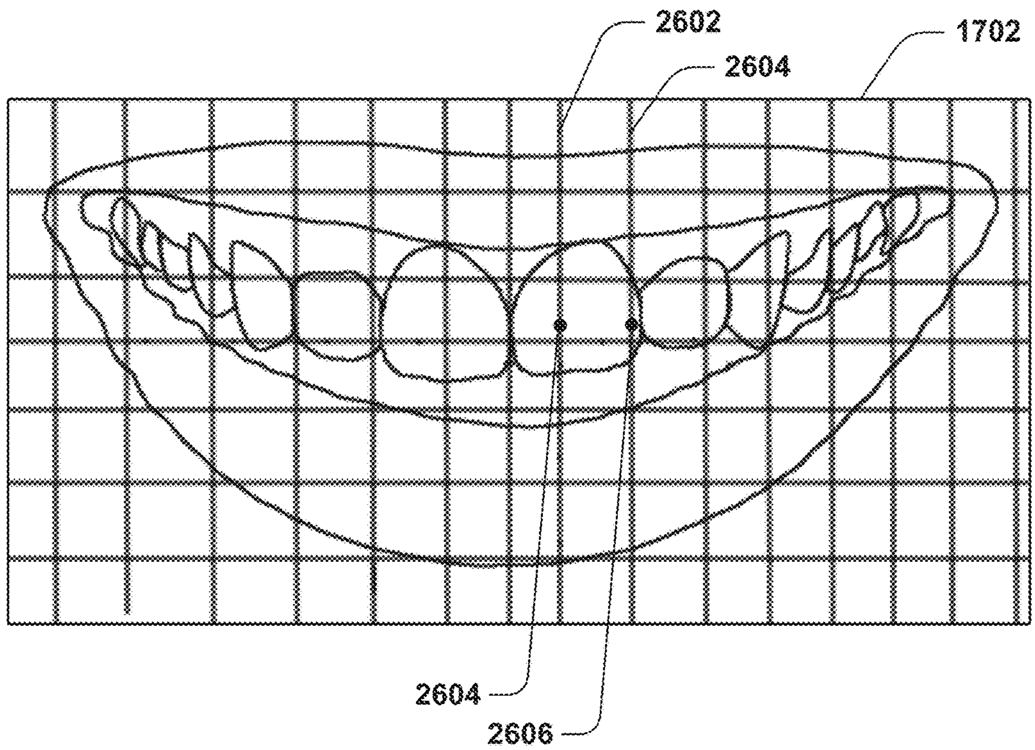
FIGS. 26A-26B illustrate a landmark information interface displaying a grid, according to some embodiments.
Figure 26B:
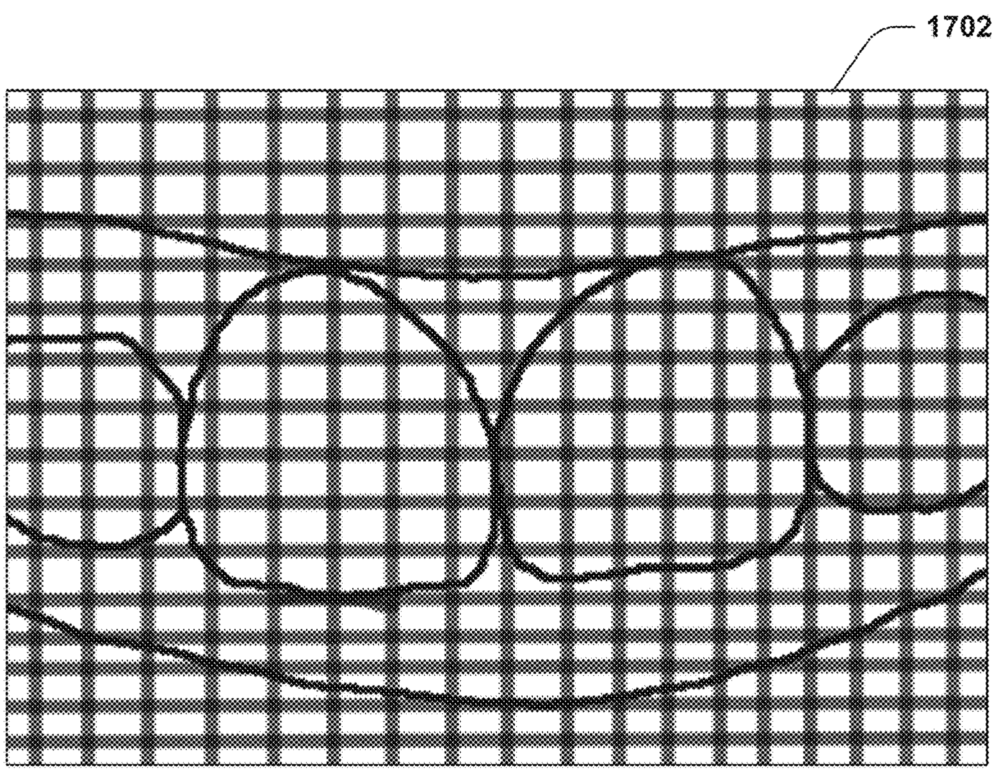

FIGS. 26A-26B illustrate the landmark information interface 1702 displaying a grid overlaying a representation of an image of the first patient. In FIG. 26A, the grid has a first grid-size (e.g., 5 millimeters). In FIG. 26B, the grid has a second grid-size (e.g., 2 millimeters). The grid-size may correspond to a distance, relative to the representation of the image, between adjacent grid-lines of the grid (e.g., grid-line 2602 and grid-line 2602). In an example where the first grid-size associated with FIG. 26A is 5 millimeters, the grid may enable a user (e.g., the dental treatment professional) to determine that a distance between a first tooth point 2604 on a tooth of the first patient and a second tooth point 2606 on a tooth of the first patient is about 5 millimeters. In some examples, the landmark information interface 1702 may display an indication of the grid-size of the grid. The grid-size may be adjusted via the landmark information interface 1702. For example, in response to a first input (e.g., one or more first interactions with the landmark information interface 1702) via the landmark information interface 1702, the grid-size may be increased. In response to a second input (e.g., one or more second interactions with the landmark information interface 1702), via the landmark information interface 1702, the grid-size may be decreased. Alternatively and/or additionally, a position of the grid (e.g., a position of grid-lines of the grid) may be adjusted via the landmark information interface 1702 (e.g., the position of the grid may be moved at least one of laterally, vertically, etc.). Accordingly, the grid may enable a user (e.g., the dental treatment professional) to move the grid such that a grid-line of the grid overlays a feature under consideration, thereby enabling the user to compare the position of the feature with other features in the representation of the image. For example, the user may identify a deviation of maxilla and/or mandible (based upon distances between features) in 3 dimensions (e.g., using the grid overlaying a representation of an image associated with frontal position, such as shown in FIGS. 26A-26B and/or using the grid overlaying a representation of an image associated with lateral position). Alternatively and/or additionally, the landmark information interface may display one or more graphical objects (e.g., one or more graphical objects indicative of one or more landmarks and/or one or more relationships between landmarks) and the grid. Alternatively and/or additionally, a color of a section (e.g., a grid-line) may be indicative of one or more conditions (e.g., a vertical grid-line may be red to indicate that an angle of a facial midline relative to the vertical grid-line exceeds a threshold angle).

Manually developing mouth designs for a patient can be very time consuming and/or error prone for a dental treatment professional. For example, it may be difficult to develop a mouth design to suit the specific circumstances of the patient, such as at least one of one or more treatments that the patient is prepared to undergo, one or more characteristics of the patient's teeth and/or jaws, etc. Thus, in accordance with one or more of the techniques herein, a mouth design system is provided that automatically generates and/or displays one or more mouth designs based upon images of the patient. Alternatively and/or additionally, the mouth design system may determine a treatment plan for achieving a mouth design such that a dental treatment professional can quickly and/or accurately treat the patient to achieve the mouth design, such as by way of at least one of minimal invasive treatment (e.g., minimally invasive dentistry), orthodontic treatment, gingival surgery, jaw surgery, prosthetic treatment, etc.

Figure 27:
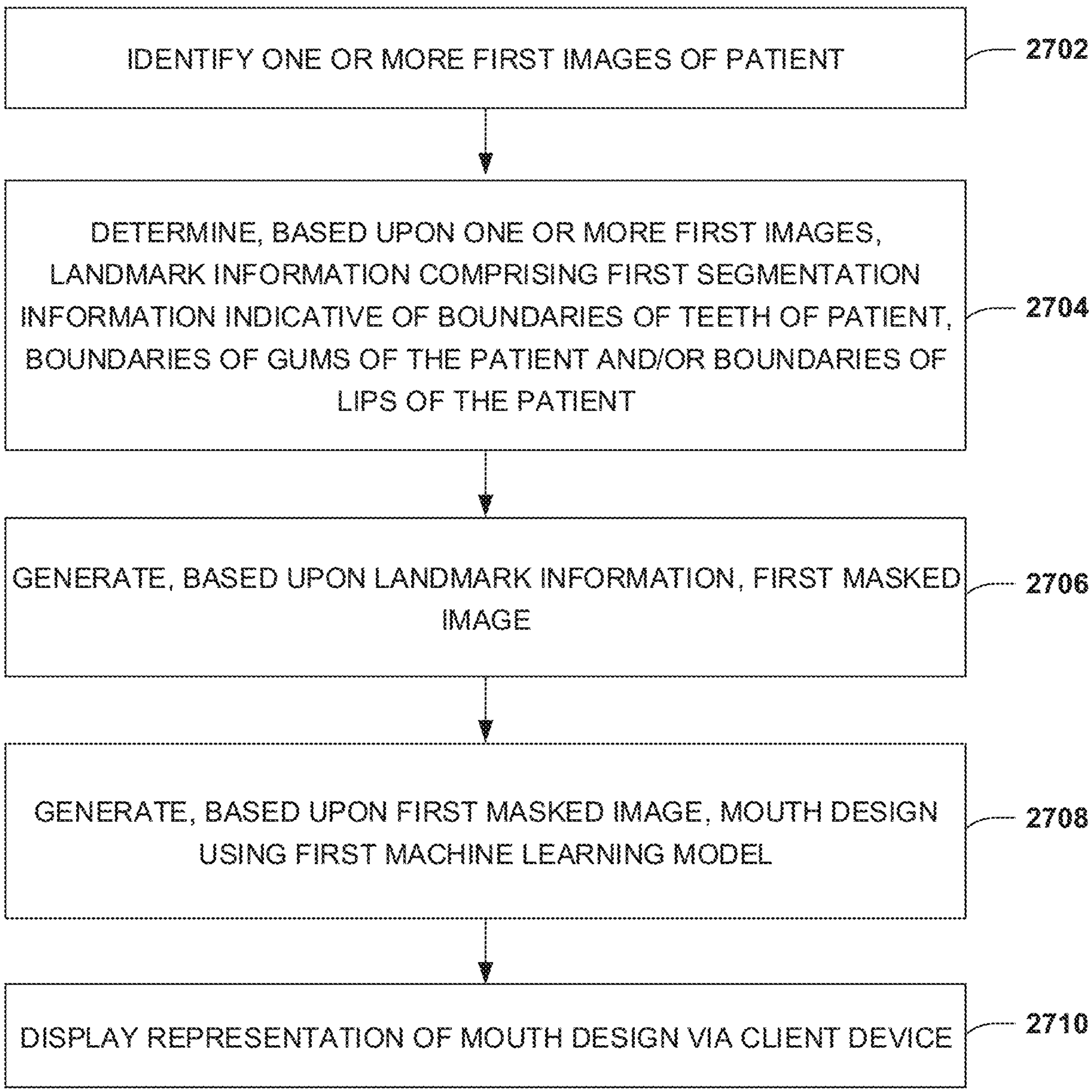
FIG. 27 is an illustration of an example method for generating and/or presenting mouth designs.

An embodiment for generating and/or presenting mouth designs is illustrated by an example method 2700 of FIG. 27. In some examples, a mouth design generation system is provided. The mouth design generation system may generate one or more mouth designs based upon one or more images and/or display one or more representations of the one or more mouth designs via a mouth design interface.

At 2702, one or more first images (e.g., one or more photographs) of a first patient are identified. In an example, the one or more first images may be retrieved from a first patient profile associated with the first patient (e.g., the first patient profile may be stored on a user profile database comprising a plurality of user profiles associated with a plurality of users).

The one or more first images may comprise one, some and/or all of the one or more first images discussed with respect to the example method 800 of FIG. 8 (e.g., the one or more first images may comprise at least one of the first set of images associated with frontal position, the second set of images associated with lateral position, the third set of images associated with ¾ position, the fourth set of images associated with 12 o'clock position, etc.).

At 2704, first landmark information may be determined based upon the one or more first images. For example, one, some and/or all of the one or more first images may be analyzed to determine the first landmark information.

The first landmark information may comprise at least some of the first landmark information discussed with respect to the example method 800 of FIG. 8 (e.g., the first landmark information may comprise at least one of the first set of facial landmarks of the first patient, the first set of dental landmarks of the first patient, the first set of gingival landmarks of the first patient, the first set of oral landmarks of the first patient, etc.).

In an example, the first landmark information may comprise first segmentation information indicative of boundaries of teeth of the first patient, gums of the first patient and/or one or more lips of the first patient. In an example, the first segmentation information may be generated based upon one or more images of the one or more first images, such as an image comprising a representation of a non-close up view of the first patient and/or an image comprising a representation of a close up view of the first patient. In an example, the first segmentation information may be generated using the segmentation model 704 (discussed with respect to FIG. 7A and/or the example method 100 of FIG. 1) using one or more of the techniques provided herein with respect to the example method 100. Examples of the first segmentation information are shown in FIGS. 7B-7K. In an example, the first segmentation information may comprise instance segmentation information and/or semantic segmentation information.

At 2706, a first masked image is generated based upon the first landmark information. One or more first portions of a first image are masked to generate the first masked image. In an example, the first image may be an image of the one or more first images (e.g., the first image may be a photograph). Alternatively and/or additionally, the first image may comprise a representation of segmentation information, of the first segmentation information, generated based upon an image of the one or more first images (e.g., the representation of the segmentation information may comprise boundaries of teeth of the first patient, gums of the first patient and/or one or more lips of the first patient).

In some examples, pixels of the one or more first portions of the first image are modified to masked pixels to generate the first masked image. Alternatively and/or additionally, pixels of one or more second portions of the first image may not be modified to generate the first masked images. For example, the first masked image may comprise pixels (e.g., unchanged and/or unmasked pixels) of the one or more second portions of the first image. The first masked image may comprise masked pixels in place of pixels, of the one or more first portions of the first image, that are masked. In some examples, noise (e.g., Gaussian noise) may be added to one or more first portions of the first image to generate the first masked image. For example, one or more masked portions of the first masked image (e.g., the one or more masked portions may correspond to the one or more first portions of the first image that are masked) may comprise noise (e.g., Gaussian noise).

In some examples, the one or more first portions of the first image may within an inside of mouth area of the first image (e.g., an area, of the first image, comprising teeth and/or gums of the first patient). In an example, portions outside of the inside of the mouth area may not be masked to generate the first masked image (e.g., merely portions, of the first image, corresponding to teeth and/or gums of the first patient may be masked). In some examples, the inside of mouth area may be identified based upon segmentation information, of the first segmentation information, indicative of boundaries of at least one of teeth, gums, lips, etc. in the first image. For example, the inside of mouth area may be identified based upon inner boundaries of lips indicated by the segmentation information (e.g., an example of the inside of mouth area within the inner boundaries of lips is shown in FIG. 7D).

Figure 28:
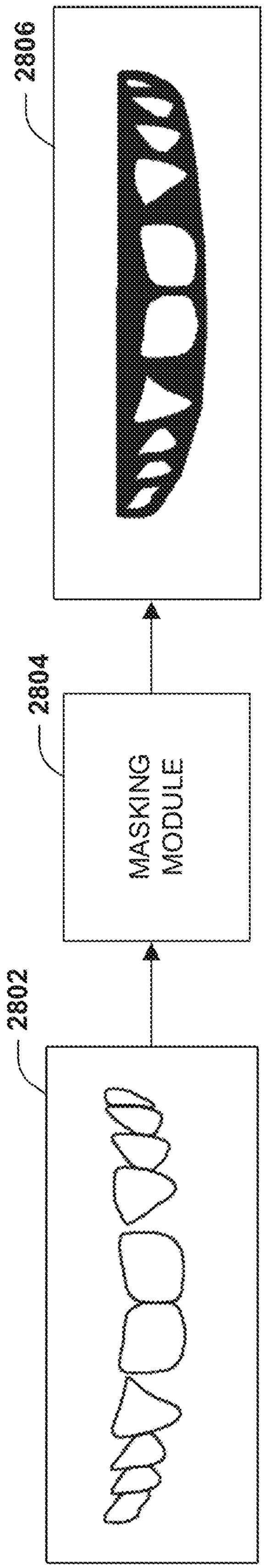
FIG. 28 illustrates a first masked image being generated using a masking module, according to some embodiments.

FIG. 28 illustrates the first masked image (shown with reference number 2806) being generated using a masking module 2804. For example, the first image (shown with reference number 2802) may be input to the masking module 2804, wherein the masking module 2804 masks the one or more first portions of the first image 2802 to generate the first masked image 2806. At least a portion of the first image 2802 and at least a portion of the first masked image 2806 are shown in FIG. 28. In an example, the first masked image 2806 comprises masked pixels (shown in black in FIG. 28) in place of at least some pixels of the one or more first portions of the first image 2802.

In some examples, the one or more first portions of the first image 2802 (that are masked to generate the first masked image 2806) do not comprise center areas of teeth in the first image 2802. For example, the masking module 2804 may identify center areas of teeth in the first image 2802 and/or may not mask the center areas to generate the first masked image 2806 (e.g., the center areas of teeth may be unchanged in a mouth design generated for the first patient). A center area of a tooth in the first image may correspond to an area, of the tooth, comprising a center point of the tooth (e.g., a center point of an exposed area of the tooth).

In some examples, the one or more first portions of the first image 2802 (that are masked to generate the first masked image 2806) comprise border areas of teeth in the first image 2802. For example, the masking module 2804 may identify border areas of teeth in the first image 2802 and/or may mask at least a portion of the border areas to generate the first masked image 2806. A border area of a tooth in the first image may correspond to an area, of the tooth, that is outside of a center point of the tooth and/or that comprises and/or is adjacent to a boundary of the tooth (e.g., the boundary of the tooth may correspond to a boundary of the border area). In some examples, teeth boundaries of teeth in the first image and/or border areas of teeth in the first image are dilated such that larger teeth have more masked pixels in the first masked image 2806.

In some examples, the one or more first portions of the first image are masked based upon the first segmentation information. For example, center areas of teeth in the image and/or border areas of teeth in the first image may be identified based upon segmentation information, of the first segmentation information, indicative of boundaries of at least one of teeth, gums, lips, etc. in the first image. For example, a center area (not to be masked by the masking module 2804, for example) of a tooth in the first image 2802 and a border area (to be masked by the masking module 2804, for example) of the tooth may be identified based upon boundaries of the tooth indicated by the segmentation information.

In some examples, sizes of the border areas and/or the center areas may be based upon at least one of one or more treatments associated with a mouth design to be generated using the first masked image 2806 (e.g., the one or more treatments correspond to one or more treatments that may be used to treat the first patient to modify and/or enhance one or more features of the first patient to achieve the mouth design, such as at least one of minimal invasive treatment, orthodontic treatment, gingival surgery, jaw surgery, prosthetic treatment, etc.), a mouth design style (e.g., at least one of fashion, ideal, natural, etc.) associated with a mouth design to be generated using the first masked image 2806, etc. For example, an extent to which the mouth of the first patient can be enhanced and/or changed using the one or more treatments may be considered for determining the sizes of the border areas and/or the center areas. In a first scenario, the one or more treatments (associated with the mouth design to be generated using the first masked image 2806) comprise minimal invasive treatment and do not comprise orthodontic treatment. In a second scenario, the one or more treatments (associated with the mouth design to be generated using the first masked image 2806) comprise orthodontic treatment. Since minimal invasive treatment may provide greater change in positions of teeth, sizes of the border areas may be larger in the second scenario than in the first scenario, whereas sizes of the center areas may be smaller in the second scenario than in the first scenario.

In a third scenario, the one or more treatments (associated with the mouth design to be generated using the first masked image 2806) comprise one or more lip treatments (e.g., botulinum toxin injection and/or filler and/or gel injection) and may not comprise other treatments associated with teeth and/or gums of the first patient. In the third scenario, portions of the first image corresponding to lips of the first patient may be masked to generate the first masked image 2806, while portions of the first image corresponding to teeth and/or gums of the first patient may not be masked to generate the first masked image 2806.

In a fourth scenario, the one or more treatments (associated with the mouth design to be generated using the first masked image 2806) comprise one or more treatments associated with treating teeth and/or gums of the first patient and may not comprise one or more lip treatments. In the fourth scenario, portions of the first image corresponding to teeth and/or gums of the first patient may be masked to generate the first masked image 2806, while portions of the first image corresponding to lips of the first patient may not be masked to generate the first masked image 2806.

In a fifth scenario, the one or more treatments (associated with the mouth design to be generated using the first masked image 2806) comprise one or more treatments associated with treating lips and teeth and/or gums of the first patient. In the fourth scenario, portions of the first image corresponding to lips and teeth and/or gums of the first patient may be masked to generate the first masked image 2806.

At 2708, based upon the first masked image 2806, a first mouth design may be generated using a first mouth design generation model (e.g., a machine learning model for mouth design generation). In some examples, the first mouth design (e.g., a smile design and/or a beautiful and/or original smile) may comprise at least one of one or more shapes and/or boundaries of one or more teeth, one or more shapes and/or boundaries of one or more gingival areas and/or one or more shapes and/or boundaries of one or more lips.

In some examples, shapes and/or boundaries of one or more teeth, one or more gingival areas and/or one or more lips indicated by the first mouth design may be different than shapes and/or boundaries of one or more teeth, one or more gingival areas and/or one or more lips of the first patient (as indicated by the first segmentation information, for example).

In an example, shapes and/or boundaries of one or more teeth and/or gingival areas indicated by the first mouth design may be different than shapes and/or boundaries of one or more teeth and/or gingival areas of the first patient (as indicated by the first segmentation information, for example), while shapes and/or boundaries of one or more lips indicated by the first mouth design are the same as shapes and/or boundaries of one or more lips of the first patient (as indicated by the first segmentation information, for example). In the example, merely shapes and/or boundaries of teeth and/or gingival areas may be adjusted to generate the first mouth design. In the example, the first mouth design may be generated to merely comprise adjustments to teeth and/or gingival areas of the first patient based upon reception of a request (via the first client device, for example) indicative of generating a mouth design with only adjustments to the teeth and/or gingival areas of the first patient (e.g., the request may be indicative of generating a mouth design that can be achieved with one or more teeth and/or gingival treatments without one or more other treatments associated with treating lips). In the example, the first masked image may be generated based upon the request such that merely portions of the first image corresponding to teeth and/or gingival areas of the first patient are masked in the first masked image, while portions of the first image corresponding to lips of the first patient are not masked in the first masked image.

In an example, shapes and/or boundaries of one or more lips indicated by the first mouth design may be different than shapes and/or boundaries of one or more lips of the first patient (as indicated by the first segmentation information, for example), while shapes and/or boundaries of one or more teeth and/or gingival areas indicated by the first mouth design are the same as shapes and/or boundaries of one or more teeth and/or gingival areas of the first patient (as indicated by the first segmentation information, for example). In the example, merely shapes and/or boundaries of lips may be adjusted to generate the first mouth design. In the example, the first mouth design may be generated to merely comprise adjustments to lips of the first patient based upon reception of a request (via the first client device, for example) indicative of generating a mouth design with only adjustments to the lips of the first patient (e.g., the request may be indicative of generating a mouth design that can be achieved with one or more lip treatments without one or more other treatments associated with treating teeth and/or gums). In the example, the first masked image may be generated based upon the request such that merely portions of the first image corresponding to lips of the first patient are masked in the first masked image, while portions of the first image corresponding to teeth and/or gingival areas of the first patient are not masked in the first masked image.

In an example, shapes and/or boundaries of one or more lips, teeth and gingival areas indicated by the first mouth design may be different than shapes and/or boundaries of one or more lips, teeth and gingival areas of the first patient (as indicated by the first segmentation information, for example). In the example, shapes and/or boundaries of lips, teeth and gingival areas may be adjusted to generate the first mouth design. In the example, the first mouth design may be generated to comprise adjustments to lips, teeth and gingival areas of the first patient based upon reception of a request (via the first client device, for example) indicative of generating a mouth design with adjustments to the lips, teeth and gingival areas of the first patient (e.g., the request may be indicative of generating a mouth design that can be achieved with one or more treatments associated with treating lips, teeth and/or gums). In the example, the first masked image may be generated based upon the request such that portions of the first image corresponding to lips, teeth and gingival areas of the first patient are masked in the first masked image.

In some examples, generating the first mouth design comprises regenerating masked pixels of the first masked image 2806 using the first mouth design generation model. In some examples, the first mouth design generation model comprises a score-based generative model, wherein the score-based generative model may comprise a stochastic differential equation (SDE), such as a SDE neural network model. Alternatively and/or additionally, the first mouth design generation model may comprise a Generative Adversarial Network (GAN). In some examples, the first masked image and/or the first mouth design may be generated via an inpainting process.

Figure 29:
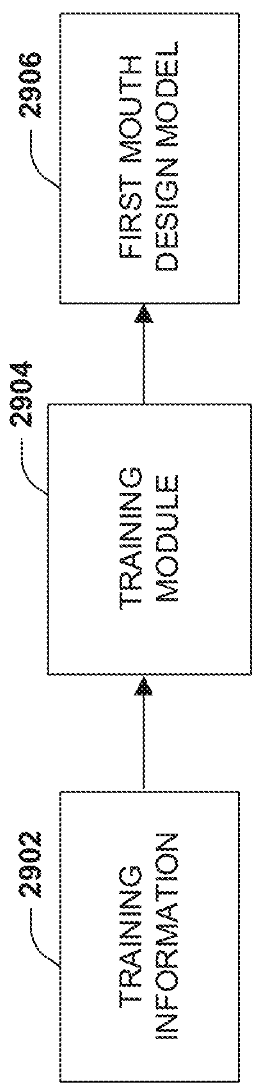
FIG. 29 illustrates a first mouth design generation model being trained by a training module, according to some embodiments.

In some examples, the first mouth design generation model may be trained using first training information. FIG. 29 illustrates the first mouth design generation model (shown with reference number 2906) being trained by a training module 2904 using the first training information (shown with reference number 2902). The first training information 2902 may comprise a plurality of training images comprising views of at least one of faces, teeth, gums, lips, etc. of a plurality of people. In some examples, the plurality of training images may be determined to be images of desirable and/or beautiful images (e.g., the plurality of training images may be selected, such as by image selection agents, from a set of images). In some examples, at least some of the plurality of training images may be retrieved from one or more datasets (e.g., BIWI dataset and/or other dataset). Alternatively and/or additionally, characteristics associated with images of the plurality of training images may be determined. For example, the first training information 2902 may comprise a plurality of sets of characteristics associated with images of the plurality of training images. In an example, a set of characteristics (of the plurality of sets of characteristics) associated with an image of the plurality of training images plurality of training images may comprise at least one of a shape of lips associated with the image, a shape of a face associated with the image, a gender of a person associated with the image, an age of a person associated with the image, a job of a person associated with the image, an ethnicity of a person associated with the image, a race of a person associated with the image, a personality of a person associated with the image, a self-acceptance of a person associated with the image, one or more treatments (e.g., treatment for enhancing teeth and/or mouth) a person associated with the image underwent before the image was captured, a skin color of a person associated with the image, a lip color of a person associated with the image, etc. In some examples, the plurality of images may comprise pairs of images, wherein each pair of images comprises a before image (e.g., an image captured prior to a person associated with the image underwent one or more treatments for enhancing teeth and/or mouth) and/or an after image (e.g., an image captured after the person underwent the one or more treatments). In some examples, the plurality of training images may comprise multiple types of images (e.g., images associated with frontal position, images associated with lateral position, images associated with ¾ position, images associated with 12 o'clock position, close up images comprising a view of a portion of a face, non-close up images comprising a view of a face, images associated with the smile state, images associated with the closed lips state, images associated with the rest state, images associated with one or more vocalization states, images associated with the retractor state, images associated with the rubber dam state, images associated with the contractor state, images associated with the shade guide state, images associated with the mirror state, etc.). Alternatively and/or additionally, the first training information 2902 may comprise segmentation information indicative of boundaries of at least one of teeth, lips, gums, etc. in images of the plurality of training images. In an example, the segmentation information may be generated using the segmentation model 704 (discussed with respect to FIG. 7A and/or the example method 100 of FIG. 1) using one or more of the techniques provided herein with respect to the example method 100. Alternatively and/or additionally, the first training information 2902 may comprise facial landmark points of faces in images of the plurality of training images. In an example, the facial landmark points may be determined using the facial landmark point identification model (discussed with respect to the example method 100 of FIG. 1).

In some examples, the first mouth design may be generated, using the first mouth design generation model 2906, based upon information comprising at least one of a shape of lips associated with the first patient (e.g., the shape of lips may be determined based upon the first landmark information, such as the first segmentation information), a shape of a face associated with the first patient (e.g., the shape of a face may be determined based upon the one or more first images), a gender associated with the first patient, an age associated with the first patient, a job associated with the first patient, an ethnicity associated with the first patient, a race associated with the first patient, a personality associated with the first patient, a self-acceptance associated with the first patient, a skin color associated with the first patient, a lip color associated with the first patient, etc. For example, the first mouth design may be generated (using the first mouth design generation model 2906) based upon the information and the first training information 2902. In an example, the first mouth design may be generated based upon images, of the first training information 2902, associated with characteristics matching at least one of the shape of lips associated with the first patient, the shape of the face associated with the first patient, the gender associated with the first patient, the age associated with the first patient, the job associated with the first patient, the ethnicity associated with the first patient, the race associated with the first patient, the personality associated with the first patient, the self-acceptance associated with the first patient, the skin color associated with the first patient, the lip color associated with the first patient, etc.

Alternatively and/or additionally, the first mouth design may be generated, using the first mouth design generation model 2906, based upon multiple images of the one or more first images. For example, the first mouth design may be generated based upon segmentation information, of the first segmentation information, generated based upon the multiple images (e.g., the segmentation may be indicative of boundaries of teeth of the first patient in the multiple images, boundaries of lips of the first patient in the multiple images and/or boundaries of gums of the first patient in the multiple images). The multiple images may comprise views of the first patient in multiple mouth states of the patient. The multiple mouth states may comprise at least one of a mouth state in which the patient is smiling, a mouth state in which the patient vocalizes a letter or a term, a mouth state in which lips of the patient are in resting position, a mouth state in which lips of the patient are in closed-lips position, a mouth state in which a retractor is in the mouth of the patient, etc. In an example, the first mouth design may be generated based upon tooth show areas associated with the multiple images (e.g., the tooth show areas may be determined based upon the segmentation information associated with the multiple images), such as the one or more tooth show areas discussed with respect to the example method 800 of FIG. 8 and/or FIGS. 14A-14C.

Alternatively and/or additionally, the first mouth design may be generated based upon one or more voice recordings of the first patient, such as voice recordings of the first patient pronouncing one or more letters, terms and/or sounds (e.g., the first patient pronouncing a sound associated with at least one of the letter "s", the sound "sh", the letter "f", the letter "v", etc.). In an example, when an incisal edge of an anterior tooth is shorter than normal, the first patient may pronounce the letter "v" similar to the letter "f". In the example, the first mouth design generation model 2906 recognizes the pronunciation error using the one or more voice recordings and may generate the first mouth design with a position of the incisal edge that corrects the pronunciation error.

In some examples, the first training information 2902 may be associated with a first mouth design category. In some examples, the first mouth design category may comprise a first mouth design style (e.g., at least one of fashion, ideal, natural, etc.) and/or one or more first treatments (e.g., the one or more first treatments correspond to one or more treatments that may be used to achieve the mouth design, such as at least one of minimal invasive treatment, orthodontic treatment, gingival surgery, jaw surgery, prosthetic treatment, botulinum toxin injection for lips, filler and/or gel injection for lips, etc.). Alternatively and/or additionally, the first mouth design generation model 2906 may be associated with the first mouth design category. For example, the plurality of training images may be included in the first training information 2902 for training the first mouth design generation model 2906 based upon a determination that the plurality of training images are associated with the first mouth design category (e.g., images of the plurality of training images are classified as comprising a view of at least one of a face, a mouth, teeth, etc. having a mouth style corresponding to the first mouth design style and/or images of the plurality of training images are associated with people that have undergone one, some and/or all of the one or more first treatments). Accordingly, the first mouth design generation model 2906 may be trained to generate mouth designs associated according to the first mouth design category (e.g., a mouth design generated by the first mouth design generation model 2906 may have one or more features corresponding to the first mouth design style of the first mouth design category and/or may have one or more features that can be achieved via one, some and/or all of the one or more first treatments).

In some examples, the mouth design generation system may comprise a plurality of mouth design generation models, comprising the first mouth design generation model 2906, associated with a plurality of mouth design categories comprising the first mouth design category. In an example, the plurality of mouth design generation models comprises the first mouth design generation model 2906 associated with the first mouth design category, a second mouth design generation model associated with a second mouth design category of the plurality of mouth design categories, a third mouth design generation model associated with a third mouth design category of the plurality of mouth design categories, etc. For example, each mouth design category of the plurality of mouth design categories may comprise a mouth design style and/or one or more treatments, wherein mouth design categories of the plurality of mouth design categories are different from each other. Alternatively and/or additionally, each mouth design generation model of the plurality of mouth design generation models may be trained (using one or more of the techniques provided herein for training the first mouth design generation model 2906, for example) using training information associated with a mouth design category associated with the mouth design generation model. In some examples, each mouth design generation model of one, some and/or all mouth generation models of the plurality of mouth design generation models may comprise a score-based generative model, wherein the score-based generative model may comprise a SDE, such as a SDE neural network model. Alternatively and/or additionally, each mouth design generation model of one, some and/or all mouth generation models of the plurality of mouth design generation models may comprise a Generative Adversarial Network (GAN).

Figure 30:
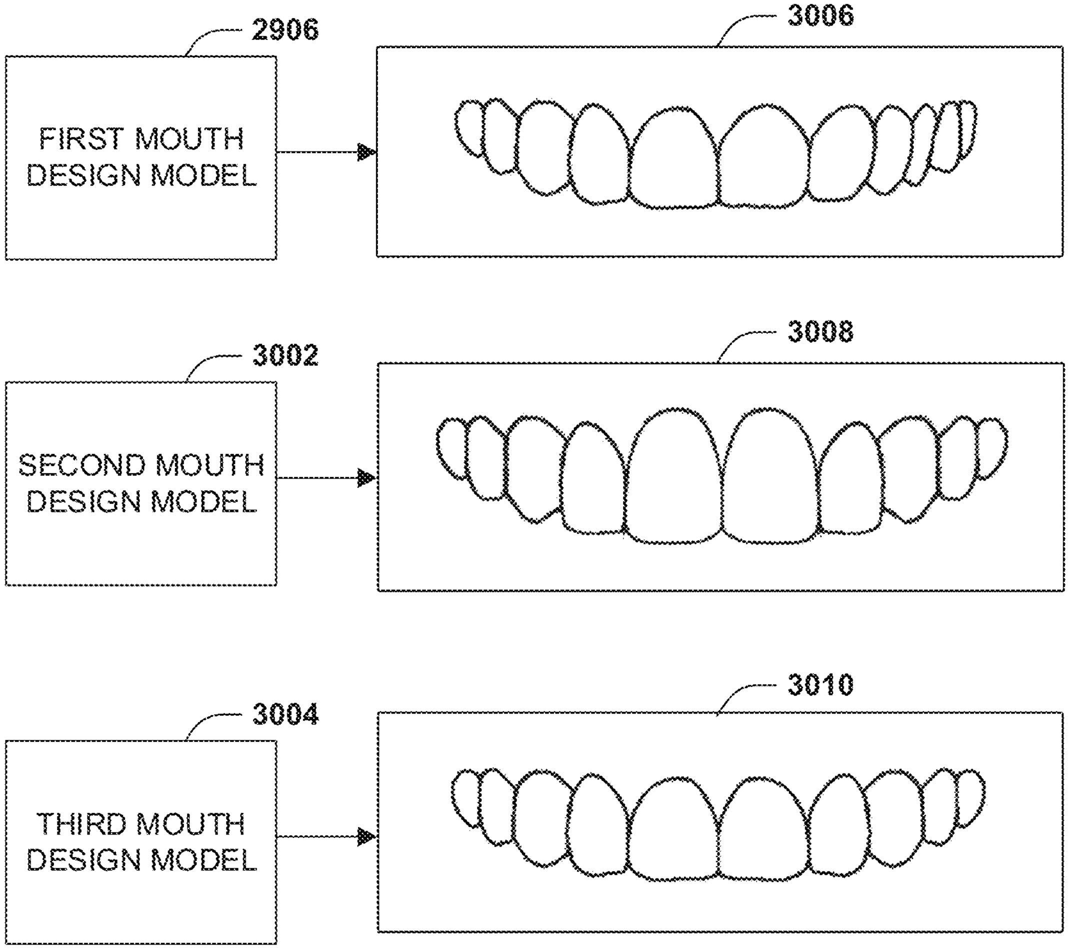
FIG. 30 illustrates a plurality of mouth designs being generated using a plurality of mouth design generation models, according to some embodiments.

In an example, a plurality of mouth designs may be generated for the first patient using the plurality of mouth design generation models. For example, the first mouth design may be generated using the first mouth design generation model 2906 based upon the first masked image 2806, a second mouth design may be generated using the second mouth design generation model based upon a second masked image, a third mouth design may be generated using the third mouth design generation model based upon a third masked image, etc. In some examples, masked images used to generate the plurality of mouth designs may be the same (e.g., the first masked image 2806 may be the same as the second masked image). Alternatively and/or additionally, masked images used to generate the plurality of mouth designs may be different from each other (e.g., the first masked image 2806 may be different than the second masked image). For example, the first masked image 2806 may be generated by the masking module 2804 based upon the first mouth design category (e.g., based upon the first mouth design style and/or the one or more first treatments of the first mouth design category), the second masked image may be generated by the masking module 2804 based upon the second mouth design category (e.g., based upon a second mouth design style and/or one or more second treatments of the second mouth design category), etc. FIG. 30 illustrates the plurality of mouth designs being generated using the plurality of mouth design generation models. In an example, the first mouth design generation model 2906 may generate the first mouth design (shown with reference number 3006) comprising a first arrangement of teeth according to the first mouth design category comprising the first mouth design style (e.g., natural style), the second mouth design generation model (shown with reference number 3002) may generate the second mouth design (shown with reference number 3008) comprising a second arrangement of teeth according to the second mouth design category comprising the second mouth design style (e.g., fashion style) and/or the third mouth design generation model (shown with reference number 3004) may generate the third mouth design (shown with reference number 3010) comprising a third arrangement of teeth according to the third mouth design category comprising a third mouth design style (e.g., ideal style).

In some examples, for each mouth design category of one, some and/or all mouth design categories of the plurality of mouth design categories, the plurality of mouth designs may comprise multiple mouth designs associated with multiple positions and/or multiple mouth states (e.g., the multiple positions and/or the multiple mouth states may correspond to positions and/or mouth states of images of the one or more first images), such as where each mouth design of the multiple mouth designs corresponds to an arrangement of teeth and/or lips in a position (e.g., frontal, lateral, etc.) and/or a mouth state (e.g., smile state, resting state, etc.). For example, each mouth design of the multiple mouth designs associated with the mouth design category may be generated based upon an image of the one or more first images. In some examples, the multiple mouth designs associated with the mouth design category may be generated using a single mouth design generation model associated with the mouth design category. Alternatively and/or additionally, the multiple mouth designs associated with the mouth design category may be generated using multiple mouth design generation models associated with the mouth design category.

At 2710, a representation of the first mouth design 3006 may be displayed via a first client device. For example, the representation of the first mouth design 3006 may be displayed via the mouth design interface on the first client device. In an example, the first client device may be associated with a dental treatment professional such as at least one of a dentist, a mouth design dentist, an orthodontist, a dental technician, a mouth design technician, etc. For example, the dental treatment professional and/or the first patient may use the mouth design interface (and/or the first mouth design 3006) to at least one of select a desired mouth design from among one or more mouth designs displayed via the mouth design interface, form a treatment plan for achieving the desired mouth design, etc. The first client device may be at least one of a phone, a smartphone, a wearable device, a laptop, a tablet, a computer, etc.

In some examples, the mouth design interface may display a treatment plan associated with the first mouth design 3006. The treatment plan may be indicative of one or more treatments for achieving the first mouth design 3006 on the first patient, such as at least one of minimal invasive treatment, orthodontic treatment, gingival surgery, jaw surgery, prosthetic treatment, etc. Alternatively and/or additionally, the treatment plan may be indicative of one or more materials (e.g., at least one of ceramic, resin cement, composite resin, etc.) to be used in the one or more treatments. In an example, the treatment plan may be determined based upon at least one of the one or more first treatments of the first mouth design category associated with the first mouth design 3006, treatments associated with images of the first training information 2902 (e.g., the first training information 2902 is indicative of the treatments), a comparison of boundaries of teeth and/or gums of the first patient with boundaries of teeth and/or gums of the first mouth design 3006, etc. In an example, the first mouth design generation model 2906 may be trained (to determine treatment plans for mouth designs) using pairs of images of the first training information 2902 comprising before images (e.g., the before images may comprise images captured prior one or more treatments for enhancing teeth and/or mouth) and after images (e.g., the after images may comprise images captured after one or more treatments) and/or using indications of treatments indicated by the first training information 2902 associated with the pairs of images.

In some examples, the first mouth design 3006 may be generated (using the first mouth design generation model 2906, for example) in accordance with the first mouth design category based upon a determination that at least one of the first mouth design category is a desired mouth design category of the first patient, the first mouth design style is a desired mouth design style of the first patient, the one or more first treatments are one or more desired treatments of the first patient, etc. For example, the first mouth design 3006 may be generated based upon the first mouth design category (and/or the representation of the first mouth design 3006 may be displayed) in response to a reception of a request (via the first client device, for example) indicative of at least one of the first mouth design category, the first mouth design style, the one or more first treatments, etc. In an example, the first patient may select the first mouth design style and/or the one or more first treatments based upon a preference of the first patient (and/or the first patient may choose the one or more first treatments from among a plurality of treatments based upon an ability and/or resources of the first patient for undergoing treatment).

In some examples, a plurality of representations of mouth designs of the plurality of mouth designs may be displayed via the mouth design interface. In some examples, the plurality of representations may comprise representations of the plurality of mouth designs in multiple positions and/or multiple mouth states (e.g., positions and/or mouth states associated with images of the one or more first images). In some examples, an order in which representations of mouth designs of the plurality of mouth designs are displayed via the mouth design interface may be determined based upon a plurality of mouth design scores associated with the plurality of mouth designs. A mouth design score of the plurality of mouth design scores may be determined based upon landmark information associated with a mouth design. In an example, the plurality of mouth design scores may comprise a first mouth design score associated with the first mouth design 3006. The first mouth design score may be determined based upon landmark information associated with the first mouth design 3006. In some examples, the landmark information may be determined (based upon the first mouth design 3006) using one or more of the techniques provided herein with respect to the example method 800 of FIG. 8. The landmark information may be indicative of one or more conditions (e.g., one or more problematic conditions, such as at least one of medical conditions, aesthetic conditions and/or dental conditions associated with at least one of an angle of a dental midline of the landmark information relative to a facial midline exceeding a threshold angle, an angle of an incisal plane relative to a horizontal axis exceeding a threshold angle, etc.). In some examples, the first mouth design score may be based upon a quantity of conditions of the one or more conditions. In an example, a higher quantity of conditions of the one or more conditions corresponds to a lower mouth design score of the first mouth design score. In an example, the landmark information may be indicative of positions of incisal edges of one or more teeth of the first mouth design 3006 (e.g., the one or more teeth may comprise anterior teeth, such as upper central incisors and/or the one or more positions of incisal edges may be determined based upon the first mouth design 3006). Alternatively and/or additionally, the landmark information may be indicative of a desired incisal edge vertical position (e.g., shown by graphical object 1806 discussed with respect to FIG. 18) corresponding to a range of desired vertical positions of incisal edges of the one or more teeth. In an example, the first mouth design score may be determined based upon whether or not the positions of the incisal edges of the one or more teeth are within the desired incisal edge vertical position. For example, the first mouth design score may be higher if the positions of the incisal edges of the one or more teeth are within the desired incisal edge vertical position (e.g., within the range of desired vertical positions) than if the positions of the incisal edges of the one or more teeth are outside the desired incisal edge vertical position (e.g., outside the range of desired vertical positions). In some examples, the plurality of mouth designs may be ranked based upon the plurality of mouth design scores (e.g., a mouth design associated with a higher mouth design score may be ranked higher than a mouth design associated with a lower mouth design score). In some examples, an order in which representations of mouth designs of the plurality of mouth designs are displayed via the mouth design interface may be determined based upon rankings of the plurality of mouth designs. For example, the representation of the first mouth design 3006 may be displayed at least one of above, before, etc. a representation of a mouth design that is ranked lower than the first mouth design 3006. Alternatively and/or additionally, indications of rankings of the plurality of mouth designs (and/or indications of the plurality of mouth design scores associated with the plurality of mouth designs) may be displayed via the mouth design interface.

Figure 31:
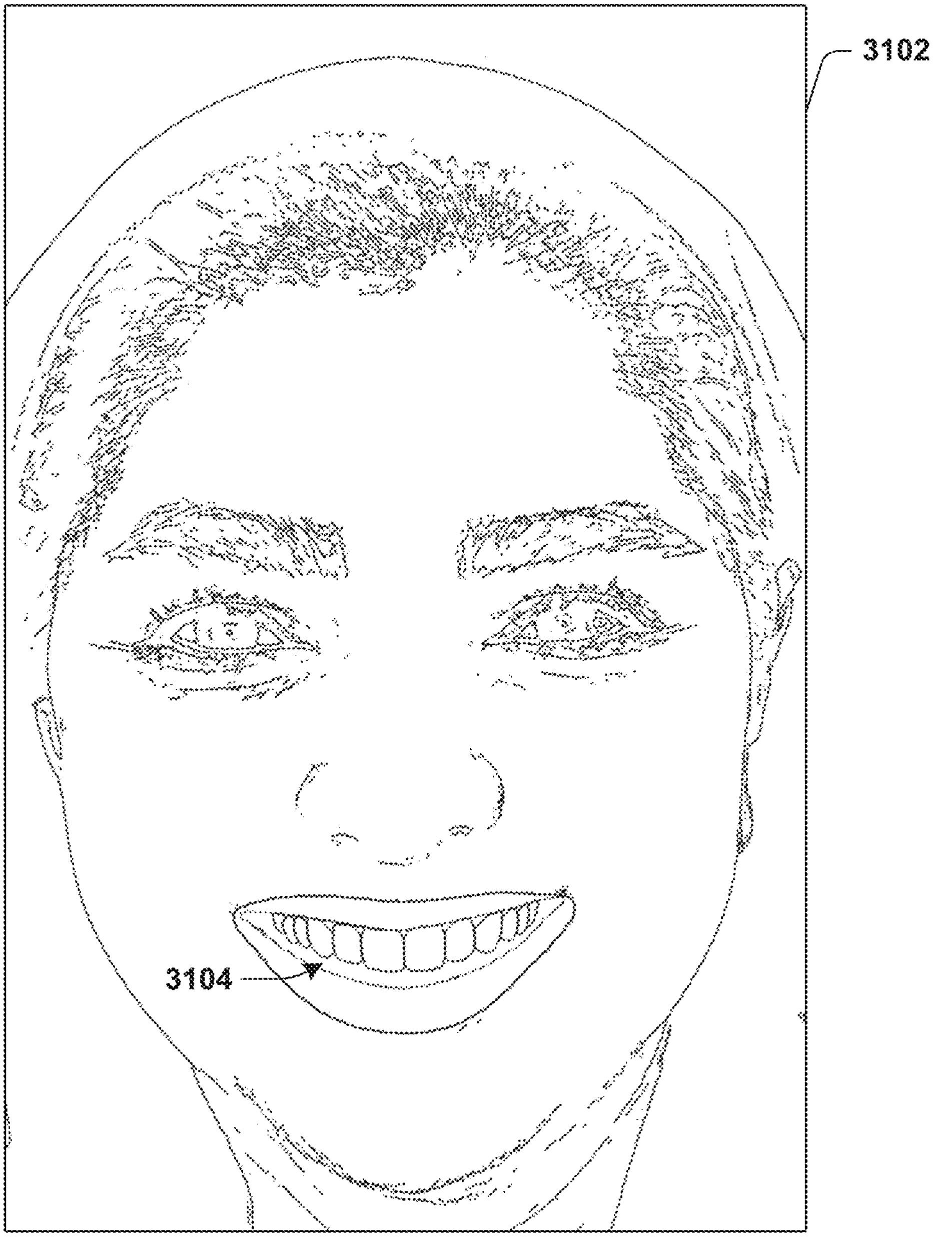
FIG. 31 illustrates a mouth design interface displaying a representation of a mouth design, according to some embodiments.

FIG. 31 illustrates the mouth design interface (shown with reference number 3102) displaying a representation of a mouth design, wherein the representation of the mouth design comprises a view of the first patient in smile state and/or in frontal position. In an example, the representation of the mouth design may comprise a representation 3104 of boundaries of teeth (e.g., teeth outline), of the mouth design, in the smile state and/or the frontal position.

Figure 32:
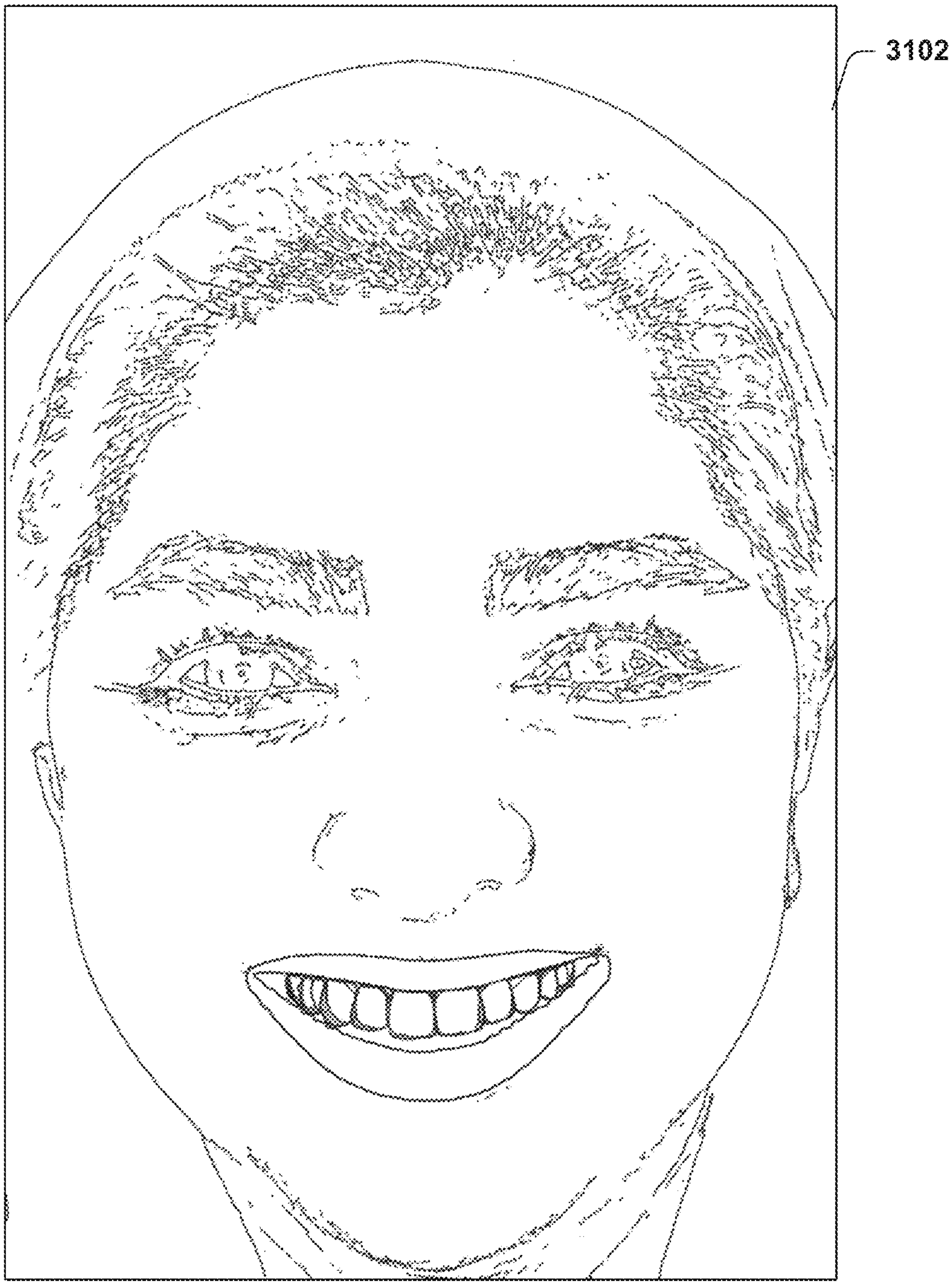
FIG. 32 illustrates a mouth design interface displaying a representation of a mouth design, according to some embodiments.

FIG. 32 illustrates the mouth design interface 3102 displaying a representation of a mouth design, wherein the representation of the mouth design comprises a view of the first patient in smile state and/or in frontal position. In an example, the representation of the mouth design may show differences (e.g., shown with shaded regions) between boundaries of teeth of the mouth design and boundaries of teeth (e.g., current boundaries of teeth) of the first patient (e.g., the boundaries of teeth of the first patient may be determined based upon the one or more first images and/or the first segmentation information). Alternatively and/or additionally, the representation of the mouth design may show differences between boundaries of gums (e.g., current boundaries of gums) of the mouth design and boundaries of gums of the first patient (e.g., the boundaries of gums of the first patient may be determined based upon the one or more first images and/or the first segmentation information).

Figure 33:
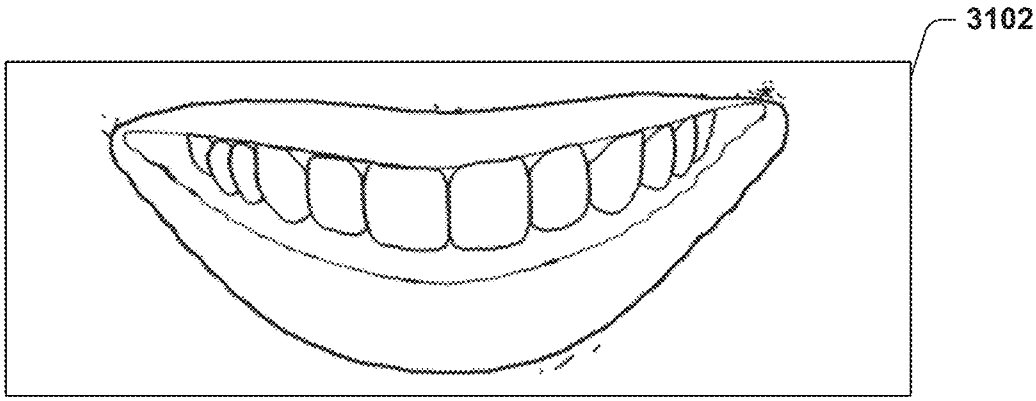
FIG. 33 illustrates a mouth design interface displaying a representation of a mouth design, according to some embodiments.

FIG. 33 illustrates the mouth design interface 3102 displaying a representation of a mouth design, wherein the representation of the mouth design comprises a close up view of the mouth design and/or the first patient in smile state and/or in frontal position. In an example, the representation of the mouth design may comprise a representation of boundaries of teeth (e.g., teeth outline), of the mouth design, in the smile state and/or the frontal position.

Figure 34:
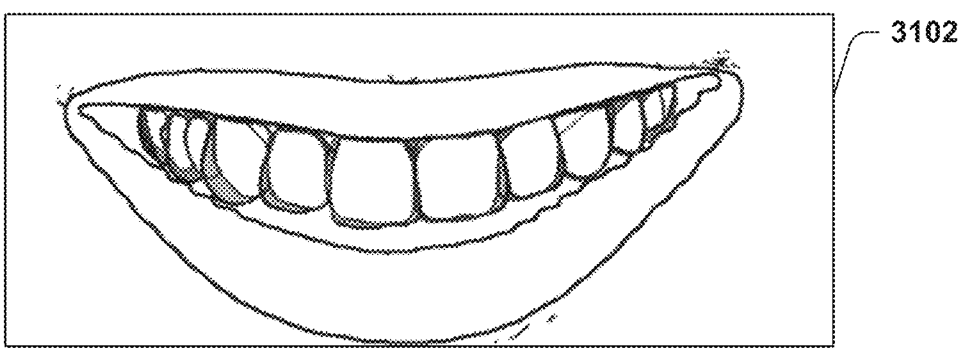
FIG. 34 illustrates a mouth design interface displaying a representation of a mouth design, according to some embodiments.

FIG. 34 illustrates the mouth design interface 3102 displaying a representation of a mouth design, wherein the representation of the mouth design comprises a close up view of the mouth design and/or the first patient in smile state and/or in frontal position. In an example, the representation of the mouth design may show differences (e.g., shown with shaded regions) between boundaries of teeth of the mouth design and boundaries of teeth (e.g., current boundaries of teeth) of the first patient (e.g., the boundaries of teeth of the first patient may be determined based upon the one or more first images and/or the first segmentation information). Alternatively and/or additionally, the representation of the mouth design may show differences between boundaries of gums (e.g., current boundaries of gums) of the mouth design and boundaries of gums of the first patient (e.g., the boundaries of gums of the first patient may be determined based upon the one or more first images and/or the first segmentation information).

Figure 35:
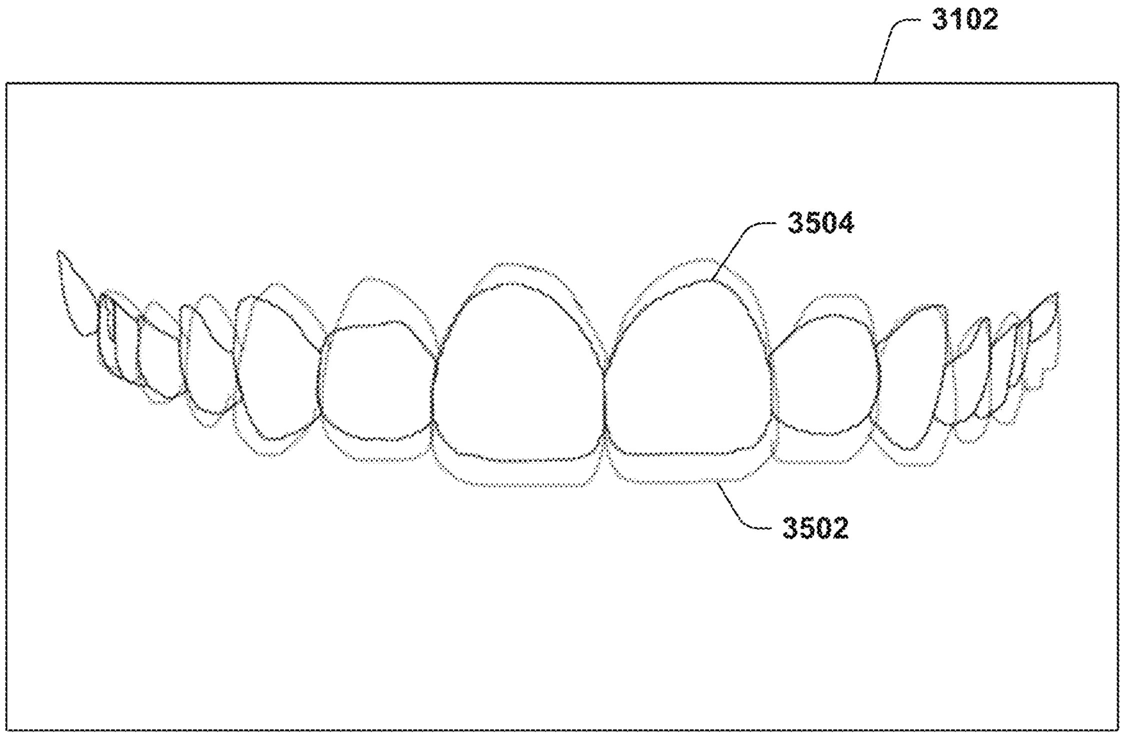
FIG. 35 illustrates a mouth design interface displaying a representation of a mouth design, according to some embodiments.

FIG. 35 illustrates the mouth design interface 3102 displaying a representation of a mouth design, wherein the representation of the mouth design comprises boundaries of teeth of the mouth design and boundaries of teeth (e.g., current boundaries of teeth) of the first patient. The representation of the mouth design may show a deviation in tooth shape and/or gingival levels from the teeth of the first patient (e.g., current teeth of the first patient) to the mouth design.

Figure 36A:
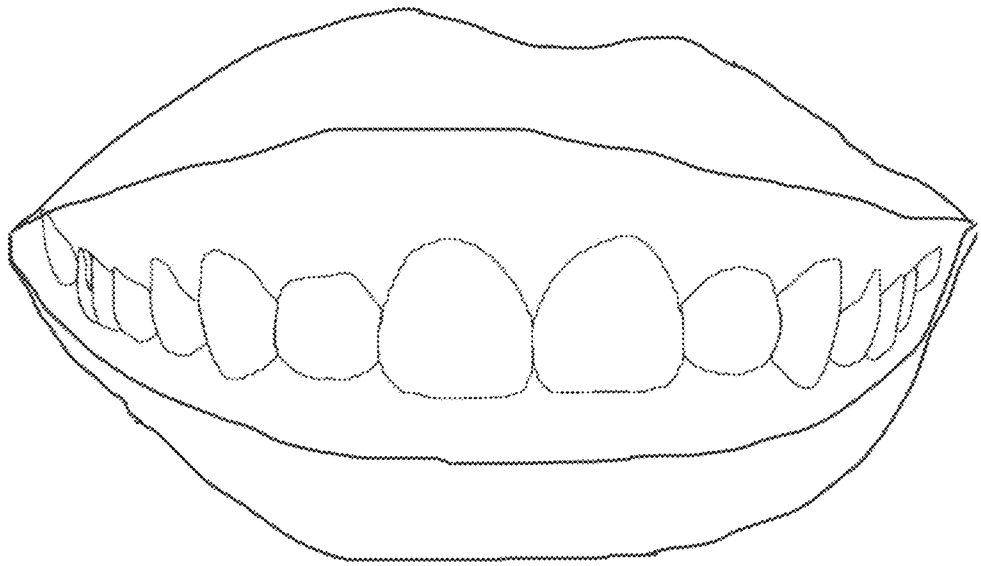
FIG. 36A illustrates an example of an image based upon which a mouth design is generated, according to some embodiments.
Figure 36B:
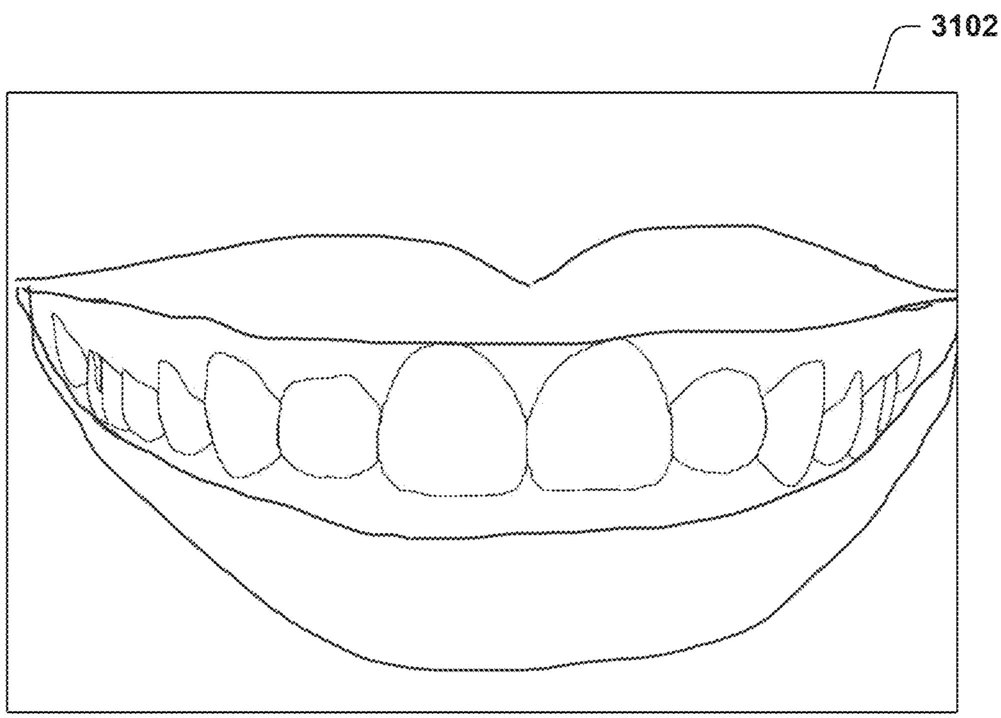
FIG. 36B illustrates a mouth design interface displaying a representation of a mouth design, according to some embodiments.

FIG. 36A-36B illustrate an example of generating a mouth design with merely adjustments to lips of the first patient. FIG. 36A illustrates an example of at least a portion of the first image 2802 based upon which the mouth design (shown in FIG. 36B) is generated. In an example, the first masked image 2806 (based upon which the mouth design is generated) may be generated such that merely portions of the first image 2802 corresponding to lips of the first patient are masked in the first masked image 2806. FIG. 36B illustrates the mouth design interface 3102 displaying a representation of the mouth design, wherein the representation of the mouth design comprises boundaries of lips and boundaries of teeth of the mouth design. In an example, shapes and/or boundaries of one or more lips indicated by the mouth design may be different than shapes and/or boundaries of one or more lips of the first patient (e.g., shown in FIG. 36A), while shapes and/or boundaries of one or more teeth and/or gingival areas indicated by the mouth design are the same as shapes and/or boundaries of one or more teeth and/or gingival areas of the first patient (e.g., shown in FIG. 36A). For example, merely shapes and/or boundaries of lips of the first patient may be adjusted to generate the mouth design shown in FIG. 36B. In an example, the mouth design shown in FIG. 46B may be achieved via one or more treatments comprising at least one of botulinum toxin injection for partial paralysis of an upper lip and/or reduced mobility when smiling, filler and/or gel injection to increase volume of the lips, etc.

Figure 37:
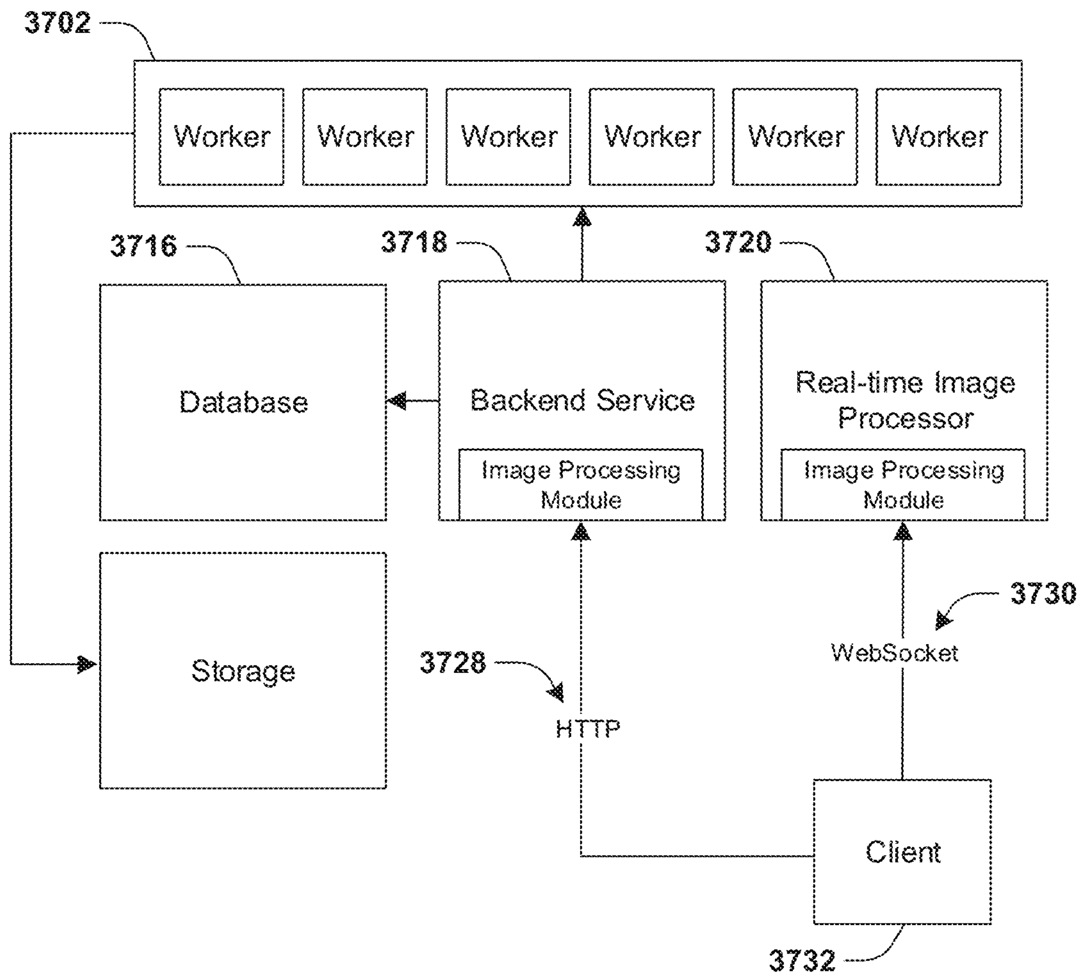
FIG. 37 illustrates a system, according to some embodiments.

In some examples, a system for capturing images, determining and/or displaying landmark information and/or generating mouth designs is provided. For example, the system may comprise the image capture system (discussed with respect to the example method 100 of FIG. 1), the landmark information system (discussed with respect to the example method 800 of FIG. 8) and/or the mouth design system (discussed with respect to the example method 2700 of FIG. 27). In an example, at least some operations discussed herein may be performed on one or more servers of the system. An example of the system is shown in FIG. 37. A client device 3732 may send requests to one or more servers of the system for at least one of: (i) requesting the one or more servers to determine position information and/or offset information for achieving a target position for image capture, (ii) requesting the one or more servers to generate landmark information based upon an image, (iii) generate one or more mouth designs, etc. The client device 3732 may communicate with a first server 3720 of the system via a first connection 3730 (e.g., using Websocket protocol) and/or may communicate with a second server 3720 of the system via a second connection 3728 (e.g., using Hyptertext Transfer Protocol (HTTP)). One or more first requests by the client device 3732 (e.g., requesting the one or more servers to determine position information and/or offset information for achieving a target position for image capture) may require real-time processing. The client device 3732 may transmit the one or more first requests over the first connection 3730 to the first server 3720 (e.g., real-time image processor) and the first server 3720 may perform one or more requested services in real time. One or more second requests by the client device 3732 (e.g., requesting the one or more servers to generate landmark information and/or one or more mouth designs) may be performed off-line. The client device 3732 may transmit the one or more second requests over the second connection 3728 to the second server 3718 (e.g., backend service), in response to which the second server 3718 may write one or more outputs (e.g., outputs of requested services) in a database 3716 that may be accessed later. Off-line requests may be sent to workers 3702 (e.g., parallel workers) to achieve concurrency and/or scalability.

In some examples, one or more of the techniques discussed with respect to the example method 800 of FIG. 8 and/or the example method 2700 of FIG. 27 may use a VGG Face model, such as for at least one of determination of landmark information based upon an image, generation of a mouth design, etc.

In some examples, the term "image" used herein may refer to a two-dimensional image, unless otherwise specified.

In some examples, at least some of the disclosed subject matter may be implemented on a client device, and in some examples, at least some of the disclosed subject matter may be implemented on a server (e.g., hosting a service accessible via a network, such as the Internet).

Figure 38:
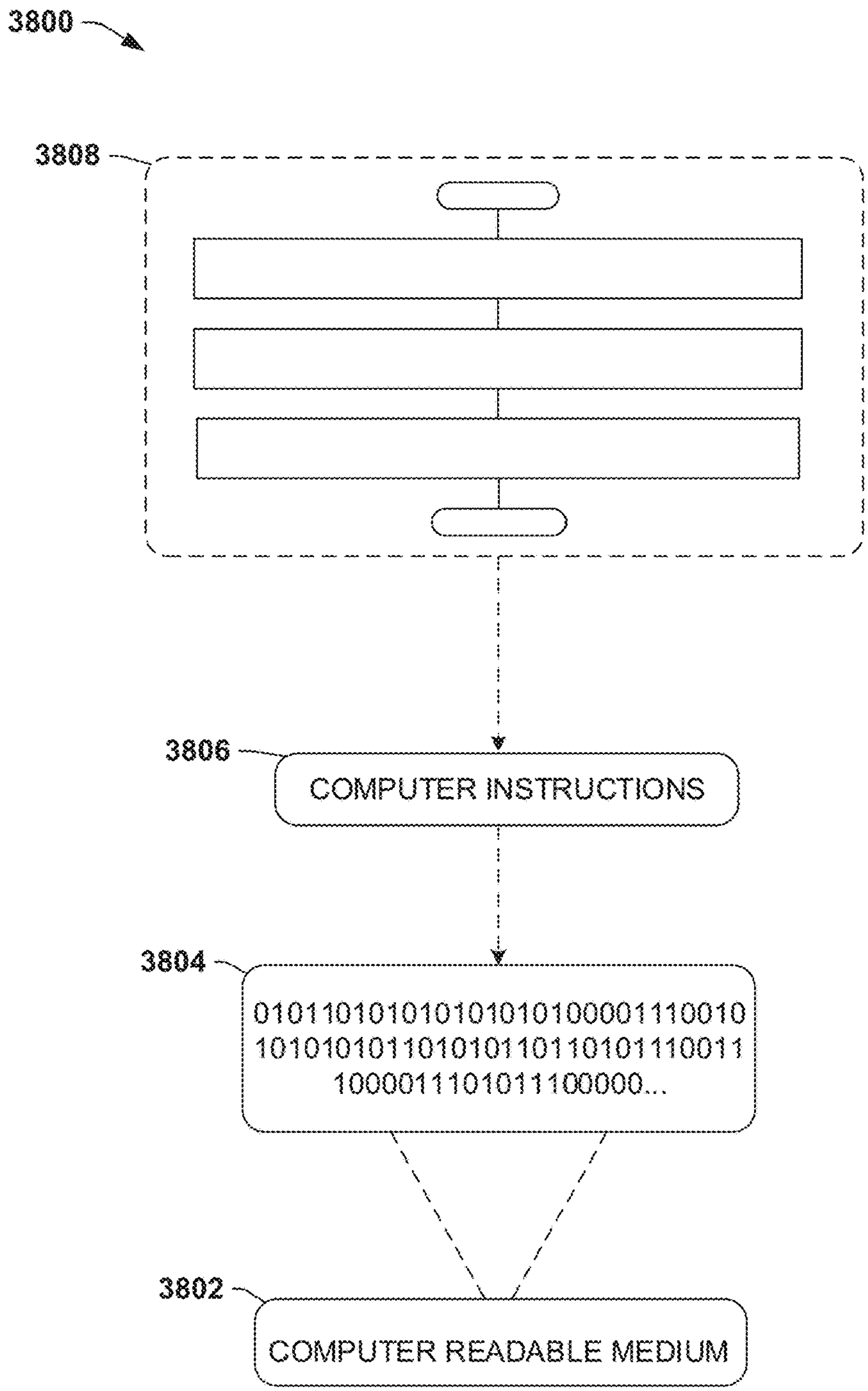
FIG. 38 is an illustration of an exemplary computer-readable medium comprising processor-executable instructions, wherein the processor executable instructions may be configured to embody one or more of the provisions set forth herein.
Figure 39:
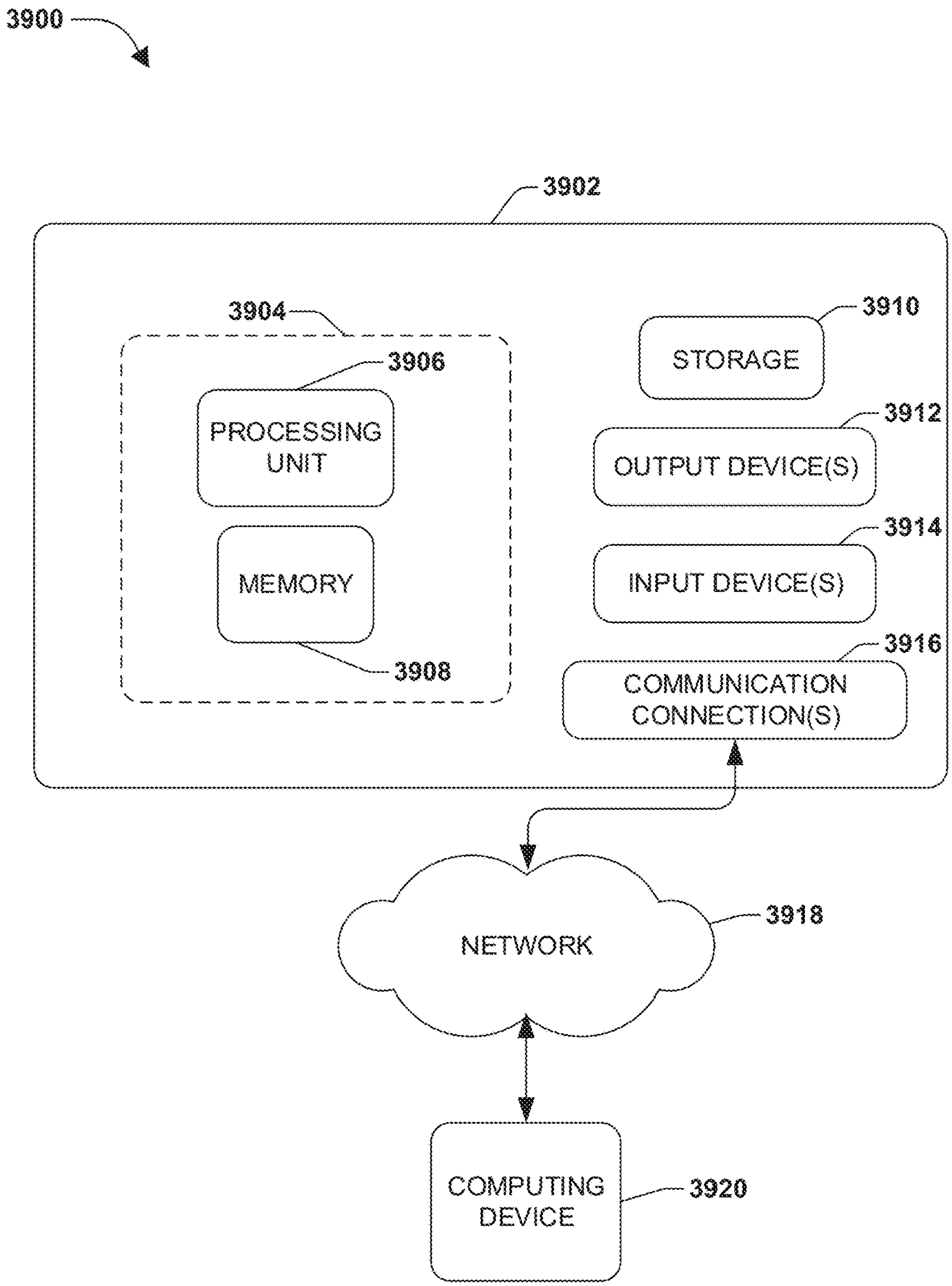
FIG. 39 illustrates an exemplary computing environment wherein one or more of the provisions set forth herein may be implemented.

Another embodiment involves a computer-readable medium comprising processor-executable instructions. The processor-executable instructions may be configured to implement one or more of the techniques presented herein. An exemplary computer-readable medium that may be devised in these ways is illustrated in FIG. 38. An implementation 3800 may comprise a computer-readable medium 3802 (e.g., a CD, DVD, or at least a portion of a hard disk drive), which may comprise encoded computer-readable data 3804. The computer-readable data 3804 comprises a set of computer instructions 3806 configured to operate according to one or more of the principles set forth herein. In one such embodiment 3800, the processor-executable computer instructions 3806 may be configured to perform a method, such as at least some of the example method 100 of FIG. 1, at least some of the example method 800 of FIG. 8, at least some of the example method 900 of FIG. 9 and/or at least some of the example method 2700 of FIG. 27, for example. In another such embodiment, the processor-executable instructions 3806 may be configured to implement a system, such as at least some of the image capture system (discussed with respect to the example method 100 of FIG. 1), at least some of the landmark information system (discussed with respect to the example method 800 of FIG. 8) and/or at least some of the mouth design system (discussed with respect to the example method 2700 of FIG. 27), for example. Many such computer-readable media 3802 may be devised by those of ordinary skill in the art that are configured to operate in accordance with the techniques presented herein. FIG. 39 and the following discussion provide a description of a suitable computing environment to implement embodiments of one or more of the provisions set forth herein. The operating environment of FIG. 39 is just one example of a suitable operating environment and is not intended to indicate any limitation as to the scope of use or functionality of the operating environment. Example computing devices include, but are not limited to, server computers, mainframe computers, personal computers, hand-held or laptop devices, mobile devices (such as mobile phones, Personal Digital Assistants (PDAs), media players, and the like), consumer electronics, multiprocessor systems, mini computers, distributed computing environments that include any of the above systems or devices, and the like.

Although not required, embodiments are described in the general context of "computer readable instructions" being executed by one or more computing devices. Computer readable instructions may be distributed using computer readable media (discussed below). Computer readable instructions may be implemented as programs and/or program modules, such as functions, objects, Application Programming Interfaces (APIs), data structures, and the like, that execute particular tasks or implement particular abstract data types. Typically, the functionality of the computer readable instructions may be combined or distributed (e.g., as desired) in various environments.

FIG. 39 illustrates an example of a system 3900 comprising a (e.g., computing) device 3902. Device 3902 may be configured to implement one or more embodiments provided herein. In an exemplary configuration, device 3902 includes at least one processing unit 3906 and at least one memory 3908. Depending on the configuration and type of computing device, memory 3908 may be volatile (such as RAM, for example), non-volatile (such as ROM, flash memory, etc., for example), or some combination of volatile and non-volatile. This configuration is illustrated in FIG. 39 by dashed line 3904.

In other embodiments, device 3902 may include additional features and/or functionality. For example, device 3902 may further include additional storage (e.g., removable and/or non-removable) including, but not limited to, magnetic storage, optical storage, and the like. Such additional storage is illustrated in FIG. 39 by storage 3910. In one embodiment, computer readable instructions to implement one or more embodiments provided herein may be in storage 3910. Storage 3910 may further store other computer readable instructions to implement an application program, an operating system, and the like. Computer readable instructions may be loaded in memory 3908 for execution by processing unit 3906, for example.

The term "computer readable media" as used herein includes computer storage media. Computer storage media includes volatile and/or nonvolatile, removable and/or non-removable media implemented in any method or technology for storage of information such as computer readable instructions or other data. Memory 3908 and storage 3910 are examples of computer storage media. Computer storage media may include, but is not limited to including, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store desired information and can be accessed by device 3902. Any such computer storage media may be part of device 3902.

Device 3902 may further include communication connection(s) 3916 that allows device 3902 to communicate with other devices. Communication connection(s) 3916 may include, but is not limited to including, a modem, a radio frequency transmitter/receiver, an integrated network interface, a Network Interface Card (NIC), a USB connection, an infrared port, or other interfaces for connecting device 3902 to other computing devices. Communication connection(s) 3916 may include a wireless connection and/or a wired connection. Communication connection(s) 3916 may transmit and/or receive communication media.

The term "computer readable media" may include, but is not limited to including, communication media. Communication media typically embodies computer readable instructions and/or other data in a "modulated data signal" such as a carrier wave or other transport mechanism and includes any information delivery media. The term "modulated data signal" may correspond to a signal that has one or more of its characteristics set or changed in such a manner as to encode information in the signal.

Device 3902 may include input device(s) 3914 such as mouse, keyboard, voice input device, pen, infrared cameras, touch input device, video input devices, and/or any other input device. Output device(s) 3912 such as one or more displays, speakers, printers, and/or any other output device may also be included in device 3902. Input device(s) 3914 and output device(s) 3912 may be connected to device 3902 using a wireless connection, wired connection, or any combination thereof. In one embodiment, an input device or an output device from another computing device may be used as input device(s) 3914 or output device(s) 3912 for device 3902.

Components of device 3902 may be connected by various interconnects (e.g., such as a bus). Such interconnects may include a Peripheral Component Interconnect (PCI), such as a Universal Serial Bus (USB), PCI Express, an optical bus structure, firewire (IEEE 1394), and the like. In another embodiment, components of device 3902 may be interconnected by a network. In an example, memory 3908 may be comprised of multiple (e.g., physical) memory units located in different physical locations interconnected by a network.

Storage devices utilized to store computer readable instructions may be distributed across a network. For example, a computing device 3920 accessible using a network 3918 may store computer readable instructions to implement one or more embodiments provided herein. Device 3902 may access computing device 3920 and download a part or all of the computer readable instructions for execution. Alternatively, device 3902 may download pieces of the computer readable instructions, as needed, or some instructions may be executed at device 3902 and some at computing device 3920.

Various operations of embodiments are provided herein. In one embodiment, one or more of the operations described may comprise computer readable instructions stored on one or more computer readable media, which if executed by a computing device, will cause the computing device to perform the operations described. The order in which some or all of the operations are described should not be construed as to imply that these operations are order dependent. Alternative ordering will be appreciated by one skilled in the art having the benefit of this description. Further, it will be understood that not all operations are present in each embodiment provided herein.

Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims.

As used in this application, the terms “system”, “component,” “interface”, “module,” and the like are generally intended to refer to a computer-related entity, either hardware, software, a combination of hardware and software, or software in execution. For example, a component may be, but is not limited to being, an object, a process running on a processor, a processor, a program, an executable, a thread of execution, and/or a computer. By way of illustration, an application running on a controller and the controller can be a component. One or more components may reside within a thread of execution and/or process and a component may be distributed between two or more computers and/or localized on one computer.

Furthermore, the claimed subject matter may be implemented as an apparatus, method, and/or article of manufacture using standard programming and/or engineering techniques to produce hardware, firmware, software, or any combination thereof to control a computer that may implement the disclosed subject matter. The term “article of manufacture” as used herein is intended to encompass a computer program (e.g., accessible from any computer-readable device, carrier, or media). Of course, those skilled in the art will recognize many modifications may be made to this configuration without departing from the scope or spirit of the claimed subject matter.

Moreover, the word “exemplary” is used herein to mean serving as an example, illustration, or instance. Any design or aspect described herein as “exemplary” is not necessarily to be construed as advantageous over other designs or aspects. Rather, use of the word “exemplary” is intended to present concepts in a concrete fashion. As used in this application, the word “or” is intended to mean an inclusive “or” (e.g., rather than an exclusive “or”). That is, unless specified otherwise, or clear from context, “X employs A or B” is intended to mean any of the natural inclusive permutations. That is, if X employs A; X employs B; or X employs both A and B, then “X employs A or B” is satisfied under any of the foregoing instances. In addition, the words “a” and “an” as used in this application and the appended claims may generally be construed to mean “one or more” (e.g., unless specified otherwise or clear from context to be directed to a singular form). Also, at least one of A or B or the like generally means A or B or both A and B. Furthermore, to the extent that the terms “includes”, “having”, “has”, “with”, or variants thereof are used in either the detailed description or the claims, such terms are intended to be inclusive in a manner similar to the term “comprising.”

Although the disclosure has been shown and described with respect to one or more implementations, modifications and alterations will occur to others skilled in the art based (e.g., at least in part) upon a reading of this specification and the annexed drawings. The disclosure includes all such modifications and alterations. The disclosure is limited only by the scope of the following claims. In regard to the various functions performed by the above described components (e.g., resources, elements, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. Additionally, while a particular feature of the disclosure may have been disclosed with respect to only one of several implementations, the particular feature may be combined with one or more other features of the other implementations as may be desired and/or advantageous for any given or particular application.

What is claimed is:

1. A method, comprising:

identifying one or more first images of a patient, wherein a first image of the one or more first images comprises a representation of a first tooth;

determining, based upon the one or more first images, landmark information comprising first segmentation information indicative of boundaries of:

teeth of the patient; and one or more lips of the patient;

generating, based upon the landmark information, a first masked image, wherein generating the first masked image comprises:

identifying a border area of the first tooth in the first image; and replacing pixels, corresponding to the border area, of the first image with masked pixels corresponding to Gaussian noise to generate the first masked image;

generating, based upon the first masked image, a mouth design using a first machine learning model, wherein:

the first tooth of the patient is represented in the landmark information by one or more first boundaries, and wherein an adjusted representation of the first tooth is represented in the mouth design by one or more second boundaries at least partially different than the one or more first boundaries; and a first lip of the patient is represented in the landmark information by one or more third boundaries, and wherein an adjusted representation of the first lip is represented in the mouth design by one or more fourth boundaries at least partially different than the one or more third boundaries; and displaying a representation of the mouth design, comprising the adjusted representation of the first tooth and the adjusted representation of the first lip, via a client device.

2. The method of claim 1, comprising:

training the first machine learning model using first training information comprising at least one of:

a first plurality of images, wherein each image of the first plurality of images comprises a view of a face;

a second plurality of images, wherein each image of the second plurality of images comprises a view of a portion of a face comprising at least one of lips or teeth; or a third plurality of images, wherein each image of the third plurality of images comprises a view of teeth of a patient when a retractor is in a mouth of the patient.

3. The method of claim 2, wherein:

the first machine learning model comprises a score-based generative model comprising a stochastic differential equation (SDE); and the generating the mouth design comprises regenerating masked pixels of the first masked image using the first machine learning model.

4. The method of claim 2, wherein:

the first training information is associated with a first mouth design category comprising at least one of a first mouth style or one or more first treatments;

the first masked image is generated based upon the first mouth design category;

the mouth design is associated with the first mouth design category; and
the method comprises:
generating a second masked image based upon a second mouth design category comprising at least one of a second mouth style or one or more second treatments;
generating, based upon the second masked image, a second mouth design using a second machine learning model trained using second training information associated with the second mouth design category; and
displaying a representation of the second mouth design via the client device.

5. The method of claim 4, comprising:
determining a first mouth design score associated with the mouth design; and
determining a second mouth design score associated with the second mouth design, wherein an order in which the representation of the mouth design and the representation of the second mouth design are displayed via the client device is based upon the first mouth design score and the second mouth design score.

6. The method of claim 1, wherein:
the representation of the mouth design is indicative of at least one of:
one or more first differences between gums of the patient and gums of the mouth design; or
one or more second differences between teeth of the patient and teeth of the mouth design; and
the method comprises:
generating a treatment plan indicative of one or more treatments for achieving the mouth design on the patient; and
displaying the treatment plan via the client device.

7. The method of claim 1, wherein:
the generating the first masked image comprises masking, based upon the landmark information, one or more portions of the first image to generate the first masked image.

8. The method of claim 1, wherein:
the generating the mouth design using the first machine learning model is performed based upon multiple images of the one or more first images, wherein:
the multiple images comprise views of the patient in multiple mouth states of the patient; and
the multiple mouth states comprise at least two of:
a mouth state in which the patient is smiling;
a mouth state in which the patient vocalizes a letter or a term;
a mouth state in which lips of the patient are in resting position;
a mouth state in which lips of the patient are in closed-lips position; or
a mouth state in which a retractor is in the mouth of the patient.

9. The method of claim 1, wherein capturing the first image of the one or more first images comprises:
receiving a real-time camera signal generated by a camera, wherein the real-time camera signal comprises a real-time representation of a view;
analyzing the real-time camera signal to identify a set of facial landmark points of a face, of the patient, within the view;
determining, based upon the set of facial landmark points, position information associated with a position of a head of the patient;
determining, based upon the position information, offset information associated with a difference between the position of the head and a target position of the head;
displaying, based upon the offset information, a target position guidance interface via at least one of the client device or a second client device, wherein the target position guidance interface provides guidance for reducing the difference between the position of the head and the target position of the head; and
in response to a determination that the position of the head matches the target position of the head, capturing the first image of the face using the camera.

10. The method of claim 9, wherein:
the position information comprises at least one of:
a roll angular position of the head;
a yaw angular position of the head; or
a pitch angular position of the head;
the determining the offset information is based upon target position information comprising at least one of:
a target roll angular position;
a target yaw angular position; or
a target pitch angular position; and
the offset information comprises at least one of:
a difference between the roll angular position and the target roll angular position;
a difference between the yaw angular position and the target yaw angular position; or
a difference between the pitch angular position and the target pitch angular position.

11. The method of claim 9, wherein:
the target position of the head is:
frontal position;
lateral position;
¾ position; or
12 o'clock position; and
the determining the position information comprises performing head pose estimation using the set of facial landmark points.

12. The method of claim 9, comprising:
displaying, via the client device, an instruction to smile, wherein the first image is captured in response to determining that the patient is smiling;
displaying, via the client device, an instruction to pronounce a letter, wherein the first image is captured in response to identifying vocalization of the letter;
displaying, via the client device, an instruction to pronounce a term, wherein the first image is captured in response to identifying vocalization of the term;
displaying, via the client device, an instruction to maintain a resting position of lips of the patient, wherein the first image is captured in response to determining that the lips of the patient is in the resting position;
displaying, via the client device, an instruction to maintain a closed-lips position of the mouth of the patient, wherein the first image is captured in response to determining that the mouth of the patient is in the closed-lips position;
displaying, via the client device, an instruction to insert a retractor into the mouth of the patient, wherein the first image is captured in response to determining that a retractor is in the mouth of the patient;
displaying, via the client device, an instruction to insert a rubber dam into the mouth of the patient, wherein the first image is captured in response to determining that a rubber dam is in the mouth of the patient; or
displaying, via the client device, an instruction to insert a contractor into the mouth of the patient, wherein the first image is captured in response to determining that a contractor is in the mouth of the patient.

13. The method of claim 1, comprising:

generating, based upon a comparison of the one or more first boundaries of the first tooth with the one or more second boundaries of the first tooth, a treatment plan indicative of one or more treatments for achieving the mouth design on the patient; and displaying the treatment plan via the client device.

14. The method of claim 13, wherein:

the one or more treatments of the treatment plan comprise jaw surgery.

15. The method of claim 13, wherein:

the one or more treatments of the treatment plan comprise gingival surgery.

16. The method of claim 13, wherein:

the one or more treatments of the treatment plan comprise orthodontic treatment.

17. The method of claim 13, wherein:

the one or more treatments of the treatment plan comprise a lip treatment.

18. The method of claim 17, wherein:

the lip treatment comprises at least one of:

botulinum toxin injection;

filler injection; or gel injection.

19. The method of claim 1, wherein:

a first boundary of the border area of the first tooth corresponds to a first boundary of the one or more first boundaries of the first tooth; and generating the mouth design comprises regenerating the masked pixels to generate the mouth design representative of a second boundary of the first tooth, wherein the second boundary of the first tooth corresponds to an adjusted version of the first boundary of the first tooth.

20. The method of claim 19, wherein:

the representation of the mouth design is indicative of a difference between the first boundary of the first tooth and the second boundary of the first tooth.

21. A non-transitory computer-readable medium having stored thereon processor-executable instructions that when executed cause performance of operations, the operations comprising:

identifying one or more first images of a patient, wherein a first image of the one or more first images comprises a representation of a first tooth;

determining, based upon the one or more first images, landmark information comprising first segmentation information indicative of boundaries of:

teeth of the patient;

gums of the patient; and one or more lips of the patient;

generating, based upon the landmark information, a first masked image, wherein generating the first masked image comprises:

identifying a border area of the first tooth in the first image; and replacing pixels, corresponding to the border area, of the first image with masked pixels corresponding to Gaussian noise to generate the first masked image;

generating, based upon the first masked image, a mouth design using a first machine learning model, wherein:

the first tooth of the patient is represented in the landmark information by one or more first boundaries, and wherein an adjusted representation of the first tooth is represented in the mouth design by one or more second boundaries at least partially different than the one or more first boundaries; and a first lip of the patient is represented in the landmark information by one or more third boundaries, and wherein an adjusted representation of the first lip is represented in the mouth design by one or more fourth boundaries at least partially different than the one or more third boundaries; and displaying a representation of the mouth design, comprising the adjusted representation of the first tooth and the adjusted representation of the first lip, via a client device.

22. The non-transitory computer-readable medium of claim 21, the operations comprising:

training the first machine learning model using first training information comprising at least one of:

a first plurality of images, wherein each image of the first plurality of images comprises a view of a face;

a second plurality of images, wherein each image of the second plurality of images comprises a view of a portion of a face comprising at least one of lips or teeth; or a third plurality of images, wherein each image of the third plurality of images comprises a view of teeth of a patient when a retractor is in a mouth of the patient.

23. The non-transitory computer-readable medium of claim 22, wherein:

the first machine learning model comprises a score-based generative model comprising a stochastic differential equation (SDE); and the generating the mouth design comprises regenerating masked pixels of the first masked image using the first machine learning model.

24. The non-transitory computer-readable medium of claim 21, wherein at least one of:

the representation of the mouth design is indicative of at least one of:

one or more first differences between gums of the patient and gums of the mouth design; or one or more second differences between teeth of the patient and teeth of the mouth design; or the operations comprise:

generating a treatment plan indicative of one or more treatments for achieving the mouth design on the patient; and displaying the treatment plan via the client device.

* * * * *